(12) United States Patent
Yao et al.

(10) Patent No.: US 10,746,962 B2
(45) Date of Patent: Aug. 18, 2020

(54) OPTICAL LENS

(71) Applicant: Ningbo Sunny Automotive Optech Co., Ltd., Ningbo, Zhejiang (CN)

(72) Inventors: Bo Yao, Ningbo (CN); Qiansen Xie, Ningbo (CN); Wenwei Qiu, Ningbo (CN); Dongfang Wang, Ningbo (CN)

(73) Assignee: Ningbo Sunny Automotive Optech Co., Ltd, Zhejiang (CN)

( * ) Notice: Subject to any disclaimer, the term of this patent is extended or adjusted under 35 U.S.C. 154(b) by 609 days.

(21) Appl. No.: 15/520,413

(22) PCT Filed: Oct. 19, 2015

(86) PCT No.: PCT/CN2015/092203
§ 371 (c)(1),
(2) Date: Sep. 18, 2017

(87) PCT Pub. No.: WO2016/062230
PCT Pub. Date: Apr. 28, 2016

(65) Prior Publication Data
US 2018/0129022 A1    May 10, 2018

(30) Foreign Application Priority Data

Oct. 20, 2014    (CN) .......................... 2014 1 0559069
Oct. 20, 2014    (CN) ...................... 2014 2 0606304 U

(51) Int. Cl.
G02B 13/00        (2006.01)
G02B 9/60         (2006.01)

(52) U.S. Cl.
CPC ........... *G02B 13/0045* (2013.01); *G02B 9/60* (2013.01); *G02B 13/006* (2013.01)

(58) Field of Classification Search
CPC .. G02B 13/0045; G02B 9/60; G02B 27/0025; G02B 13/18; H04N 5/2254
USPC ...................................................... 359/714
See application file for complete search history.

(56) References Cited

U.S. PATENT DOCUMENTS

| | | | |
|---|---|---|---|
| 6,069,750 A | 5/2000 | Koizumi | |
| 2007/0201139 A1 | 8/2007 | Lin | |
| 2010/0103537 A1* | 4/2010 | Kitahara | G02B 9/60 359/784 |
| 2013/0002920 A1* | 1/2013 | Sano | G02B 13/0045 348/311 |
| 2016/0011403 A1* | 1/2016 | Asami | G02B 13/0045 359/740 |

FOREIGN PATENT DOCUMENTS

| | | |
|---|---|---|
| CN | 101855584 A | 10/2010 |
| CN | 103076665 A | 5/2013 |

* cited by examiner

*Primary Examiner* — Mohammed A Hasan
(74) *Attorney, Agent, or Firm* — Sughrue Mion, PLLC

(57) ABSTRACT

An optical lens includes a first lens having negative power, a second lens having positive power, a third lens, a fourth lens, and a fifth lens having positive power. The third lens and the fourth lens form an achromatic lens group. The fifth lens has two surfaces and at least one of the two surfaces is an aspherical surface.

22 Claims, 18 Drawing Sheets

OPTICAL LENS

CROSS REFERENCE OF RELATED APPLICATION

This application is a non-provisional application that claims the benefit of priority under 35 U.S.C. § 371 to a PCT application, application number PCT/CN2015/092203, filed Oct. 19, 2015 which is incorporated herewith by reference in its entity.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to field of optical imaging technology, more particularly to an optical lens for optical imaging.

Description of Related Arts

Most of optical imaging systems, such as current indoor surveillance imaging system or vehicle mounted imaging system, especially for front imaging system, are refractive imaging systems. In an actual imaging process, light emitted from an object point is refracted by the optical lens of the refractive imaging system to form an image of the object point, which is affected by a variety of factors that may cause aberration, such as spherical aberration, coma aberration, astigmatism, curvature of image field, distortion, and so on.

In order to obtain an imaging effect of large aperture, high resolution and minimal distortion, an achromatic lens is used to reduce chromatic aberration. The chromatic lens, such as cemented lens and double-separated type lenses, is commonly composed of two single lenses having opposite chromatic features, which are assembled together. However, it is difficult to reduce impact on image quality caused by other factors, when only a single achromatic lens is utilized for achieving good imaging effect in the imaging optical system. Moreover, the single achromatic lens desired for achieving good imaging effect should be the lens of Extra-low dispersion (ED lenses), such as fluorite lenses. However, manufacturing the fluorite lenses is difficult and with high production cost, which would also cause environmental pollution. Worse still, the fluorite is fragile, resulting in that the entire optical lens is not suitable for being used in complex and harsh environment.

In addition, with the development of the active safety in auto industry, the requirements for vehicle mounted front lens have been increased continuously. Minimal distortion, miniaturization, mega-pixel, and large aperture have become necessary configurations for such lens, along with the requirements of low cost and the ability of maintaining a relatively satisfying imaging effect at a temperature range of −40° C.~+85° C.

Currently, wide-angle indoor monitoring and vehicle mounted imaging lenses on the market cannot meet the needs of low cost and miniaturization while achieving imaging of high pixel, small distortion and large aperture.

SUMMARY OF THE PRESENT INVENTION

The main advantage of the present invention is to provide a new optical lens, wherein respective lenses of the optical lens can be made of regular optical materials, such as glass or plastic, and cost of production thereof is relatively low.

Another advantage of the present invention is to provide a new optical lens, wherein manufacturing materials of the respective lenses of the optical lens is more environmental-friendly.

Another advantage of the present invention is to provide a new optical lens, wherein object image, obtained from the imaging system using the optical lens, has a small curvature of image field and distortion.

Another advantage of the present invention is to provide a new optical lens, wherein the respective lenses of the optical lens can be miniaturized.

Another advantage of the present invention is to provide a new optical lens, wherein the optical lens achieves a large aperture and high pixel imaging.

Another advantage of the present invention is to provide a new optical lens, wherein the respective lenses of the optical lens can be made of glass material, so that the optical lens is able to maintain a clear and stable imaging within a relatively wide range of temperature, such as −40° C.~+85° C.

Another advantage of the present invention is to provide a new optical lens, wherein the optical lens is able to utilize light of wider wavelength range to achieve good imaging with large aperture, high pixel and small distortion, so that the optical lens is particularly suitable for monitoring and vehicle mounted camera system, which are used both day and night or working in poor lighting condition.

Another advantage of the present invention is to provide a new optical lens, wherein the optical lens can not only meet the conditions of the low cost and miniaturization, but also is able to achieve good imaging of large aperture, high-pixel and small distortion within the temperature range of −40° C. to 85° C.

Another advantage of the present invention is to provide a new optical lens, wherein there is no precise components and complicated structures employed, and the manufacturing process thereof is simple and the cost thereof is low.

Additional advantages and features of the present invention will become apparent from the description which follows, and may be implemented by combinations of means particularly pointed out in the appended claims.

According to the present invention, the foregoing and other objects are attained by providing an optical lens, in order from the object side to the image side, comprising:

A first lens having negative power and two concave surfaces;

A second lens having positive power and two convex surfaces;

A third lens;

A fourth lens adhered with the third lens to form an adhered lens together with the third lens; and A fifth lens having positive power, wherein the fifth lens has two surfaces of which a surface facing towards the object side is a concave surface, and at least one of the two surfaces is an aspherical surface.

In the above optical lens, the third lens of the adhered lens has positive power and two concave surfaces, and the fourth lens of the adhered lens has negative power and a convex surface facing towards the object side.

In the above optical lens, the third lens of the adhered lens has negative power and a convex surface facing towards the image side, and the fourth lens of the adhered lens has positive power and two concave surfaces.

In the above optical lens, the refractive index of the first lens Nd (1) is not more than 1.85 (Nd (1)≤1.85), and the abbe constant of the first lens Vd (1) is not less than 40 (Vd (1)≥40).

In the above optical lens, the focal length of the first lens F1 and the focal length of the lens assembly F satisfy the formula:

$$-0.9 \geq F1/F \geq -2.$$

In the above optical lens, the refractive index of the second lens Nd (2) is not less than 1.55 (Nd (2)≥1.55), and the abbe constant Vd (2) of the second lens is not more than 65 (Vd (2)≤65).

In the above optical lens, the total length of the optical lens TTL and the focal length of the optical lens F satisfy the following formula:

$$TTL/F \leq 4.5.$$

The above-mentioned objects are attained by providing an optical lens, in order from the object side to the image side, comprising:

A first lens having negative power and two concave surfaces;

A second lens having positive power and two convex surfaces;

A third lens;

A fourth lens adhered with the third lens to form an adhered lens together with the third lens; and A fifth lens having positive power, wherein the fifth lens has a meniscus shape and two concave surfaces facing towards a same direction, and at least one of the two surfaces is an aspherical surface.

In the above optical lens, the third lens of the adhered lens has positive power and two convex surfaces, and the fourth lens of the adhered lens has negative power and two concave surfaces, and the two concave surfaces of the fifth lens face towards the object side.

In the above optical lens, the third lens of the adhered lens has negative power and two concave surfaces, and the fourth lens of the adhered lens has positive power and two convex surfaces, and the two concave surfaces of the fifth lens face towards the image side.

In the above optical lens, the focal length of the first lens F1 and the focal length of the lens assembly F satisfy the formula:

$$-0.9 \geq F1/F \geq -2.$$

In the above optical lens, the fifth lens satisfies the following formula:

$$F5/F > 2,$$

wherein the F5 is the focal length of the fifth lens L5, and the F is the focal length of the entire optical lens.

In the above optical lens, the fifth lens satisfies the following formula:

$$|r9 - r10| < 2$$

wherein the r9 is the radius of the fifth lens L5 at the object side, the r10 is the radius of the fifth lens L5 at the image side, In the above optical lens, an aperture element is arranged between the second lens and the third lens.

In the above optical lens, the second lens is a spherical lens.

In the above optical lens, the refractive index of the first lens Nd (1) is not more than 1.8 (Nd (1)≤1.8), and the abbe constant of the first lens Vd (1) is not less than 40 (Vd (1)≥40).

In the above optical lens, the refractive index of the second lens Nd (2) is not less than 1.73 (Nd (2)≥1.73), and the abbe constant Vd (2) of the second lens is not more than 40 (Vd (2)≥40).

In the above optical lens, the fifth lens satisfies the following formula:

$$r9/r10 \leq 3.5$$

wherein the r9 is the radius of the fifth lens L5 at the object side, the r10 is the radius of the fifth lens L5 at the image side, In the above optical lens, the total length of the optical lens TTL and the focal length of the optical lens F satisfy the following formula:

$$TTL/F \leq 6.5.$$

In the above optical lens, a maximum light-passing aperture of the first lens, a corresponding height of the image and a Field of view of the optical lens satisfy the following formula:

$$d/h/FOV \leq 0.025$$

wherein the FOV is the maximum Field of view FOV of the optical lens, the d is the maximum light-passing aperture of the concave surface (facing the object side) of the first lens L1 corresponding to the maximum FOV, and the h is the height of the image corresponding to the maximum FOV.

The above-mentioned objects are attained by providing an optical lens, in order from the object side to the image side, comprising:

A first lens having negative power;

A second lens having positive power;

A third lens;

A fourth lens, wherein the third lens and the fourth lens form an achromatic lens group; and A fifth lens having positive power, wherein the fifth lens has two surfaces and at least one of the two surfaces is an aspherical surface.

Another advantage of the present invention is to provide an optical lens, wherein the optical lens not only can meet the conditions of the low cost and miniaturization, but also is able to achieve good imaging of large aperture, high-pixel and small distortion within the temperature range of −40° C. to 85° C., so that the optical lens is particularly suitable for the monitoring and vehicle mounted camera system, which are used both day and night or working in poor lighting condition.

The above-mentioned objects are attained by providing an optical lens, in order from the object side to the image side, comprising:

A front lens group having positive power;

An aperture element; and

A rear lens group having positive power;

wherein the front lens group, in order from the object side to the image side, comprises a first double concave positive lens and a double convex positive second lens; the rear lens group, in order from the object side to the image side, comprises a third lens, a fourth lens, and a fifth lens, the third lens and the fourth lens form a cemented lens; the fifth lens is an aspherical lens having positive power and a shape of which is a meniscus shape with two concave surfaces facing the same direction;

Wherein the third lens of the cemented lens has positive power and double convex shape; the fourth lens of the cemented lens has negative power and double concave shape; the two concave surfaces of the fifth lens both faces towards the object side;

Wherein the third lens of the cemented lens has negative power and double concave shape; the fourth lens of the cemented lens has positive power and double convex shape; the two concave surfaces of the fifth lens both faces towards the image side;

Wherein the first lens satisfies the following formulas:

$Nd(1) \leq 1.8, Vd(1) \geq 40,$ wherein the Nd(1) is refractive index of the material of the first lens, and the Vd (1) is abbe constant of the material of the first lens.

Preferably, the first lens satisfies the following formulas:

$Nd(1) \leq 1.65, Vd(1) \geq 55;$

Wherein the first lens satisfies the following formula:

$-0.9 \geq F1/F \geq -2.0,$ wherein the F1 is focal length of the first lens and the F is focal length of the entire optical lens;

Wherein the second lens satisfies the following formulas:

$Nd(2) \geq 1.73, Vd(2) \geq 40,$ wherein the Nd (2) is refractive index of the material of the second lens, and the Vd (2) is the abbe constant of the second lens L2;

Wherein focal length of the front lens group, focal length of the rear lens group and the focal length of the entire optical lens satisfy the following formulas:

$4.5 \geq F(Front)/F \geq 1.3$ and $5 \geq F(Rear)/F \geq 1.5$

Furthermore, $2.5 \geq F(Front)/F \geq 1.3$, $3 \geq F(Rear)/F \geq 1.5$, wherein F (Front) is the focal length of the front lens group, the F (Rear) is the focal length of the rear lens group and the F is the focal length of the entire optical lens;

Wherein the fifth lens satisfies the following formulas:

$|r9-r10|<2,$ and $F5/F>2,$ wherein the r9 is the radius of the fifth lens in object side, the r10 is the radius of the fifth lens at the image side, the F5 is the focal length of the fifth lens, and the F is the focal length of the entire optical lens;

Wherein the total length of the optical lens satisfies the following formula:

$TTL/F \leq 6.5,$ Furthermore, $TTL/F \leq 4.5;$ wherein the TTL is the total length of the optical lens, which, in other words, refers to a distance from an outermost point of the object side of the first lens to an imaging focal plane of the optical lens, and the F is the focal length of the entire optical lens;

Wherein the F number of the optical lens satisfies the following formula:

$FNO \leq 1.8,$ wherein FNO is the F number of the entire optical lens;

Wherein the Field of view FOV of the optical lens satisfies the following formula:

$80° \geq FOV \geq 40°,$

Wherein maximum light-passing aperture diameter of the first lens, corresponding height of the image and the Field of view FOV of the optical lens satisfy the following formula:

$D/h/FOV \leq 0.025,$ wherein the FOV is the maximum Field of view FOV of the optical lens, the d is the maximum light-passing aperture diameter of the concave surface (facing the object side) of the first lens corresponding to the maximum FOV, and the h is the height of the image corresponding to the maximum FOV;

Wherein the first lens, the second lens, the third lens, and the forth lens are spherical glass lenses, and the fifth lens is aspherical plastic lens;

Wherein the first lens and the second lens are spherical glass lenses, the third lens, the fourth lens and the fifth lens are aspherical plastic lenses.

Advantages:

The optical lens disclosed in the present invention has a five-pieces lens structure and a design of aspherical lens, which can not only meet the requirements of the low cost and miniaturization, but also achieve a good imaging of large aperture, high-pixel, small distortion, high resolution as well as effective corrections of the various of aberrations of the optical system, and is capable of maintaining a good imaging resolution within the temperature range of −40° C.-85° C., which is particularly suitable for monitoring and vehicle mounted camera system, which are used both day and night or working in poor lighting condition.

Further objects and advantages of the present invention will be apparent from the following description of the accompanying drawings and the accompanying drawings.

These and other objectives, features, and advantages of the present invention will become apparent from the following detailed description, the accompanying drawings, and the appended claims.

In the FIG. 1 to FIG. 16, L1 is the first lens; L2 is the second lens; L3 is the third lens; L4 is the fourth lens; L5 is the fifth lens; L6 is the aperture element; L7 is the IR filter; L8 is the imaging plane; S1 and S2 are the two surfaces of the first lens; S3 and S4 are the two surfaces of the second lens; S5 is the surface of aperture element; S6 and S7 are the two surfaces of the third lens; S7 and S8 are the two surfaces of the fourth lens; S9 and S10 are the two surfaces of the fifth lens; and S11 and S12 are the two surfaces of IR filter.

Figure 17:
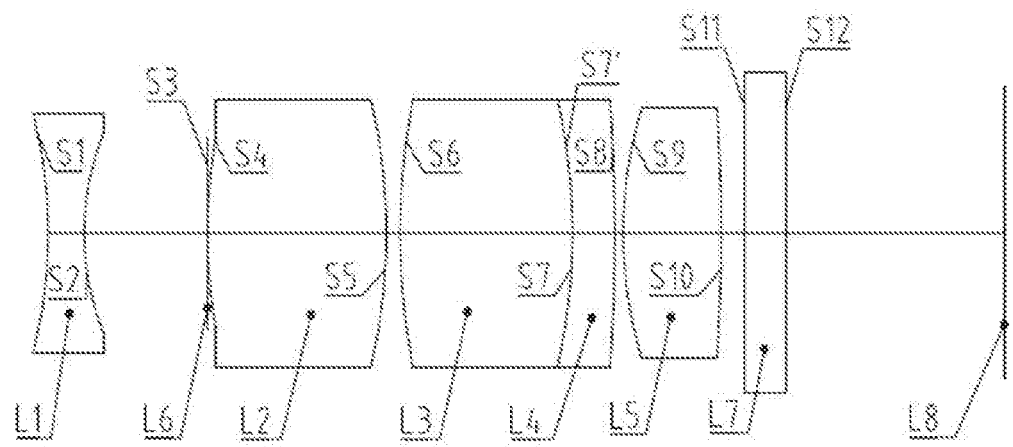

FIG. 17 is a schematic diagram of the configuration of the optical lens in accordance with a fifth preferred embodiment.

Figure 18:
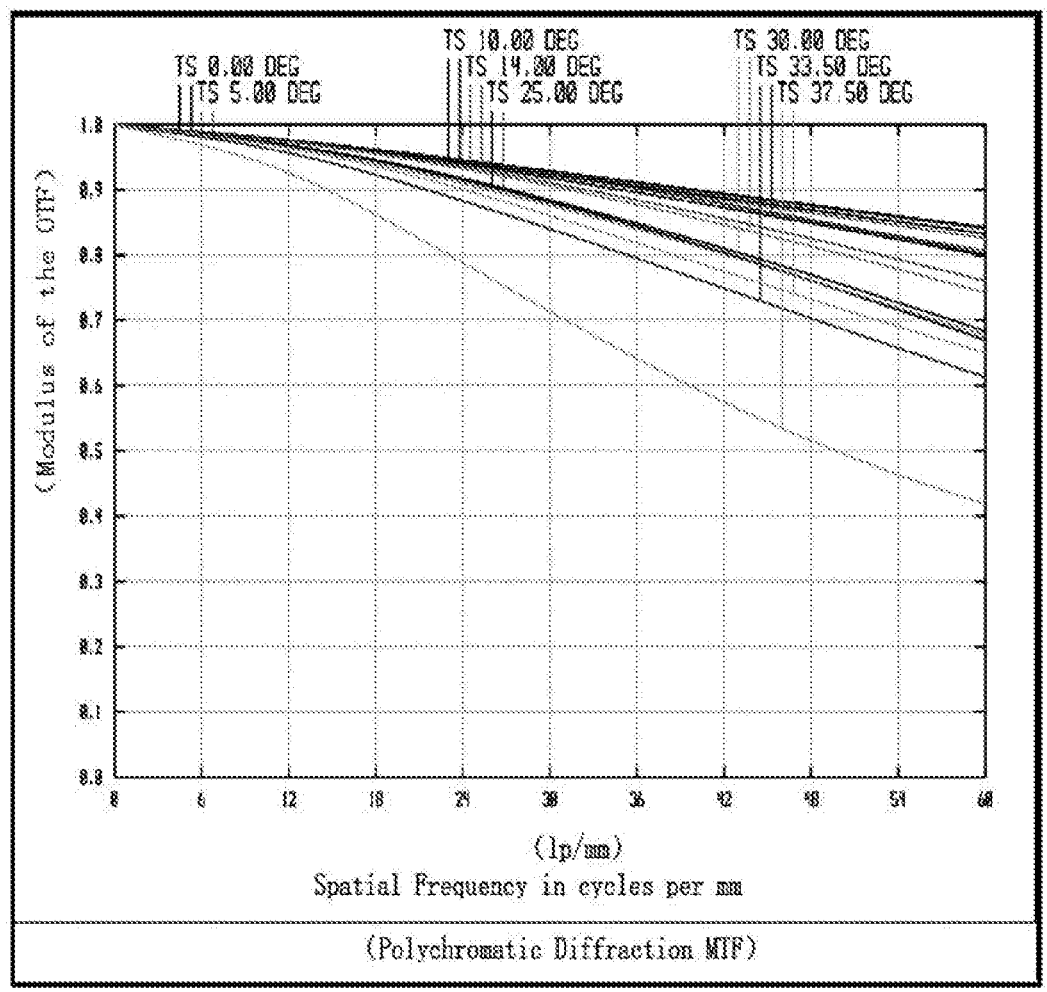

FIG. 18 is a MTF graph of the optical lens in accordance with the fifth preferred embodiment.

Figure 19:
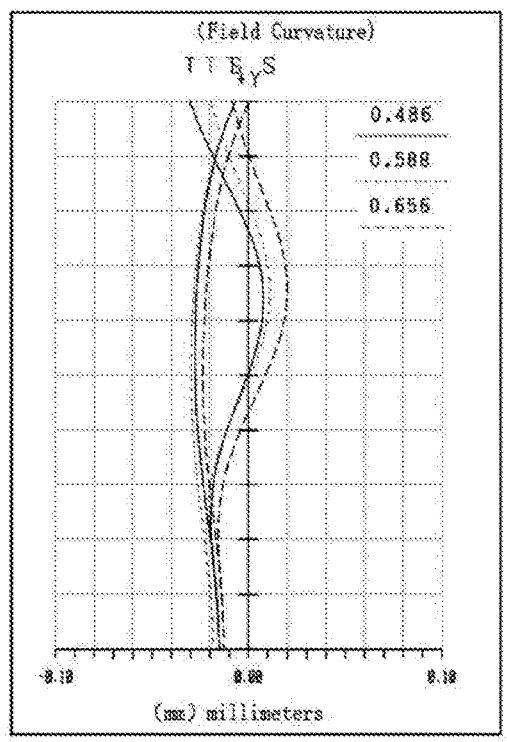

FIG. 19 is an astigmatism graph of the optical lens in accordance with the fifth preferred embodiment.

Figure 20:
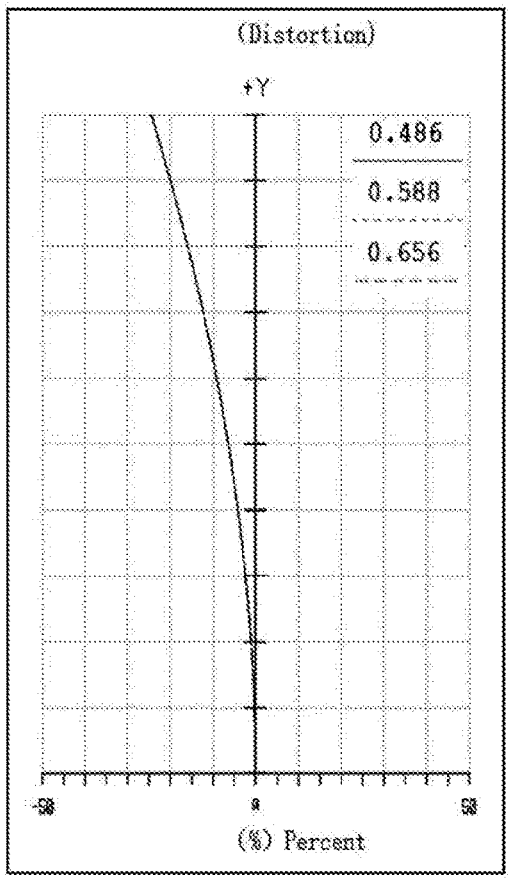

FIG. 20 is a distortion graph of the optical lens in accordance with the fifth preferred embodiment.

Figure 21:
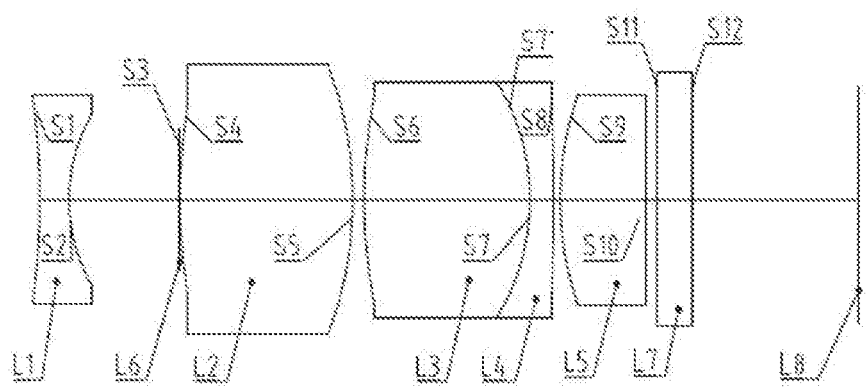

FIG. 21 is a schematic diagram of the configuration of the optical lens in accordance with a sixth preferred embodiment.

Figure 22:
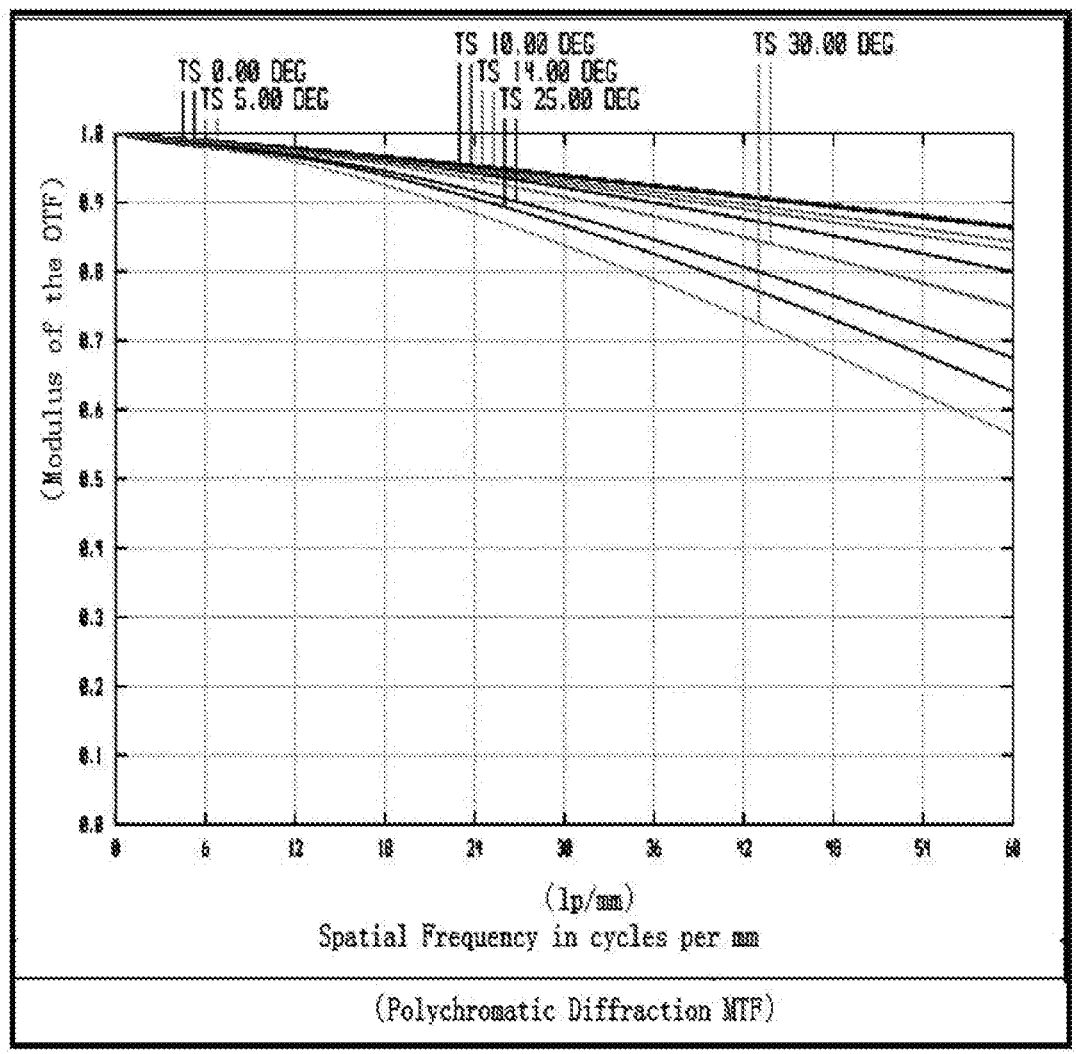

FIG. 22 is a MTF graph of the optical lens in accordance with the sixth preferred embodiment.

Figure 23:
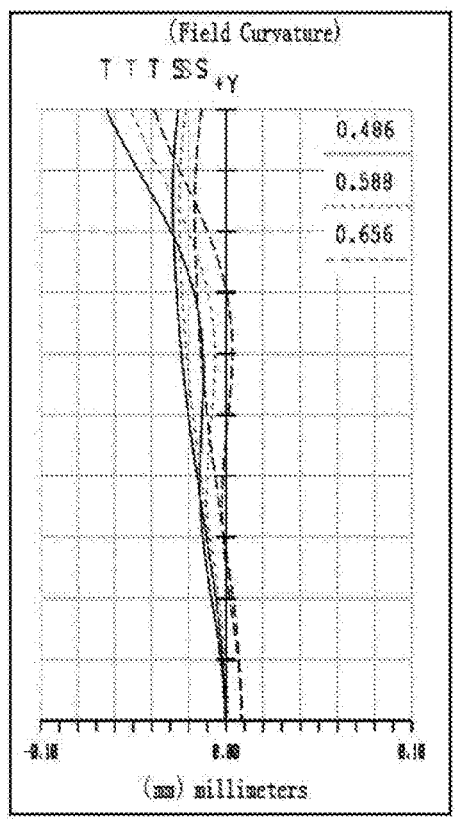

FIG. 23 is an astigmatism graph of the optical lens in accordance with the sixth preferred embodiment.

Figure 24:
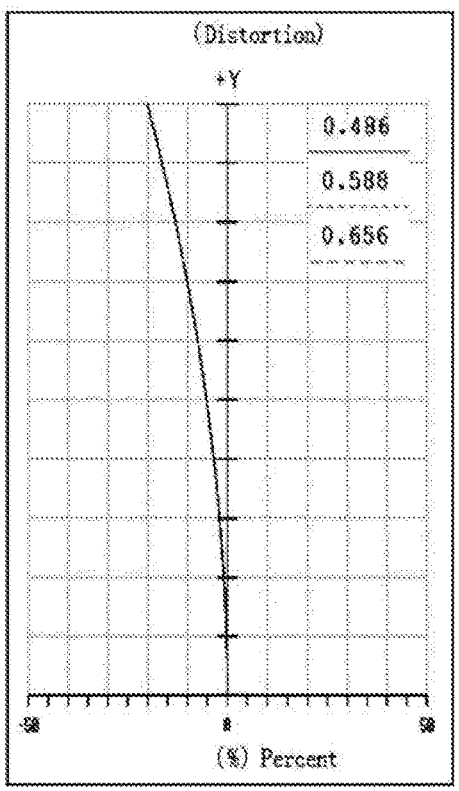

FIG. 24 is a distortion graph of the optical lens in accordance with the sixth preferred embodiment.

Figure 25:
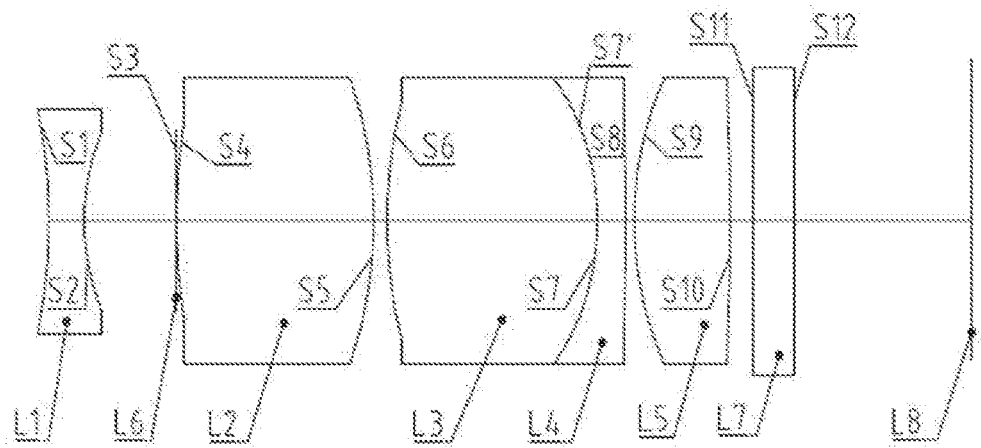

FIG. 25 is a schematic diagram of the configuration of the optical lens in accordance with a seventh preferred embodiment.

Figure 26:
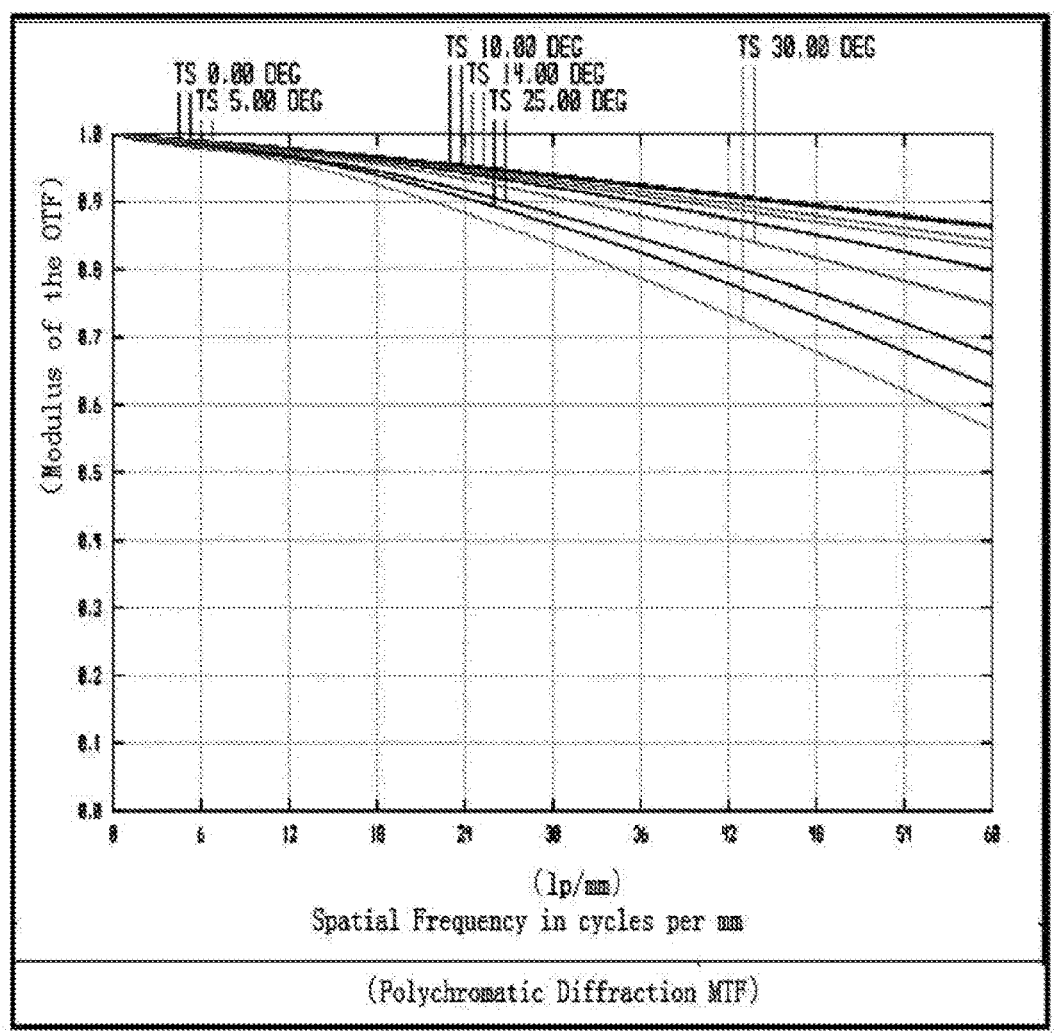

FIG. 26 is a MTF graph of the optical lens in accordance with the seventh preferred embodiment.

Figure 27:
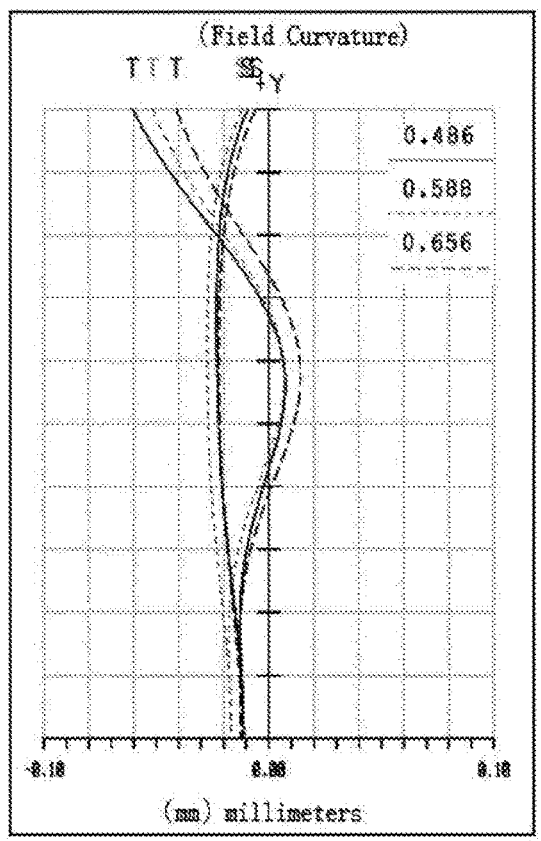

FIG. 27 is an astigmatism graph of the optical lens in accordance with the seventh preferred embodiment.

Figure 28:
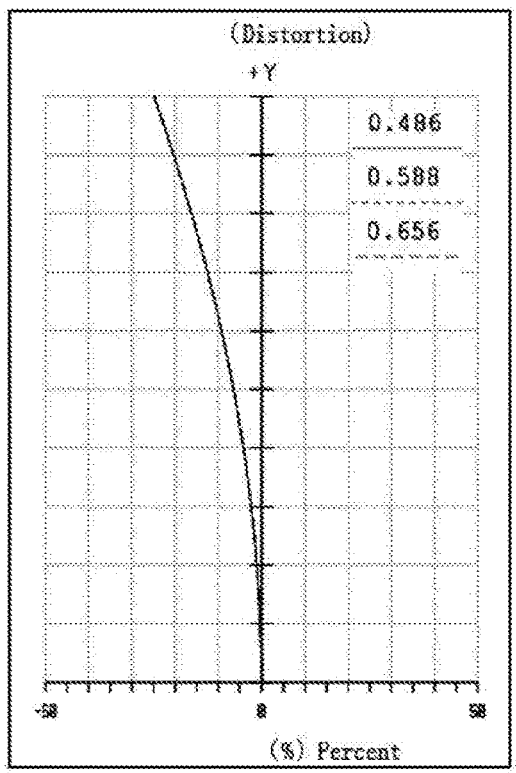

FIG. 28 is a distortion graph of the optical lens in accordance with the seventh preferred embodiment.

Figure 29:
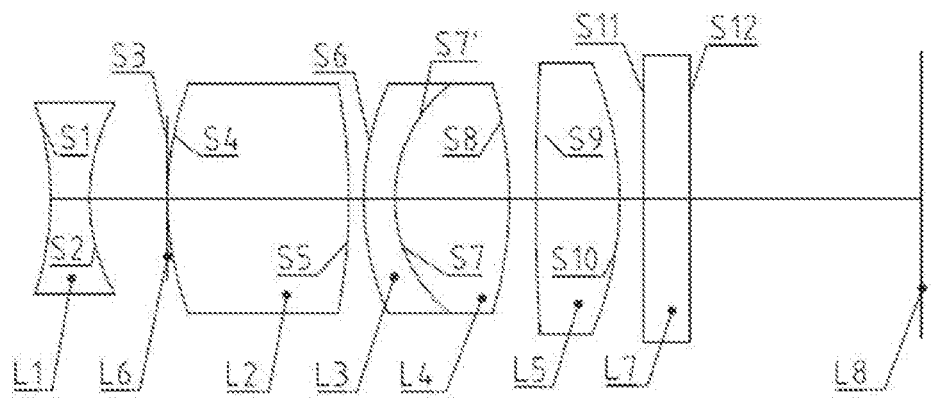

FIG. 29 is a schematic diagram of the configuration of the optical lens in accordance with an eighth preferred embodiment.

Figure 30:
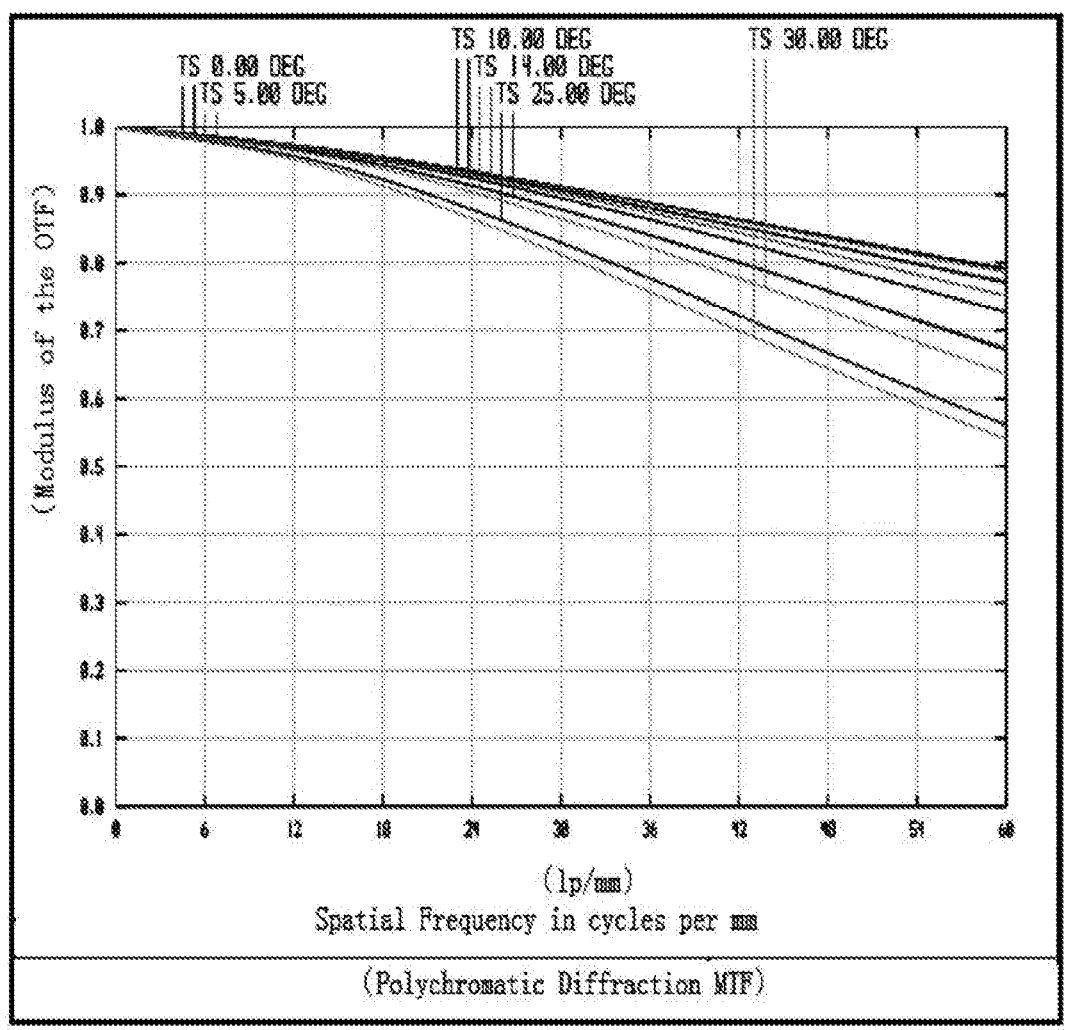

FIG. 30 is a MTF graph of the optical lens in accordance with the eighth preferred embodiment.

Figure 31:
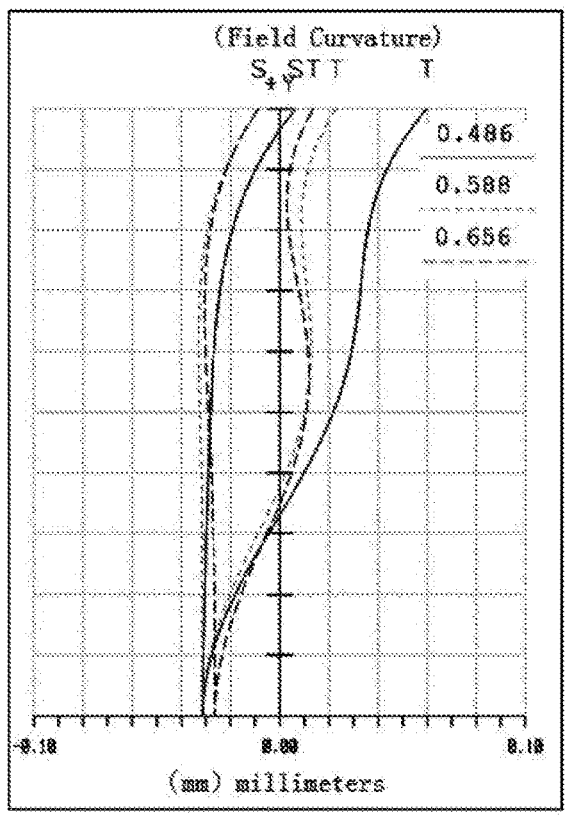

FIG. 31 is an astigmatism graph of the optical lens in accordance with the eighth preferred embodiment.

Figure 32:
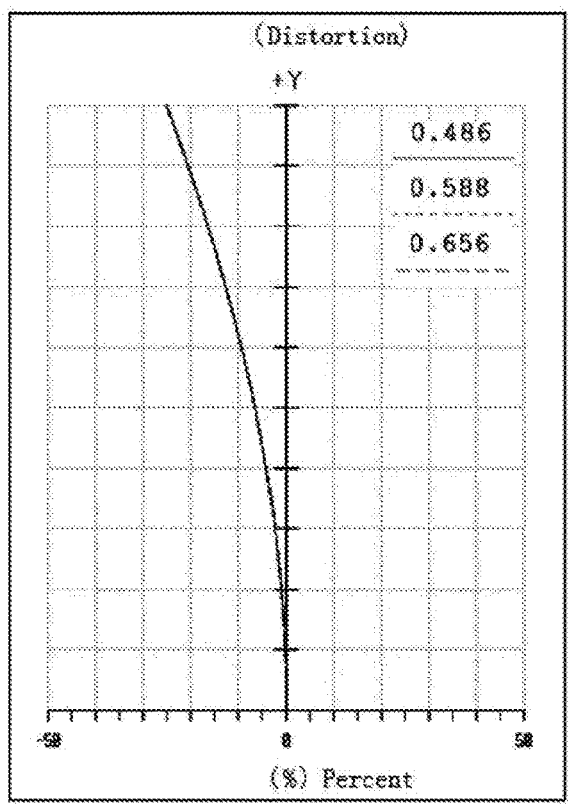

FIG. 32 is a distortion graph of the optical lens in accordance with the eighth preferred embodiment.

Figure 33:
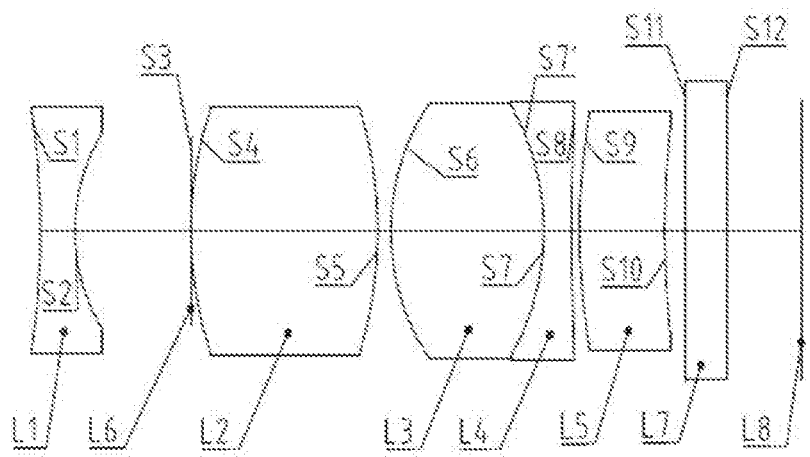

FIG. 33 is a schematic diagram of the configuration of the optical lens in accordance with a ninth preferred embodiment.

Figure 34:
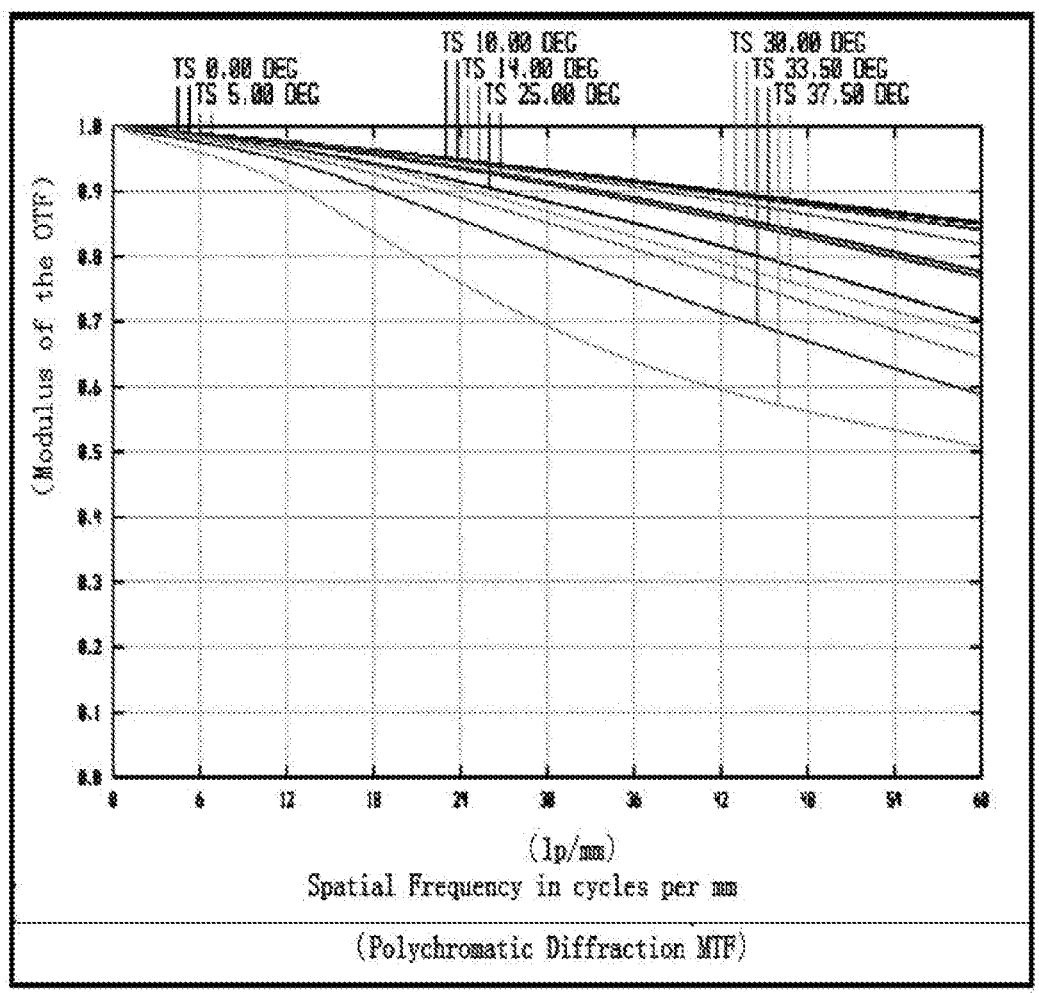

FIG. 34 is a MTF graph of the optical lens in accordance with the ninth preferred embodiment.

Figure 35:
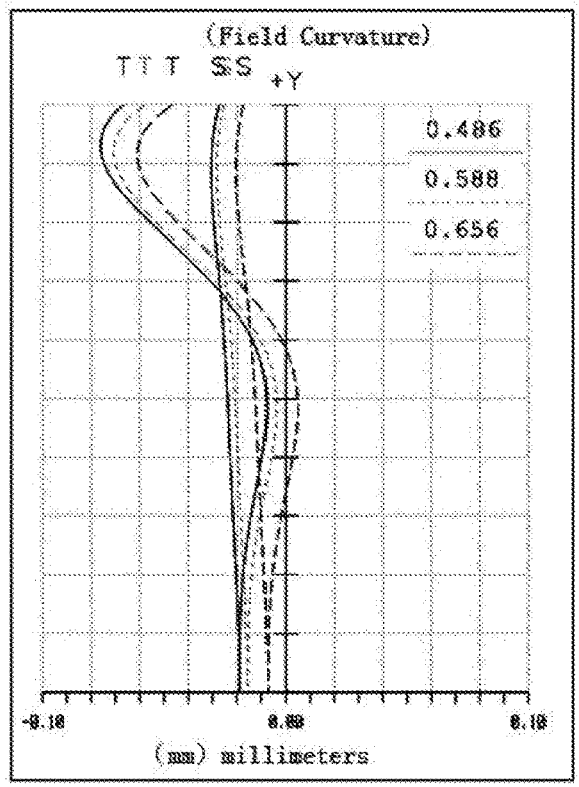

FIG. 35 is an astigmatism graph of the optical lens in accordance with the ninth preferred embodiment.

Figure 36:
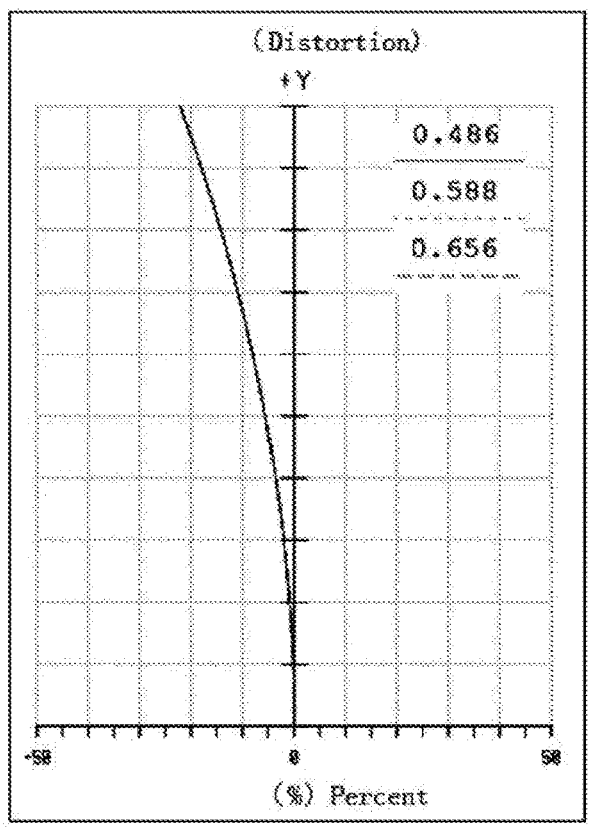

FIG. 36 is a distortion graph of the optical lens in accordance with the ninth preferred embodiment.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 4 of the drawings, an optical lens according to a first preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the third lens L3 and/or the fourth lens is/are aspherical lens (lenses). More preferably, the first lens L1, the second lens L2 the third lens L3 and/or the fourth lens is/are aspherical lens (lenses), to improve the optical performance of the optical lens of the first preferred embodiment. Alternatively, the first lens L1, the second lens L2, the third lens L3 and/or the fourth Lens L4 are spherical lens.

Figure 1:
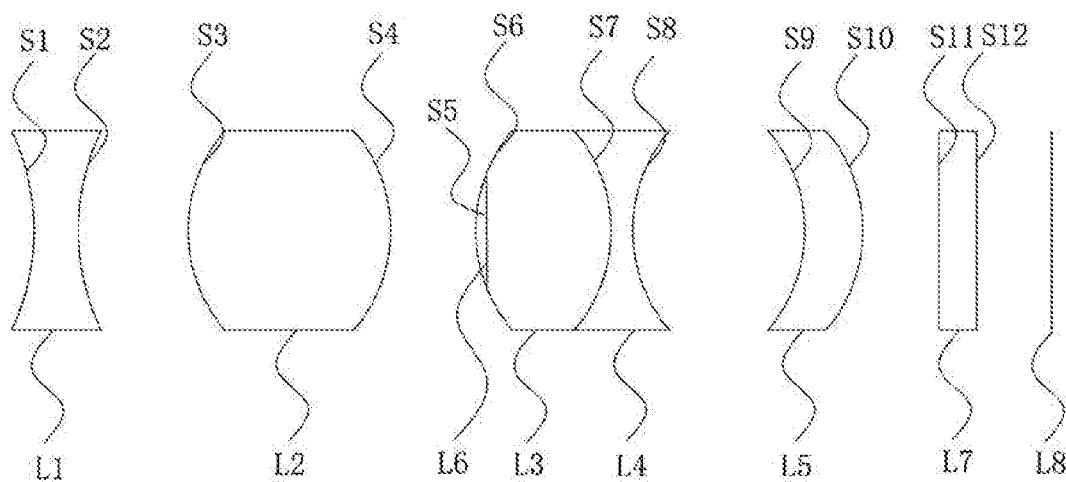
FIG. 1 is a schematic diagram of the configuration of the optical lens in accordance with a first preferred embodiment.

As shown in FIG. 1, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5. As shown in FIG. 1 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side.

As shown in FIG. 1 of the drawings, the optical centers of the first lens L1, the second lens L2, the third lens L3, the fourth Lens L4 and the fifth lens L5 of the optical lens in the first preferred embodiment are coaxial.

As shown in FIG. 1 of the drawings, the optical lens of the first preferred embodiment further comprises an aperture L6, wherein the front lens group and the rear lens group are arranged at two sides of the aperture L6 and the optical center thereof is coaxial with the optical centers of the first lens L1, the second lens L2, the third lens L3, the fourth Lens L4 and the fifth lens L5. Preferably, the aperture L6 is arranged between the first lens L1 and the second lens L2. Alternatively, the aperture L6 can be arranged between the second lens L2 and the third lens L3.

Alternatively, the aperture L6 can be arranged in the rear lens group and the optical center thereof is coaxial with the optical centers of the first lens L1, the second lens L2, the third lens L3, the fourth Lens L4 and the fifth lens L5. In some embodiments of the present invention, the aperture L6 also can be arranged between the achromatic lens group and the fifth lens L5. Furthermore, the aperture L6 also can be arranged in the achromatic lens group, for example the aperture L6 can be arranged at the third lens L3 or the fourth Lens L4. In other embodiments of the present invention, the aperture L6 can be arranged between the front lens group and the rear lens group.

It is understood that the first lens L1 in double concave shape enables the optical lens of the first preferred embodiment to have a relatively large aperture, which is beneficial for reducing the diameters of the front lenses so as to meet the requirement of miniaturization and lower the cost. Especially when the aperture L6 is arranged between the first lens L1 and the second lens L2, the first lens L1 in the double concave shape allows a wider angel range of imaging light passing through the aperture L6. Meanwhile, the second lens L2 has a positive power, thereby facilitating the convergence of the light diverging in front (particularly referring to the light emitted from the first lens L1), to facilitate correction of the aberrations.

Furthermore, as shown in Table 1 and Table 2, a focal length of the first lens L1 and a focal length of the optical lens of the first preferred embodiment satisfy the formulas: $-0.9 \leq F1/F \leq -2$, wherein the F1 is the focal length of the first lens L1 and the F is the focal length of the entire optical lens of the first preferred embodiment.

As shown in FIG. 1 of the drawings, the first lens L1 of the optical lens of the first preferred embodiment of the present invention has two concave surfaces of S1 and S2, and the second lens L2 has two convex surfaces of S4 and S5, wherein the two concave surfaces S1, S2 of the first lens L1 face towards the object side and the image side respectively and the two convex surfaces S4, S5 of the second lens L2 face towards the object side and the image side respectively. As shown in the FIG. 1 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S5 thereof is arranged to face towards the image side.

As shown in FIG. 1 of the drawings, furthermore, the third lens L3 of the optical lens of the first preferred embodiment has two convex surfaces of S6 and S7, and the fourth Lens L4 has two concave surfaces of S7 and S8. The two convex surfaces S6, S7 of the third lens L3 face towards the object side and the image side respectively and the two concave surfaces of the fourth Lens L4 S7, S8 face towards the object side and the image side respectively, wherein convex surface S7, facing the image side, of the third lens L3 and the concave surface S7, facing towards the object side, of the fourth Lens L4 are arranged face to face. In other word, the convex surface S7 of the third lens L3 and the concave surface S7 of the fourth lens L4 are overlapped with each other, so that the surface S7 can be regarded as the convex surface S7 of the third lens L3 or the concave surface S7 of the fourth Lens L4. Accordingly, the first lens L1, the second lens L2, the third lens L3, and the fourth Lens L4 of the optical lens of the first preferred embodiment of the present invention are double-surfaced lenses. As shown in FIG. 1 of the drawings, the convex surface S6 of the third lens L3 is arranged to face towards the object side, while the other convex surface S7 thereof is arranged to face towards the image side, and the concave surface S7 of the fourth lens L3 is arranged to face towards the object side while the other concave surface S8 thereof is arranged to face towards the image side. Accordingly, the first lens L1 is a double concave lens, the second lens L2 is a double convex lens, the third lens L3 is a double convex lens and the fourth lens L4 is a double concave lens. As shown in FIG. 1 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens with at least one aspherical surface. Preferably, the surface S9 of the fifth lens L5 is arranged to face towards the object side and the other surface S10 thereof is arranged to face towards the image side. More preferably, of the two surfaces of the fifth lens L5, one is a concave surface and the other is a convex surface respectively. For example, the surface S9 of the fifth lens L5 is a concave surface and the surface S10 is a convex surface.

As shown in FIG. 1 of the drawings, the achromatic lens group of the optical lens according to the first preferred embodiment of the present invention is preferably a cemented lens. In other words, the third lens L3 and the fourth lens L4 are adhered together to form the achromatic lens group. On this point, since the third lens L3 and the fourth lens L4 are adhered together, the convex surface S7 of the third lens L3 and the concave surface S7 of the fourth lens L4 are overlapped together, while the convex surface S7 of the third lens L3 and the concave surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture L6 can be arranged between the third lens L3 and the fourth lens L4.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs to be set to have a high refractive index, a large aperture and/or relatively large thickness for converging the light. Consequently, the first lens L1 of the optical lens in the first preferred embodiment is arranged to have a refractive index Nd (1)≤1.8. Preferably, the refractive index of the first lens L1 is set not more than 1.65 (Nd (1)≤1.6) to prevent excessive divergence of the imaging light, which is illustrated in Table 1. In other words, when the refractive index of the material of the first lens L1 is set not more than 1.65, the imaging effect is relatively preferable. In addition, in order for preventing the aberration, after the imaging light passing through the first lens L1, is too large, the first lens L1 is arranged to be made of material having an abbe constant Vd (1) no less than 40 (Vd (1)≥40). Preferably, the first lens L1 is made of a material having an abbe constant Vd (1) no less than 55 (Vd(1)≥55), which is shown in Table 1. In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.73 (Nd (2)≥1.73), which is shown in Table 1. In other words, the refractive index of the material of the second lens L2 is arranged not less than 1.73. In addition, the abbe constant of the second lens L2 is defined as Vd (2) and the Vd (2) is not less than 40 (Vd (2)≤40). Preferably, the Vd (2) is provided ranging from 40 to 65 (65≥Vd (2)≥40), to effectively correct the axial chromatic aberration, which is shown in Table 1 and Table 2. Thus, both of the first lens L1 and the second lens L2 can be made of relatively inexpensive glass material.

Referring to FIG. 1 of the drawings, the structural configuration of an optical lens of a specific embodiment of the present invention is illustrated, wherein the optical lens, in order from the object side to the image side, comprises a front lens group having positive power, an aperture element L6, a rear lens group having positive power, a IR filter L7, and an imaging plane L8.

The front lens group, in order from the object side to the image side, comprises a double concave positive first lens L1 and a double convex positive second lens L2. The rear lens group, in order from the object side to the image side, comprises a third lens, a fourth lens, and a fifth lens, wherein the third lens and the fourth lens form a cemented lens; the fifth lens is a positive aspherical lens having a meniscus shape with two concave surfaces facing in the same direction;

Preferably, The fifth lens L5 is a plastic aspherical lens. That is, the fifth lens L5 is made of plastic material, so that the weight of the optical lens can be reduced, and the cost thereof can be reduced accordingly.

The third lens of the cemented lens has negative power and double convex shape, the fourth lens of the cemented lens has positive power and double concave shape, and the two concave surfaces of the fifth lens both face towards the object side.

The first lens L1 in the embodiment of the present invention satisfies the following formulas:

$Nd(1) \leq 1.65, Vd(1) \geq 55,$ wherein the Nd (1) is the refractive index of the material of the first lens, and the Vd (1) is the abbe constant of the material of the first lens. The first lens L1 with relative low refractive index prevents the light coming from the object to diverge too much at the time of passing through the double concave (or meniscus) lens such as the fifth lens. Meanwhile, the first lens satisfies the following formula:

$-0.9 \geq F1/F \geq -2.0,$ wherein the F1 is the focal length of the first lens L1 and the F is the focal length of the entire optical lens, thereby keeping a relatively good balance between the dimensions of the first lens L1 and the aberration of the entire optical lens system.

The second lens L2, in the embodiment of the present invention, satisfies the following formulas:

$Nd(2) \geq 1.73, Vd(2) \geq 40,$ wherein the Nd (2) is the refractive index of the material of the second lens L2, and the Vd (2) is the abbe constant of the second lens L2.

The second lens L2 with high refractive index further ensures that the imaging light coming from the object side could be smoothly transmitted to the rear lens group, and enables the optical lens to have the optical performance of large aperture, while the second lens L2 with the feature that the Vd (2) is no less than 40, can effectively correct the axial chromatic aberration of the optical lens.

The focal length of the front lens group, the focal length of the rear lens group and the focal length of the entire optical lens satisfy the following formulas:

$2.5 \geq F(\text{Front})/F \geq 1.3, 3 \geq F(\text{Rear})/F \geq 1.5,$ wherein F (Front) is the focal length of the front lens group, the F (Rear) is the focal length of the rear lens group and the F is the focal length of the entire optical lens. The front lens group and rear lens group with a reasonable distribution of the proportion between the powers thereof, not only can effectively control the effective aperture of the front end of the optical lens as well as the back focal thereof, but also can effectively eliminate the senior aberration and distortion of the whole optical lens system.

the fifth lens in this embodiment satisfies the following formulas:

$|r9-r10|<2,$ and $F5/F>2,$ wherein the r9 is the radius of the fifth lens L5 at the object side, the r10 is the radius of the fifth lens L5 at the image side, the F5 is the focal length of the fifth lens L5, and the F is the focal length of the entire optical lens. By using the fifth lens L5 (The last lens of the optical lens), which is in similar concentric circle shape with aspherical surfaces, and the power thereof is set relatively low (long focal length), the imaging light can be effectively converged eventually, to correct the aberration of the optical lens system, especially the distortion of the optical lens. Moreover, since the lens has been made into an aspherical lens, the conventional difficult in machining concentric circles on the spherical lens is not existed any more.

The aspheric lens surface of the fifth lens L5 satisfies the following formula:

$$Z(h) = \frac{ch^2}{1 + \sqrt{1-(1+k)c^2h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E are high-order aspheric coefficients thereof.

Furthermore, the total length of the optical lens satisfies the following formula:

$TTL/F \leq 4.5;$ wherein the TTL is the total length of the optical lens, which, in other words, it refers to the distance from the outermost point of the object side of the first lens to the imaging focal plane of the optical lens, and the F is the focal length of the entire optical lens.

The F number of the lens assembly satisfies the following formula:

$FNO \leq 1.8,$ wherein FNO is the F number of the entire optical lens;

The Field of view FOV of the lens assembly satisfies the following formula:

$80° \geq FOV \geq 40°;$

The maximum light-passing aperture of the first lens L1, the corresponding height of the image and the Field of view FOV of the optical lens satisfy the following formula:

$D/h/FOV \leq 0.025,$ wherein the FOV is the maximum Field of view FOV of the optical lens, the d is the maximum light-passing aperture of the concave surface (facing the object side) of the first lens L1 corresponding to the maximum FOV, and the h is the height of the image corresponding to the maximum FOV.

Preferably, The first lens, the second lens, the third lens, and the fourth lens are spherical glass lenses, and the fifth lens L5 is an aspherical plastic lens.

Figure 2:
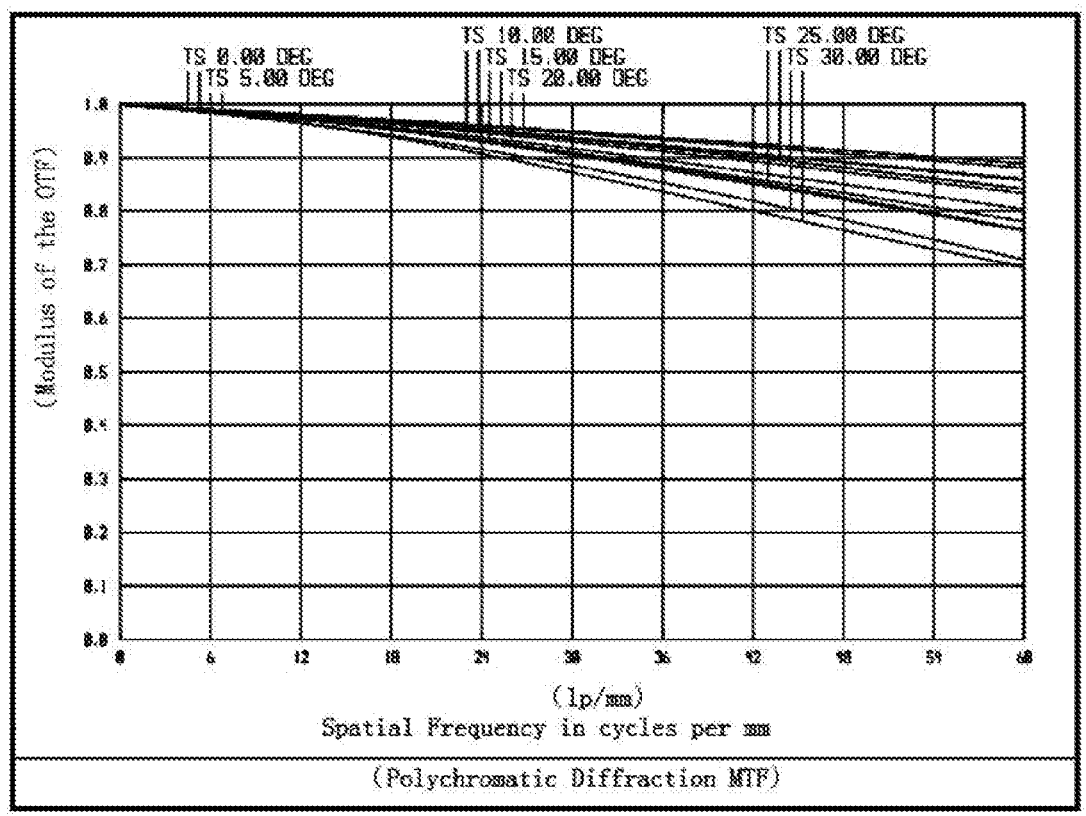
FIG. 2 is a MTF graph of the optical lens in accordance with the first preferred embodiment.
Figure 3:
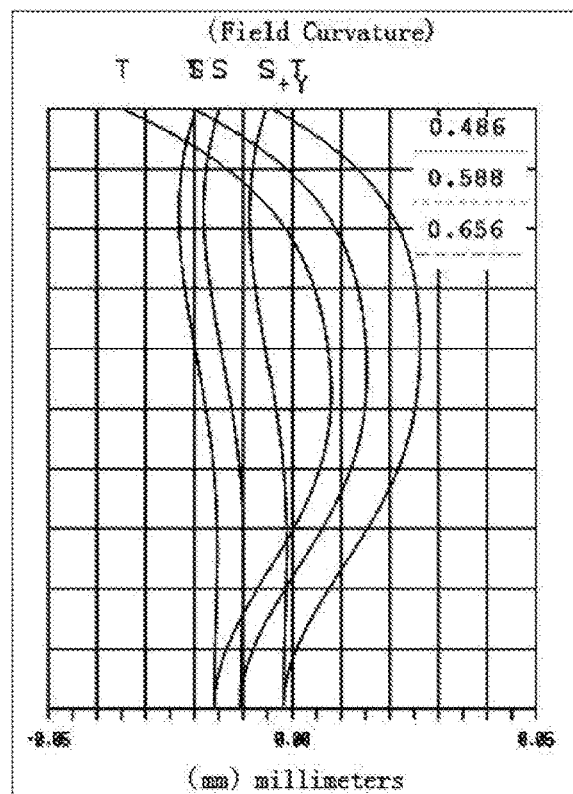
FIG. 3 is an astigmatism graph of the optical lens in accordance with the first preferred embodiment.
Figure 4:
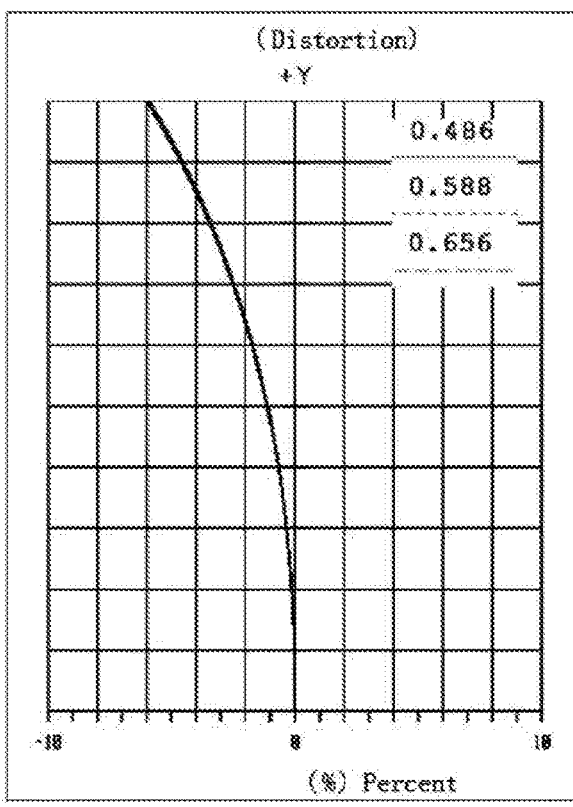
FIG. 4 is a distortion graph of the optical lens in accordance with the first preferred embodiment.

FIG. 2-FIG. 4 are optical performance graphs of the optical lens of the first preferred embodiment. FIG. 2 is a MTF graph of the optical lens as shown in FIG. 1. FIG. 3 is an astigmatism graph of the optical lens as shown in the FIG. 1, which is illustrated in terms of the wavelength of the common tricolor light and the unit thereof is millimeter; FIG. 4 is a distortion graph of the optical lens in the FIG. 1, illustrating that the distortion values under different field of views after Normalization, and the unit thereof is percentage. As shown in the FIG. 2 to FIG. 4, the optical lens has a relative good optical performance.

As shown in Table 1 and Table 2, F=4.8 mm, FNO=1.8, FOV=58°, TTL=18.3 Mm, wherein F is the focal length of the optical lens, FNO is the F number, FOV is the field of view, and the TTL is the total length of the optical lens, in the first preferred embodiment.

It is needed to point out that the two surfaces of the first lens L1 are indicated by S1 and S2, the two surfaces of the second lens L2 are indicated by S3 and S4, the surface of the aperture element is indicated by S5, the two surfaces of the third lens L3 are indicated by S6, and S7; the two surfaces of the fourth lens L4 are indicated by S7 and S8; the two surfaces of the fifth lens L5 are indicated by S9 and S10, and the two surfaces of the IR filter are indicated by S11 and S12. The S1-S12 correspond with the surface sequences in the following Table 1 respectively, and the IMA is the imaging surface of the image plane L8.

TABLE 1

Parameters of the optical lens of this embodiment

| Surf. | Curvature radius r | Central thickness d | Refractive index Nd | Abbe constant Vd | Valid caliber D |
|---|---|---|---|---|---|
| 1 | −13.11 | 0.8 | 1.5168 | 64.17 | 6.21 |
| 2 | 4.08 | 2.91207 | | | 5.22 |
| 3 | 8.68 | 4.53 | 1.8040 | 46.57 | 5.54 |
| 4 | −8.99 | 0.3 | | | 4.73 |
| 5 | Infinity | −0.25 | | | 4.05 |
| 6 | 6.94 | 2.9 | 1.8040 | 46.57 | 4.05 |
| 7 | −4.2 | 0.6 | 1.8466 | 23.83 | 3.53 |
| 8 | 7.95 | 1.142021 | | | 3.33 |
| 9 | −3.9 | 1.8 | 1.5119 | 56.29 | 3.48 |
| 10 | −2.67 | 0.1 | | | 4.37 |
| 11 | Infinity | 0.55 | 1.5168 | 64.17 | 4.53 |
| 12 | Infinity | 3.168352 | | | 4.58 |
| IMA | Infinity | | | | 5.10 |

TABLE 2 aspherical coefficients: K, A, B, C, D, E

| Surf | K | A | B | C | D | E |
|---|---|---|---|---|---|---|
| 9 | 2.221677 | −6.6961822e−3 | 4.582483e−4 | 3.851286e−4 | −1.4718713e−4 | −3.89594e−5 |
| 10 | 0.08071 | 3.87872e−3 | −4.004942e−4 | 3.734137e−4 | −6.496614e−5 | 7.588872e−6 |

Based on the above data, the values for the related formulas involved in the present embodiment are as follows:

|r9-10|=1.23, F5/F=2.35, F(Front)/F=1.84, F(Rear)/F=2.4, TTL/F=3.8, D/h/FOV=0.02. As shown in Table 1 and Table 2, the above data are only used as a specific set of exemplary parameters of the optical lens in the present embodiment, and the optical lens with these parameters could achieve better optical performance.

In summary, the optical lens disclosed in the present invention has a five-piece lens structure and a design of aspherical lens, which can not only meets the requirements of the low cost and miniaturization, but also achieve a good imaging of large aperture, high-pixel, small distortion, high resolution as well as effective corrections of the various of aberrations of the optical system, and is capable of maintaining a good imaging resolution within the temperature range of −40° C.-85° C., which is particularly suitable for monitoring and vehicle mounted camera system, which are used both day and night or working in poor lighting condition.

Figure 5:
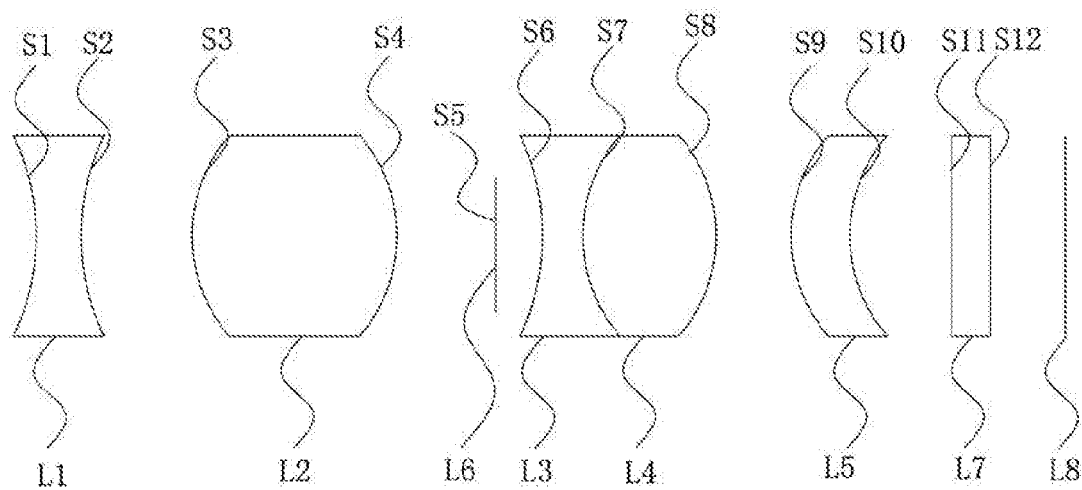
FIG. 5 is a schematic diagram of the configuration of the optical lens in accordance with a second preferred embodiment.

Referring to FIG. 5 to FIG. 8 of the drawings, an optical lens according to a second preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the third lens L3 and/or the fourth lens is/are aspherical lens (lenses). As shown in FIG. 5, the first lens L1 and the second lens L2 can be provided as spherical glass lenses, and the third lens L3, the fourth lens L4 and the fifth lens L5 can be provided as aspherical plastic lenses. More preferably, the first lens L1, the second lens L2, the third lens L3 and/or the fourth Lens L4 are aspherical lenses to improve the optical performance of the optical lens of the second preferred embodiment.

Alternatively, the first lens L1, the second lens L2, the third lens L3 and/or the fourth Lens L4 can be spherical lenses.

As shown in FIG. 5, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5.

As shown in FIG. 5 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side.

As shown in FIG. 5 of the drawings, the optical centers of the first lens L1, the second lens L2, the third lens L3, the fourth Lens L4 and the fifth lens L5 of the optical lens in the second preferred embodiment are coaxial.

As shown in FIG. 5 of the drawings, the optical lens of the second preferred embodiment further comprises an aperture L6, wherein the front lens group and the rear lens group are arranged at two sides of the aperture L6 and the optical center thereof is coaxial with the optical centers of the first lens L1, the second lens L2, the third lens L3, the fourth Lens L4 and the fifth lens L5. Preferably, the aperture L6 is arranged between the first lens L1 and the second lens L2. Alternatively, the aperture L6 can be arranged between the second lens L2 and the third lens L3.

Alternatively, the aperture L6 can be arranged in the rear lens group and the optical center thereof is coaxial with the optical centers of the first lens L1, the second lens L2, the third lens L3, the fourth Lens L4 and the fifth lens L5. In some embodiments of the present invention, the aperture L6 also can be arranged between the achromatic lens group and the fifth lens L5. Furthermore, the aperture L6 also can be arranged in the achromatic lens group, for example the aperture L6 can be arranged at the third lens L3 or the fourth Lens L4. In other embodiments, the aperture L6 can be arranged between the front lens group and the rear lens group.

It is understood that the first lens L1 in double concave shape enables the optical lens of the second preferred embodiment to have a relatively large aperture, which is beneficial for reducing the diameters of the front lenses to meet the requirement of miniaturization and lower the cost. Especially when the aperture L6 is arranged between the first lens L1 and the second lens L2, the first lens L1 in double concave shape allows a wider angel range of imaging light passing through the aperture L6. Meanwhile, the second lens L2 has a positive power, thereby facilitating the convergence of the light diverging in front (particularly referring to the light emitted from the first lens L1) to facilitate correction of the aberrations.

Furthermore, as shown in Table 3 and Table 4, the focal length of the first lens L1 and the focal length of the optical lens of the second preferred embodiment satisfy the formula: $-0.9 \geq F1/F \geq -2$, wherein the F1 is the focal length of the first lens L1 and the F is the focal length of the optical lens of the second preferred embodiment.

As shown in FIG. 5 of the drawings, the first lens L1 of the optical lens of the second preferred embodiment of the present invention has two concave surfaces of S1 and S2, and the second lens L2 has two convex surfaces of S4 and S5, wherein the two concave surfaces S1, S2 of the first lens L1 face towards the object side and the image side respectively and the two convex surfaces S4, S5 of the second lens L2 face towards the object side and the image side respectively. As shown in the FIG. 5 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S5 thereof is arranged to face towards the image side.

As shown in FIG. 5 of the drawings, furthermore, the third lens L3 of the optical lens of the second preferred embodiment has two concave surfaces of S6 and S7, and the fourth Lens L4 has two convex surfaces of S7 and S8. The two concave surfaces S6, S7 of the third lens L3 face towards the object side and the image side respectively and the two convex surfaces of the fourth Lens L4 S7, S8 face towards the object side and the image side respectively, wherein concave surface S7, facing towards the image side, of the third lens L3 and the convex surface S7, facing towards the object side, of the fourth Lens L4 are arranged face to face. In other word, the concave surface S7 of the third lens L3 and the convex surface S7 of the fourth lens L4 are overlapped with each other, so that the surface S7 can be regarded as the concave surface S7 of the third lens L3 or the convex surface S7 of the fourth Lens L4. Accordingly, the first lens L1, the second lens L2, the third lens L3, and the fourth Lens L4 of the optical lens of the second preferred embodiment of the present invention are double-surfaced lenses. As shown in FIG. 5 of the drawings, the concave surface S6 of the third lens L3 is arranged to face towards the object side, while the other concave surface S7 thereof is arranged to face towards the image side, and the convex surface S7 of the fourth lens L3 is arranged to face towards the object side while the other convex surface S8 thereof is arranged to face towards the image side. Accordingly, the first lens L1 is a double concave lens, the second lens L2 is a double convex lens, the third lens L3 is a double concave lens and the fourth lens L4 is a double convex lens. As shown in FIG. 5 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens and has at least one aspherical surface. Preferably, the surface S9 of the fifth lens L5 is arranged to face towards the object side and the other surface S10 thereof is arranged to face towards the image side. More preferably, of the two surfaces of the fifth lens L5, one is a concave surface and the other is a convex surface respectively. For example, the surface S9 of the fifth lens L5 is a convex surface and the surface S10 is a concave surface.

As shown in FIG. 5 of the drawings, the achromatic lens group of the optical lens according to the second preferred embodiment of the present invention is preferably a cemented lens. In other words, the third lens L3 and the fourth lens L4 are adhered together to form the achromatic lens group. On this point, since the third lens L3 and the fourth lens L4 are adhered together, the concave surface S7 of the third lens L3 and the convex surface S7 of the fourth lens L4 are overlapped together, while the concave surface S7 of the third lens L3 and the convex surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture L6 can be arranged between the third lens L3 and the fourth lens L4.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs to be set to have a high refractive index, a large aperture and/or relatively large thickness for converging the light. Consequently, the first lens L1 of the optical lens in the second preferred embodiment is arranged to have a refractive index Nd (1)≤1.8. Preferably, the refractive index of the first lens L1 is set not more than 1.65 (Nd (1)≤1.65) to prevent excessive divergence of the imaging light, which is illustrated in Table 3. In other words, the refractive index of the material of the first lens L1 is set not more than 1.65. In addition, in order for preventing the aberration, after the imaging light passing through the first lens L1, to be too large, the first lens L1 is arranged to be made of material having an abbe constant Vd (1) no less than 40 (Vd (1)≥40). Preferably, the first lens L1 is made of a material having an abbe constant Vd (1) no less than 55 (Vd (1)≥55), which is shown in Table 3. In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.73 (Nd (2)≥1.73), which is shown in Table 3. In other words, the refractive index of the material of the second lens L2 is arranged not less than 1.73. In addition, the abbe constant of the second lens L2 is defined as Vd (2) and the Vd (2) is not less than 40 (Vd (2)≥40). Preferably, the Vd (2) is provided ranging from 40 to 65 (65≥Vd (2)≥40), to effectively correct the axial chromatic aberration, which is shown in Table 3 and Table 4. Thus, both of the first lens L1 and the second lens L2 can be made of relatively inexpensive glass material.

Referring to FIG. 5 to FIG. 8 of the drawings and indicated by Table 3 and Table 4, the differences existed between the second preferred embodiment and the first preferred embodiment of the present invention are the structures of the cemented lens of the rear lens group and the orientations of the two concave surfaces of the fifth lens L5.

Referring to FIG. 5 of the drawings, the structural configuration of an optical lens of a specific embodiment of the present invention is illustrated, wherein the optical lens, in order from the object side to the image side, comprises a front lens group having positive power, an aperture element L6, a rear lens group having positive power, a IR filter L7, and an imaging plane L8.

The front lens group, in order from the object side to the image side, comprises a double concave negative first lens L1 and a double convex positive second lens L2. The rear lens group, in order from the object side to the image side, comprises a third lens, a fourth lens, and a fifth lens, wherein the third lens and the fourth lens form a cemented lens; the fifth lens is a positive aspherical lens having a meniscus shape with two concave surfaces facing in the same direction;

Preferably, The fifth lens L5 is a plastic aspherical lens. That is, the fifth lens L5 is made of plastic material, so that the weight of the optical lens can be reduced, and the cost thereof can be reduced accordingly.

The third lens of the cemented lens has negative power with double concave shape, the fourth lens of the cemented lens has positive power with double convex shape, and the two convex surfaces of the fifth lens both face the image side.

The first lens L1 in the embodiment of the present invention satisfies the following formulas:

$Nd(1) \leq 1.65, Vd(1) \geq 55,$ wherein the Nd (1) is the refractive index of the material of the first lens, and the Vd (1) is the abbe constant of the material of the first lens. The first lens L1 with relative low refractive index prevents the light coming from the object to diverge too much when passing through the double concave (or meniscus) lens such as the fifth lens. Meanwhile, the first lens satisfies the following formula:

$-0.9 \geq F1/F \geq -2.0,$ wherein the F1 is the focal length of the first lens L1 and the F is the focal length of the entire optical lens, thereby keeping a relatively good balance between the dimensions of the first lens L1 and the aberration of the entire optical lens system.

The second lens L2, in the embodiment of the present invention, satisfies the following formulas:

$Nd(2) \geq 1.73, Vd(2) \geq 40,$ wherein the Nd (2) is the refractive index of the material of the second lens L2, and the Vd (2) is the abbe constant of the second lens L2.

The second lens L2 with high refractive index further ensures that the imaging light coming from the object side could be smoothly transmitted to the rear lens group, and enables the optical lens to have the optical performance of large aperture, while the second lens L2 with the feature that the Vd (2) is no less than 40, can effectively correct the axial chromatic aberration of the optical lens.

The focal length of the front lens group, the focal length of the rear lens group and the focal length of the entire optical lens satisfy the following formulas:

$2.5 \geq F(\text{Front})/F \geq 1.3, 3 \geq F(\text{Rear})/F \geq 1.5,$ wherein F (Front) is the focal length of the front lens group, the F (Rear) is the focal length of the rear lens group and the F is the focal length of the entire optical lens. The front lens group and rear lens group with a reasonable distribution of the proportion between the powers thereof, not only can effectively control the effective aperture of the front end of the optical lens as well as the back focal thereof, but also can effectively eliminate the senior aberration and distortion of whole optical lens system.

the fifth lens in this embodiment satisfies the following formulas:

$|r9-r10|<2,$ and $F5/F>2,$ wherein the r9 is the radius of the fifth lens L5 in the object side, the r10 is the radius of the fifth lens L5 in the image side, the F5 is the focal length of the fifth lens L5, and the F is the focal length of the entire optical lens. By using the fifth lens L5 (The last lens of the optical lens), which is in similar concentric circle shape with aspherical surfaces, and the power thereof is set relatively low (long focal length), the imaging light can be effectively converged eventually, to correct the aberration of the optical lens system, especially the distortion of the optical lens. Moreover, since the lens has been made into an aspherical lens, the conventional difficult in machining concentric circles on the spherical lens is not existed any more.

The aspheric lens surface of the fifth lens L5 satisfies the following formula:

$$Z(h) = \frac{ch^2}{1+\sqrt{1-(1+k)c^2h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E are high-order aspheric coefficients thereof.

Furthermore, the total length of the optical lens satisfies the following formula:

TTL/F≤4.5;

wherein the TTL is the total length of the optical lens, which, in other words, it refers to the distance from the outermost point of the object side of the first lens to the imaging focal plane of the optical lens, and the F is the focal length of the entire optical lens.

The F number of the lens assembly satisfies the following formula:

FNO≤1.8, wherein FNO is the F number of the entire optical lens;
The Field of view FOV of the lens assembly satisfies the following formula:

80°≥FOV≥40°;

The maximum light-passing aperture of the first lens L1, the corresponding height of the image and the Field of view FOV of the lens assembly satisfy the following formula:

D/h/FOV≤0.025, wherein the FOV is the maximum Field of view FOV of the optical lens, the d is the maximum light-passing aperture of the concave surface (facing the object side) of the first lens L1 corresponding to the maximum FOV, and the h is the height of the image corresponding to the maximum FOV.

Preferably, The first lens, the second lens, the third lens, and the fourth lens are spherical glass lenses, and the fifth lens L5 is an aspherical plastic lens.

Figure 6:
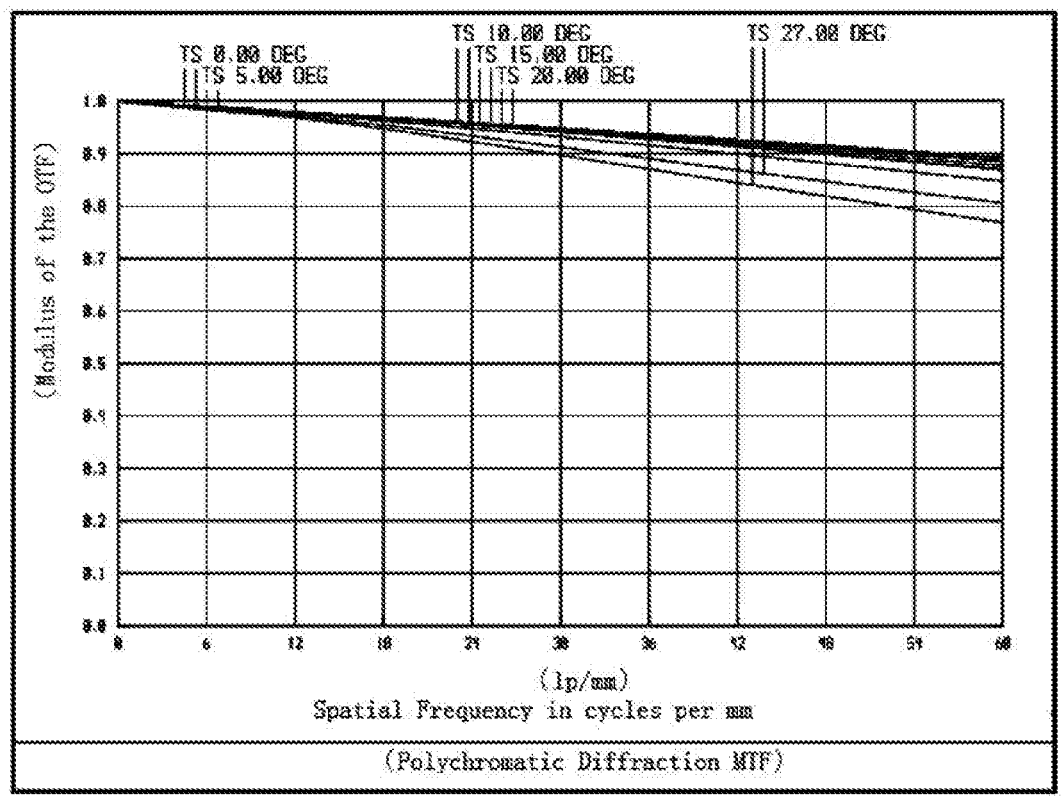
FIG. 6 is a MTF graph of the optical lens in accordance with the second preferred embodiment.
Figure 7:
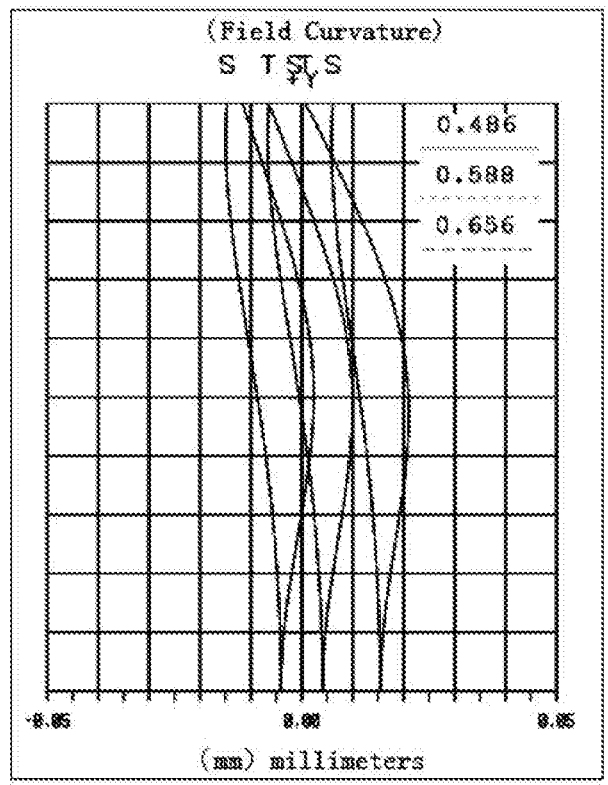
FIG. 7 is an astigmatism graph of the optical lens in accordance with the second preferred embodiment.
Figure 8:
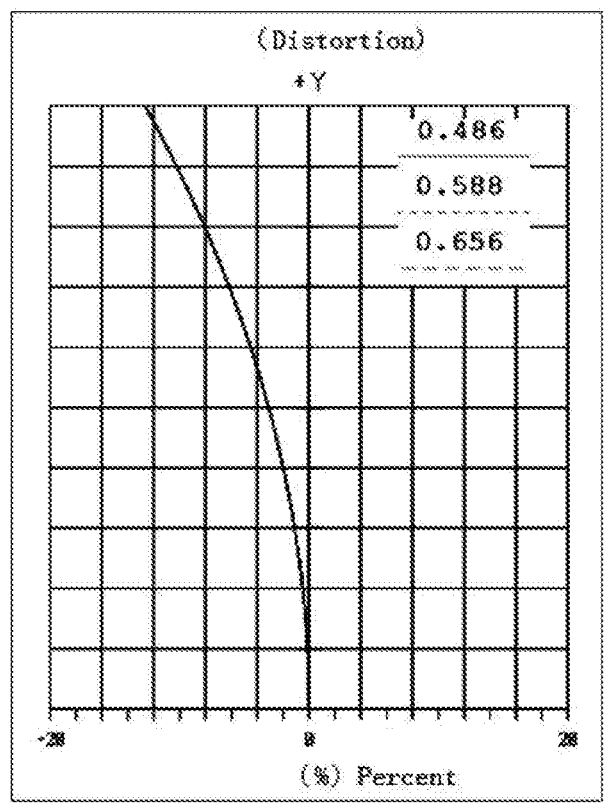
FIG. 8 is a distortion graph of the optical lens in accordance with the second preferred embodiment.

FIG. 6-FIG. 8 are optical performance graphs of the optical lens of the second preferred embodiment. FIG. 6 is a MTF graph of the optical lens as shown in FIG. 5. FIG. 7 is an astigmatism graph of the optical lens as shown in the FIG. 5, which is illustrated in terms of the wavelength of the common tricolor light and the unit thereof is millimeter; FIG. 8 is a distortion graph of the optical lens in the FIG. 5, showing that the distortion values under different field of views after Normalization, and the unit thereof is percentage. As shown in the FIG. 6 to FIG. 8, the optical lens has a relative good optical performance.

As shown in Table 3 and Table 4, F=4.8 mm, FNO=1.8, FOV=58°, TTL=19.87 Mm, wherein F is the focal length of the optical lens, FNO is the F number, FOV is the field of view, and the TTL is the total length of the optical lens, in the second preferred embodiment.

It is needed to point out that the two surfaces of the first lens L1 are indicated by S1 and S2, the two surfaces of the second lens L2 are indicated by S3 and S4, the surface of the aperture element is indicated by S5, the two surfaces of the third lens L3 are indicated by S6, and S7; the two surfaces of the fourth lens L4 are indicated by S7 and S8; the two surfaces of the fifth lens L5 are indicated by S9 and S10, and the two surfaces of the IR filter are indicated by S11 and S12. The S1-S12 corresponds with the surface sequences in the following Table 3 respectively, and the IMA is the imaging surface of the image plane L8.

TABLE 3

Parameters of the lens assembly

| Surf. | Curvature radius r | Central thickness d | Refractive index Nd | Abbe constant Vd | Valid caliber D |
|---|---|---|---|---|---|
| 1 | −19.3808 | 1.0 | 1.5168 | 64.20 | 6 |
| 2 | 4.2627 | 3.713 | | | 5.95 |
| 3 | 6.3101 | 2.8 | 1.8040 | 46.57 | 5.95 |
| 4 | −21.6038 | 2.2805 | | | 5.95 |
| 5 | Infinity | 0.5165 | | | 3.26 |
| 6 | −4.5564 | 0.6 | 1.5825 | 30.15 | 3.32 |
| 7 | 2.0801 | 2.1673 | 1.5343 | 55.31 | 4.44 |
| 8 | −3.1304 | 0.1 | | | 4.74 |
| 9 | 5.2512 | 2.8 | 1.5116 | 56.82 | 4.94 |
| 10 | 6.2999 | 0.5 | | | 4.7 |
| 11 | Infinity | 0.55 | 1.5168 | 64.17 | 4.8 |
| 12 | Infinity | 2.8377 | | | 4.8 |
| IMA | Infinity | | | | 4.8 |

TABLE 4 aspherical coefficients: K, A, B, C, D, E

| Surf | K | A | B | C | D | E |
|---|---|---|---|---|---|---|
| 6 | 1.894298 | −6.159775e−3 | 2.579719e−3 | −1.294451e−3 | 4.576726e−4 | −6.969921e−5 |
| 7 | −7.614985 | 0.032296 | −0.011562 | 1.535845e−3 | 1.225181e−4 | −3.358289e−5 |
| 8 | −0.117924 | 3.372294e−3 | −4.535520e−5 | 7.184249e−5 | 4.618733e−6 | −2.683947e−6 |
| 9 | 0.517756 | −7.579037e−4 | 2.657419e−4 | 1.756984e−6 | −6.666333e−6 | 1.298568e−7 |
| 10 | 4.531809 | −9.500159e−3 | 3.963406e−4 | −3.297135e−5 | 4.144505e−6 | −2.205231−6 |

Based on the above data, the values for the related formulas involved in the present embodiment are as follows:
|r9-10|=1, F5/F=7, F(Front)/F=1.63, F(Rear)/F=20.8, TTL/F=4.2, D/h/FOV=0.022. As shown in Table 3 and Table 4, the above data are only used as a specific set of exemplary parameters of the optical lens in the present embodiment, and the optical lens with these parameters could achieve better optical performance.

In summary, the optical lens disclosed in the present invention has a five-piece lens structure and a design of aspherical lens, which can not only meets the requirements of the low cost and miniaturization, but also achieve a good imaging of large aperture, high-pixel, small distortion, high resolution as well as effective corrections of the various of aberrations of the optical system, and is capable of maintaining a good imaging resolution within the temperature range of −40° C.-85° C., which is particularly suitable for monitoring and vehicle mounted camera system, which are used both day and night or working in poor lighting condition.

Referring to FIG. 9 to FIG. 12 of the drawings, an optical lens according to a third preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the first lens L1, the second lens L2, the third lens L3 and/or the fourth Lens L4 are aspherical lens, to improve the optical performance of the optical lens of the third preferred embodiment. Alternatively, the first lens L1, the second lens L2, the third lens L3 and/or the fourth Lens L4 are spherical lenses.

Figure 9:
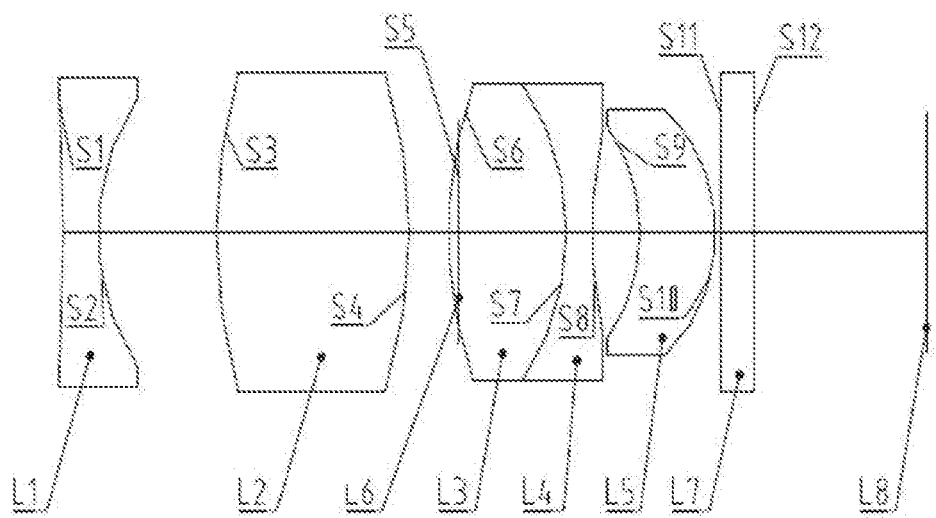
FIG. 9 is a schematic diagram of the configuration of the optical lens in accordance with a third preferred embodiment.

As shown in FIG. 9, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5.

As shown in FIG. 9 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side.

As shown in FIG. 9 of the drawings, the optical centers of the first lens L1, the second lens L2, the third lens L3, the fourth Lens L4 and the fifth lens L5 of the optical lens in the third preferred embodiment are coaxial.

As shown in FIG. 9 of the drawings, the optical lens of the third preferred embodiment further comprises an aperture L6, wherein the front lens group and the rear lens group are arranged at two sides of the aperture L6 and the optical center thereof is coaxial with the optical centers of the first lens L1, the second lens L2, the third lens L3, the fourth Lens L4 and the fifth lens L5. Preferably, the aperture L6 is arranged between the first lens L1 and the second lens L2. Alternatively, the aperture L6 can be arranged between the second lens L2 and the third lens L3, which is shown in FIG. 9.

Alternatively, the aperture L6 can be arranged in the rear lens group and the optical center thereof is coaxial with the optical centers of the first lens L1, the second lens L2, the third lens L3, the fourth Lens L4 and the fifth lens L5. In some embodiments of the present invention, the aperture L6 also can be arranged between the achromatic lens group and the fifth lens L5. Furthermore, the aperture L6 also can be arranged in the achromatic lens group, for example the aperture L6 can be arranged at the third lens L3 or the fourth Lens L4. In other embodiments, the aperture L6 can be arranged between the front lens group and the rear lens group.

It is understood that the first lens L1 in double concave shape enables the optical lens of the third preferred embodiment to have a relatively large aperture, which is beneficial for reducing the diameters of the front lenses so as to meet the requirement of miniaturization and lower the cost. Especially when the aperture L6 is arranged between the first lens L1 and the second lens L2, the first lens L1 in double concave shape allows a wider angel range of imaging light passing through the aperture L6. Meanwhile, the second lens L2 has a positive power, thereby facilitating the convergence of the light diverging in front (particularly referring to the light emitted from the first lens L1) to facilitate correction of the aberrations.

Furthermore, as shown in table 5 and table 6, the focal length of the first lens L1 and the focal length of the optical lens of the third preferred embodiment satisfy the formula: $-0.9 \geq F1/F \geq -2$, wherein the F1 is the focal length of the first lens L1 and the F is the focal length of the optical lens of the third preferred embodiment.

As shown in FIG. 9 of the drawings, the first lens L1 of the optical lens of the third preferred embodiment of the present invention has two concave surfaces of S1 and S2, and the second lens L2 has two convex surfaces of S4 and S5, wherein the two concave surfaces S1, S2 of the first lens L1 face towards the object side and the image side respectively and the two convex surfaces S4, S5 of the second lens L2 face towards the object side and the image side respectively. As shown in the FIG. 9 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S5 thereof is arranged to face towards the image side.

As shown in FIG. 9 of the drawings, furthermore, the third lens L3 of the optical lens of the first preferred embodiment has two convex surfaces of S6 and S7, and the fourth Lens L4 has two concave surfaces of S7 and S8. The two convex surfaces S6, S7 of the third lens L3 face towards the object side and the image side respectively and the two concave surfaces of the fourth Lens L4 S7, S8 face towards the object side and the image side respectively, wherein convex surface S7, facing the image side, of the third lens L3 and the concave surface S7, facing towards the object side, of the fourth Lens L4 are arranged face to face. In other word, the convex surface S7 of the third lens L3 and the concave surface S7 of the fourth lens L4 are overlapped with each other, so that the surface S7 can be regarded as the convex surface S7 of the third lens L3 or the concave surface S7 of the fourth Lens L4. Accordingly, the first lens L1, the second lens L2, the third lens L3, and the fourth Lens L4 of the optical lens of the first preferred embodiment of the present invention are double-surfaced lenses.

As shown in FIG. 9 of the drawings, the convex surface S6 of the third lens L3 is arranged to face towards the object side, while the other convex surface S7 thereof is arranged to face towards the image side, and the concave surface S7 of the fourth lens L3 is arranged to face towards the object side while the other concave surface S8 thereof is arranged to face towards the image side. Accordingly, the first lens L1 is a double concave lens, the second lens L2 is a double convex lens, the third lens L3 is a double convex lens and the fourth lens L4 is a double concave lens. As shown in FIG. 9 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens and has at least one aspherical surface. Preferably, the surface S9 of the fifth lens L5 is arranged to face towards the object side and the other surface S10 thereof is arranged to face towards the image side. More preferably, of the two surfaces of the fifth lens L5, one is a concave surface and the other is a convex surface respectively. For example, the surface S9 of the fifth lens L5 is a concave surface and the surface S10 is a convex surface.

As shown in FIG. 9 of the drawings, the achromatic lens group of the optical lens according to the third preferred embodiment of the present invention is preferably a cemented lens. In other words, the third lens L3 and the fourth lens L4 are adhered together to form the achromatic lens group. On this point, since the third lens L3 and the fourth lens L4 are adhered together, the concave surface S7 of the third lens L3 and the convex surface S7 of the fourth lens L4 are overlapped together, while the concave surface S7 of the third lens L3 and the convex surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture L6 can be arranged between the third lens L3 and the fourth lens L4.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs to be set to have a high refractive index, a large aperture and/or relatively large thickness for converging the light. Consequently, the first lens L1 of the optical lens in the third preferred embodiment is arranged to have a refractive index Nd (1)≤1.80. In other words, the refractive index of the material of the first lens L1 is set not more than 1.8, which is shown in Table 5. In addition, in order for preventing the aberration, after the imaging light passing through the first lens L1, too large, the first lens L1 is arranged to be made of material having an abbe constant Vd (1) no less than 40 (Vd (1)≥40). Preferably, the first lens L1 is made of a material having an abbe constant Vd (1) no less than 55 (Vd (1)≥55), which is shown in table 5. In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.73 (Nd (2)≥1.73), which is shown in table 5. In other words, the refractive index of the material of the second lens L2 is arranged not less than 1.73. In addition, the abbe constant of the second lens L2 is defined as Vd (2) and the Vd (2) is not less than 40 (Vd (2)≥40). Preferably, the Vd (2) is provided ranging from 40 to 65 (65≥Vd (2)≥40), to effectively correct the axial chromatic aberration, which is shown in table 5 and table 6. Thus, both of the first lens L1 and the second lens L2 can be made of relatively inexpensive glass material.

Referring to FIG. 9 to FIG. 12 of the drawings and indicated by table 5 and table 6, the differences existed between the third preferred embodiment of the present invention are the specific parameters of the first lens L1, the second lens L2, the third lens L3, the fourth lens L4 and the fifth lens L5. Especially, the parameters of the first lens L1, the second lens L2, the third lens L3, the fourth lens L4 and the fifth lens L5 are different, so that the first lens L1 can be made of material having different properties.

Referring to FIG. 9 of the drawings, the structural configuration of an optical lens of a specific embodiment of the present invention is illustrated, wherein the optical lens, in order from the object side to the image side, comprises a front lens group having positive power, an aperture element L6, a rear lens group having positive power, a IR filter L7, and an imaging plane L8.

The front lens group, in order from the object side to the image side, comprises a double concave negative first lens L1 and a double convex positive second lens L2. The rear lens group, in order from the object side to the image side, comprises a third lens, a fourth lens, and a fifth lens, wherein the third lens and the fourth lens form a cemented lens; the fifth lens is positive aspherical lens having a meniscus shape with two concave surfaces facing in the same direction.

Preferably, the fifth lens L5 is a plastic aspherical lens. That is, the fifth lens L5 is made of plastic material, so that the weight of the optical lens can be reduced, and the cost thereof can be reduced accordingly.

The third lens of the cemented lens has negative power and has a double convex shape, the fourth lens of the cemented lens has positive power and has a double concave shape, and the two concave surfaces of the fifth lens both face the object side.

The first lens L1 in the embodiment of the present invention satisfies the following formulas:

Nd (1)≤1.8, Vd (1)≥40, wherein the Nd (1) is the refractive index of the material of the first lens, and the Vd (1) is the abbe constant of the material of the first lens. The first lens L1 with relative low refractive index prevents the light coming from the object diverging too much when passing through the double concave (or meniscus) lens such as the fifth lens. Meanwhile, the first lens satisfies the following formula:

−0.9≥F1/F≥−2.0, wherein the F1 is the focal length of the first lens L1 and the F is the focal length of the entire optical lens, thereby keeping a relatively good balance between the dimensions of the first lens L1 and the aberration of the entire optical lens system.

The second lens L2, in the embodiment of the present invention, satisfies the following formulas:

Nd (2)≥1.73, Vd (2)≥40, wherein the Nd (2) is the refractive index of the material of the second lens L2, and the Vd (2) is the abbe constant of the second lens L2.

The second lens L2 with high refractive index further ensures that the imaging light coming from the object side could be smoothly transmitted to the rear lens group, and enables the optical lens to have the optical performance of large aperture, while the second lens L2 with the feature that the Vd (2) is no less than 40, can effectively correct the axial chromatic aberration of the optical lens.

The focal length of the front lens group, the focal length of the rear lens group and the focal length of the entire optical lens satisfy the following formulas:

2.5≥F(Front)/F≥1.3, 3≥F (Rear)/F≥1.5, wherein F (Front) is the focal length of the front lens group, the F (Rear) is the focal length of the rear lens group and the F is the focal length of the entire optical lens. The front lens group and rear lens group with a reasonable distribution of the proportion between the powers thereof, not only can effectively control the effective aperture of the front end of the optical lens as well as the back focal thereof, but also can effectively eliminate the senior aberration and distortion of whole optical lens system.

the fifth lens in this embodiment satisfies the following formulas:

|r9-10|<2, and F5/F>2, wherein the r9 is the radius of the fifth lens L5 in the object side, the r10 is the radius of the fifth lens L5 in the image side, the F5 is the focal length of the fifth lens L5, and the F is the focal length of the entire optical lens. By using the fifth lens L5 (The last lens of the optical lens), which is in similar concentric circle shape with aspherical surfaces, and the power thereof is set relatively low (long focal length), the imaging light can be effectively converged eventually, to correct the aberration of the optical lens system, especially the distortion of the lens assembly. Moreover, since the lens has been made into an aspherical lens, the conventional difficult in machining concentric circles on the spherical lens is not existed any more.

The aspheric lens surface of the fifth lens L5 satisfies the following formula:

$$Z(h) = \frac{ch^2}{1+\sqrt{1-(1+k)c^2h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E represent high-order aspheric coefficients thereof.

Preferably, the first lens L1, the second lens L2, the third lens L3, and the fourth lens L4 are spherical glass lenses, and the fifth lens L5 is an aspherical plastic lens.

Figure 10:
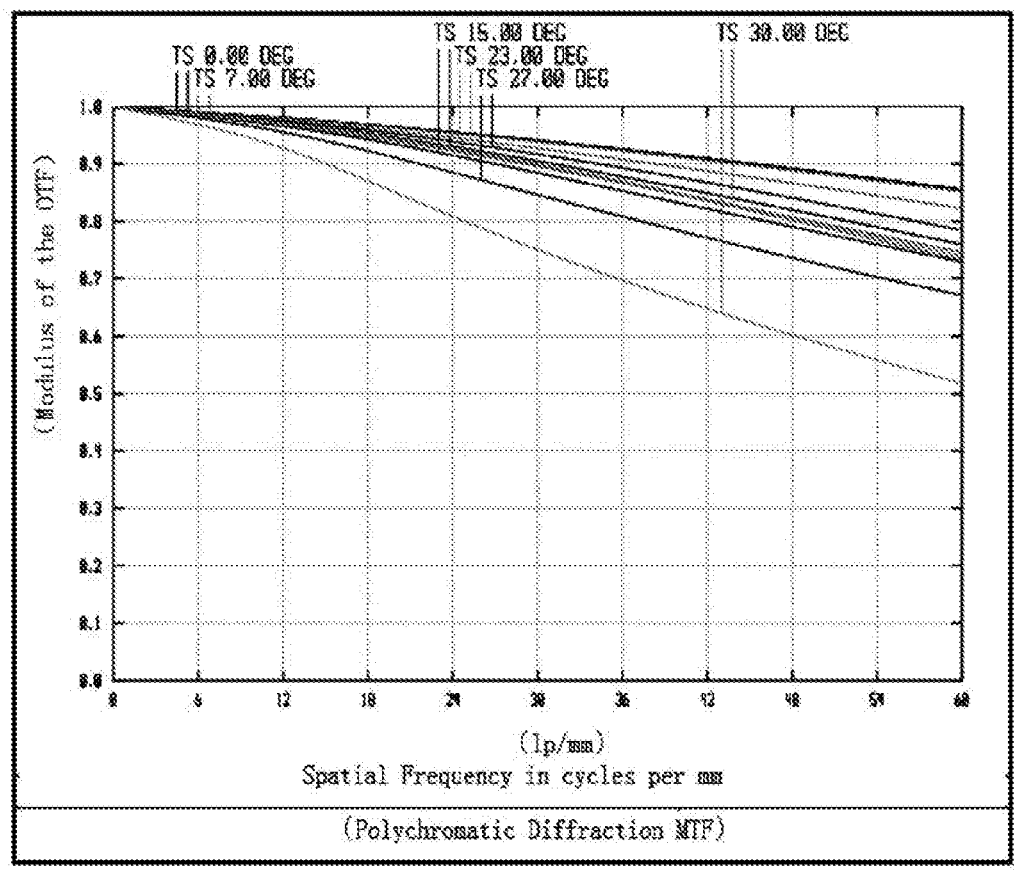
FIG. 10 is a MTF graph of the optical lens in accordance with the third preferred embodiment.
Figure 11:
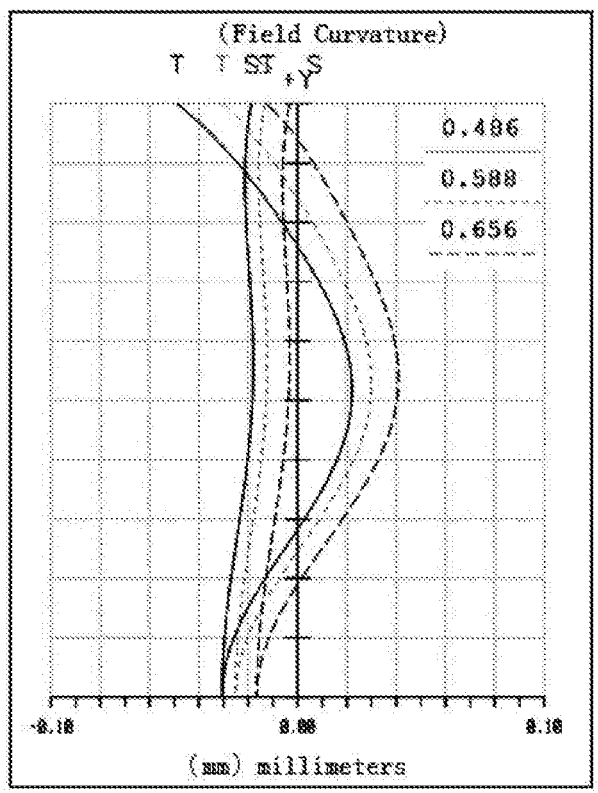
FIG. 11 is an astigmatism graph of the optical lens in accordance with the third preferred embodiment.
Figure 12:
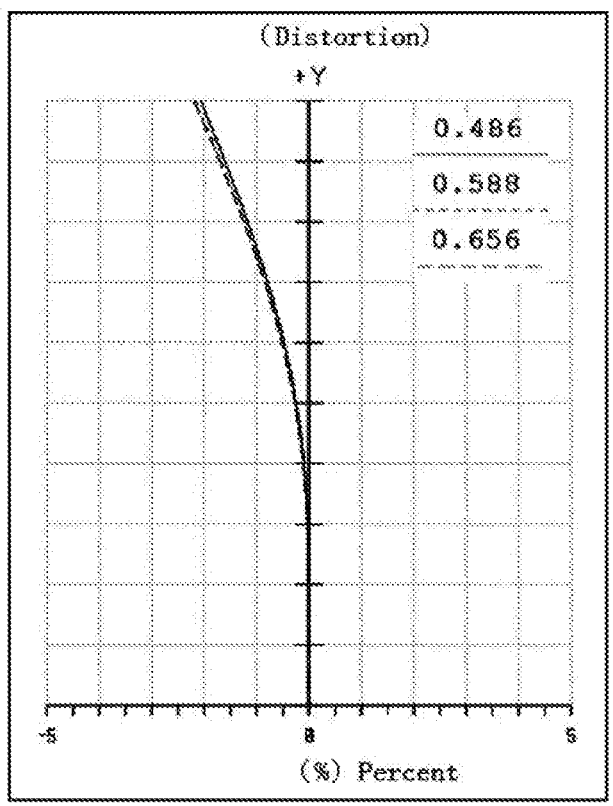
FIG. 12 is a distortion graph of the optical lens in accordance with the third preferred embodiment.

FIG. 10-FIG. 12 are optical performance graphs of the optical lens of the third preferred embodiment. FIG. 10 is a MTF graph of the optical lens indicated in FIG. 9. FIG. 11 is an astigmatism graph of the optical lens illustrated in the FIG. 9, which is illustrated in terms of the wavelength of the common tricolor light and the unit thereof is millimeter; FIG. 12 is a distortion graph of the optical lens in the FIG. 9, showing that the distortion values under different field of views after Normalization, and the unit thereof is percentage. As shown in the FIG. 10 to FIG. 12, the optical lens has a relative good optical performance.

As shown in table 5 and table 6, F=3.9 mm, FNO=2.0, FOV=60°, TTL=17.94 Mm, wherein F is the focal length of the optical lens, FNO is the F number, FOV is the field of view, and the TTL is the total length of the entire optical lens, in the third preferred embodiment.

As shown in Table 5 and Table 6, the curvature radius of the concave surface S1 facing towards the object side is −48.335 (from the object side to image side), the curvature radius of the concave surface S2 facing towards the image side is 3.717 (from the object side to image side), the refractive index of the first lens L1 is 1.71, the abbe constant of the first lens L1 is 53.8; the curvature radius of the convex surface S4 facing towards the object side is 5.950 (from the object side to image side), the curvature radius of the concave surface S5 facing towards the image side is −7.570 (from the object side to image side), the refractive index of the second lens L2 is 1.80, the abbe constant of the second lens L2 is 46.6. According to FIG. 10, FIG. 11, and FIG. 12, the optical lens of the present invention has preferable optical performance.

TABLE 5

Parameters of the lens assembly

| Surf. | Curvature radius r | Central thickness d | Refractive index Nd | Abbe constant Vd |
|---|---|---|---|---|
| 1 | −48.335 | 0.800 | 1.71 | 53.8 |
| 2 | 3.717 | 2.750 | | |
| 3 | 5.950 | 4.460 | 1.80 | 46.6 |
| 4 | −7.570 | 0.904 | | |
| STO | Infinity | −0.250 | | |
| 6 | 5.682 | 2.930 | 1.80 | 46.6 |
| 7 | −4.370 | 0.600 | 1.85 | 23.8 |
| 8 | 5.241 | 1.103 | | |
| 9 | −6.368 | 1.750 | 1.51 | 56.3 |
| 10 | −2.564 | 0.100 | | |
| 11 | Infinity | 0.950 | 1.52 | 64.2 |
| 12 | Infinity | 1.839 | | |
| IMA | Infinity | | | |

TABLE 6 aspherical coefficients: K, A, B, C, D, E

| Surf | K | A | B | C | D | E |
|---|---|---|---|---|---|---|
| 9 | 5.133 | −1.60000E−03 | 9.70883E−04 | −2.96888E−04 | −5.85596E−05 | 3.68100E−06 |
| 10 | −3.2 | 2.04873E−03 | −1.39479E−03 | 4.74043E−04 | −7.24495E−05 | 6.32194E−06 |

At least one of the two surfaces of the fifth lens L5 is an aspherical surface, to improve the optical performance of the optical lens of the third preferred embodiment of the present invention, while meeting the requirement of miniaturization.

As shown in table 5 and table 6, the above data are only used as a specific set of example parameters of the optical lens in the present embodiment, and the optical lens with these parameters could achieve better optical performance.

In summary, the optical lens according to the third preferred embodiment of the present invention enable the miniaturization of the entire optical lens to be made suitable for use in the vehicle mounted field under the condition of high pixel, small distortion and high definition imaging. In addition, the parameters of the respective lenses of the optical lens according to the third preferred embodiment of the present invention can be made stable in an environment where the temperature change is larger. In other words, the optical lens of the third preferred embodiment of the present invention can be miniaturized and capable of stabilizing imaging at a large temperature range the optical lens disclosed in the present invention has a five-piece lens structure and a design of aspherical lens, which can not only meets the requirements of the low cost and miniaturization, but also achieve a good imaging of large aperture, high-pixel, small distortion, high resolution as well as effective corrections of the various of aberrations of the optical system, and is capable of maintaining a good imaging resolution within the temperature range of −40° C.-85° C., which is particularly suitable for monitoring and vehicle mounted camera system, which are used both day and night or working in poor lighting condition.

Referring to FIG. 13 to FIG. 16 of the drawings, an optical lens according to a fourth preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the first lens L1, the second lens L2, the third lens L3 and/or the fourth Lens L4 are aspherical lens, to improve the optical performance of the optical lens of the fourth preferred embodiment. Alternatively, the first lens L1, the second lens L2, the third lens L3 and/or the fourth Lens L4 are spherical lenses.

Figure 13:
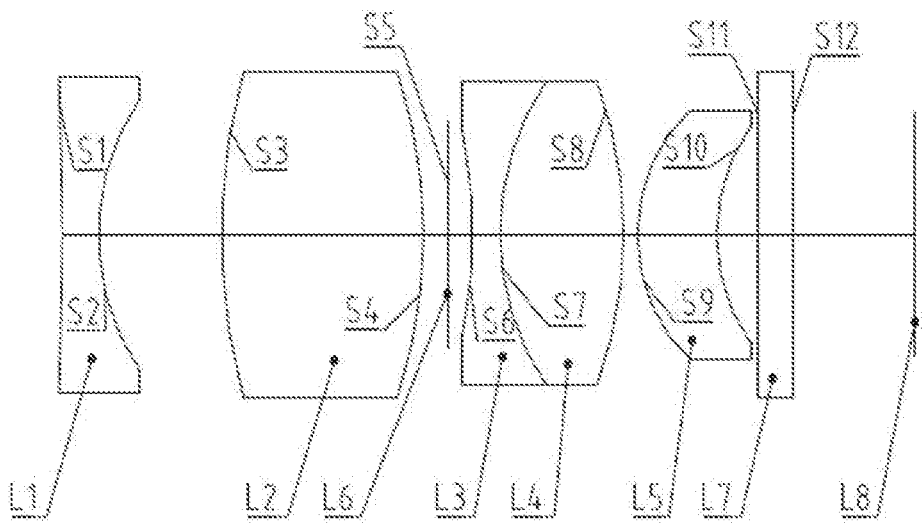
FIG. 13 is a schematic diagram of the configuration of the optical lens in accordance with a fourth preferred embodiment.

As shown in FIG. 13, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5.

As shown in FIG. 13 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side.

As shown in FIG. 13 of the drawings, the optical centers of the first lens L1, the second lens L2, the third lens L3, the fourth Lens L4 and the fifth lens L5 of the optical lens in the fourth preferred embodiment are coaxial.

As shown in FIG. 13 of the drawings, the optical lens of the fourth preferred embodiment further comprises an aperture L6, wherein the front lens group and the rear lens group are arranged at two sides of the aperture L6 and the optical center thereof is coaxial with the optical centers of the first lens L1, the second lens L2, the third lens L3, the fourth Lens L4 and the fifth lens L5. Preferably, the aperture L6 is arranged between the first lens L1 and the second lens L2. Alternatively, the aperture L6 can be arranged between the second lens L2 and the third lens L3, which is shown in FIG. 13.

Alternatively, the aperture L6 can be arranged in the rear lens group and the optical center thereof is coaxial with the optical centers of the first lens L1, the second lens L2, the third lens L3, the fourth Lens L4 and the fifth lens L5. In some embodiments of the present invention, the aperture L6 also can be arranged between the achromatic lens group and the fifth lens L5. Furthermore, the aperture L6 also can be arranged in the achromatic lens group, for example the aperture L6 can be arranged at the third lens L3 or the fourth Lens L4. In other embodiments, the aperture L6 can be arranged between the front lens group and the rear lens group.

It is understood that the first lens L1 in double concave shape enables the optical lens of the fourth preferred embodiment to have a relatively large aperture, which is beneficial for reducing the diameters of the front lenses so as to meet the requirement of miniaturization and lower the cost. Especially when the aperture L6 is arranged between the first lens L1 and the second lens L2, the first lens L1 in double concave shape allows a wider angel range of imaging light passing through the aperture L6. Meanwhile, the second lens L2 has a positive power, thereby facilitating the convergence of the light diverging in front (particularly referring to the light emitted from the first lens L1), to facilitate correction of the aberrations.

Furthermore, as shown in Table 7 and table 8, the focal length of the first lens L1 and the focal length of the optical lens of the fourth preferred embodiment satisfy the formulas: $-0.9 \geq F1/F \geq -2$, wherein the F1 is the focal length of the first lens L1 and the F is the focal length of the optical lens of the fourth preferred embodiment.

As shown in FIG. 13 of the drawings, the first lens L1 of the optical lens of the fourth preferred embodiment of the present invention has two concave surfaces of S1 and S2, and the second lens L2 has two convex surfaces of S4 and S5, wherein the two concave surfaces S1, S2 of the first lens L1 face towards the object side and the image side respectively and the two convex surfaces S4, S5 of the second lens L2 face towards the object side and the image side respectively. As shown in the FIG. 13 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S5 thereof is arranged to face towards the image side.

As shown in FIG. 13 of the drawings, furthermore, the third lens L3 of the optical lens of the second preferred embodiment has two concave surfaces of S6 and S7, and the fourth Lens L4 has two convex surfaces of S7 and S8. The two concave surfaces S6, S7 of the third lens L3 face towards the object side and the image side respectively and the two convex surfaces of the fourth Lens L4 S7, S8 face towards the object side and the image side respectively, wherein concave surface S7, facing the image side, of the third lens L3 and the convex surface S7, facing towards the object side, of the fourth Lens L4 are arranged face to face. In other word, the concave surface S7 of the third lens L3 and the convex surface S7 of the fourth lens L4 are overlapped with each other, so that the surface S7 can be regarded as the concave surface S7 of the third lens L3 or the convex surface S7 of the fourth Lens L4. Accordingly, the first lens L1, the second lens L2, the third lens L3, and the fourth Lens L4 of the optical lens of the second preferred embodiment of the present invention are double-surfaced lenses. As shown in FIG. 13 of the drawings, the concave surface S6 of the third lens L3 is arranged to face towards the object side, while the other concave surface S7 thereof is arranged to face towards the image side, and the convex surface S7 of the fourth lens L3 is arranged to face towards the object side while the other convex surface S8 thereof is arranged to face towards the image side. Accordingly, the first lens L1 is a double concave lens, the second lens L2 is a double convex lens, the third lens L3 is a double concave lens and the fourth lens L4 is a double convex lens. As shown in FIG. 13 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens and has at least one aspherical surface. Preferably, the surface S9 of the fifth lens L5 is arranged to face towards the object side and the other surface S10 thereof is arranged to face towards the image side. More preferably, of the two surfaces of the fifth lens L5, one is a concave surface and the other is a convex surface respectively. For example, the surface S9 of the fifth lens L5 is a convex surface and the surface S10 is a concave surface.

As shown in FIG. 13 of the drawings, the achromatic lens group of the optical lens according to the fourth preferred embodiment of the present invention is preferably a cemented lens. In other words, the third lens L3 and the fourth lens L4 are adhered together to form the achromatic lens group. On this point, since the third lens L3 and the fourth lens L4 are adhered together, the concave surface S7 of the third lens L3 and the convex surface S7 of the fourth lens L4 are overlapped together, while the concave surface S7 of the third lens L3 and the convex surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture L6 can be arranged between the third lens L3 and the fourth lens L4.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs to be set to have a high refractive index, a large aperture and/or relatively large thickness for converging the light. Consequently, the first lens L1 of the optical lens in the fourth preferred embodiment is arranged to have a refractive index Nd (1)≤1.80. In other words, the refractive index of the material of the first lens L1 is set not more than 1.8, which is shown in Table 7 and Table 8. In addition, in order for preventing the aberration, after the imaging light passing through the first lens L1, too large, the first lens L1 is arranged to be made of material having an abbe constant Vd (1) no less than 40 (Vd (1)≥40). In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.73 (Nd (2)≥1.73), which is shown in Table 7 and Table 8. In other words, the refractive index of the material of the second lens L2 is arranged not less than 1.73. In addition, the abbe constant of the second lens L2 is defined as Vd (2) and the Vd (2) is not less than 40 (Vd (2)≥40). Preferably, the Vd (2) is provided ranging from 40 to 65 (65≥Vd (2)≥40), to effectively correct the axial chromatic aberration, which is shown in table 5 and table 6. Thus, both the first lens L1 and the second lens L2 can be made of relatively inexpensive glass material.

Referring to FIG. 13 to FIG. 16 of the drawings and indicated by table 5 and Table, the differences existed between the fourth preferred embodiment and the first preferred embodiment of the present invention are the structures of the cemented lens of the rear lens group and the orientations of the two concave surfaces of the fifth lens L5.

Referring to FIG. 13 of the drawings, the structural configuration of an optical lens of a specific embodiment of the present invention is illustrated, wherein the optical lens, in order from the object side to the image side, comprises a front lens group having positive power, an aperture element L6, a rear lens group having positive power, a IR filter L7, and an imaging plane L8.

The front lens group, in order from the object side to the image side, comprises a double concave positive first lens L1 and a double convex positive second lens L2. The rear lens group, in order from the object side to the image side, comprises a third lens, a fourth lens, and a fifth lens, wherein the third lens and the fourth lens form a cemented lens; the fifth lens is positive aspherical lens having a meniscus shape with two concave surfaces facing in the same direction.

Preferably, the fifth lens L5 is a plastic aspherical lens. That is, the fifth lens L5 is made of plastic material, so that the weight of the optical lens can be reduced, and the cost thereof can be reduced accordingly.

The third lens of the cemented lens has negative power and has double convex shape, the fourth lens of the cemented lens has positive power and has double concave shape, and the two concave surfaces of the fifth lens both face the image side.

The first lens L1 in the embodiment of the present invention satisfies the following formulas:

Nd (1)≤1.8, Vd (1)≥40, wherein the Nd (1) is the refractive index of the material of the first lens, and the Vd (1) is the abbe constant of the material of the first lens. The first lens L1 with relative low refractive index prevents the light coming from the object diverging too much when passing through the double concave (or meniscus) lens such as the fifth lens. Meanwhile, the first lens satisfies the following formula:

−0.9≥F1/F≥−2.0, wherein the F1 is the focal length of the first lens L1 and the F is the focal length of the entire optical lens, thereby keeping a relatively good balance between the dimensions of the first lens L1 and the aberration of the entire optical lens system.

The second lens L2, in the embodiment of the present invention, satisfies the following formulas:

Nd (2)≥1.73, Vd (2)≥40, wherein the Nd (2) is the refractive index of the material of the second lens L2, and the Vd (2) is the abbe constant of the second lens L2.

The second lens L2 with high refractive index further ensures that the imaging light coming from the object side could be smoothly transmitted to the rear lens group, and enables the optical lens to have the optical performance of large aperture, while the second lens L2 with the feature that the Vd (2) is no less than 40, can effectively correct the axial chromatic aberration of the optical lens.

The aspheric lens surface of the fifth lens L5 satisfies the following formula:

$$Z(h) = \frac{ch^2}{1 + \sqrt{1 - (1+k)c^2 h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E represent high-order aspheric coefficients thereof.

Preferably, the first lens L1 and the second lens L2 are spherical glass lenses, and, the third lens L3, the fourth lens L4 and the fifth lens L5 are aspherical plastic lenses.

Figure 14:
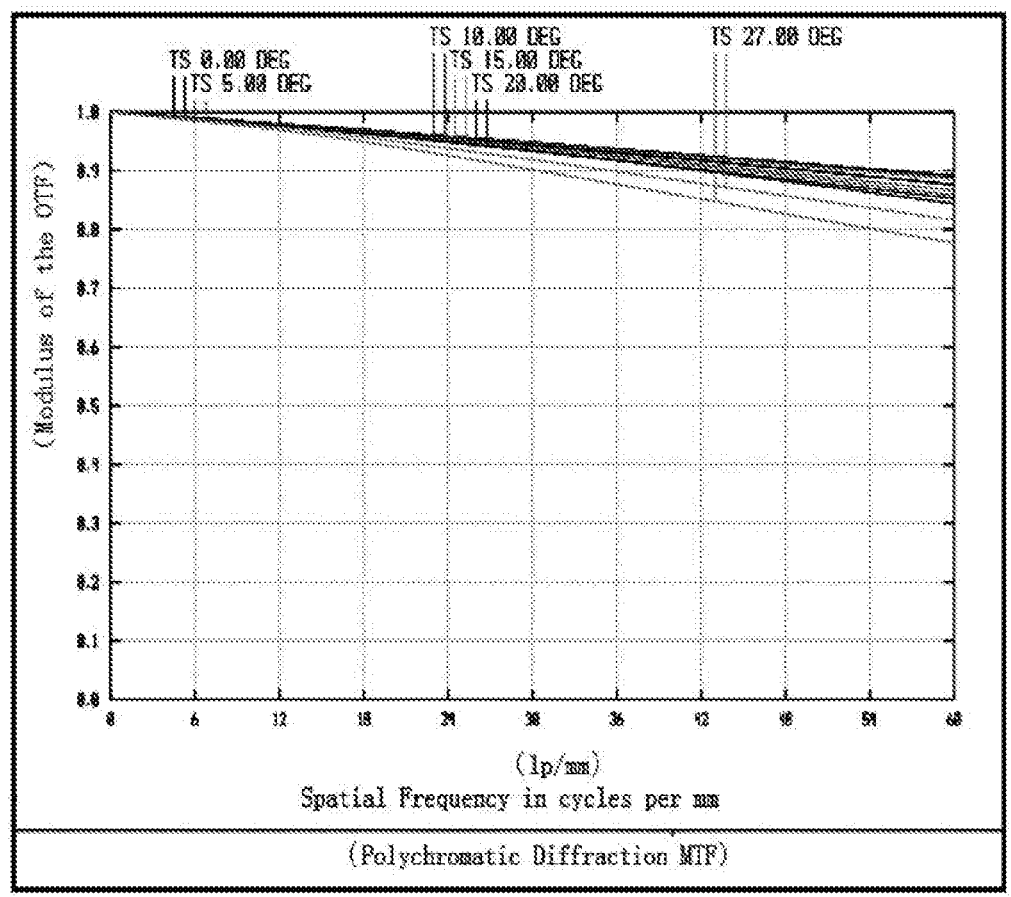
FIG. 14 is a MTF graph of the optical lens in accordance with the fourth preferred embodiment.
Figure 15:
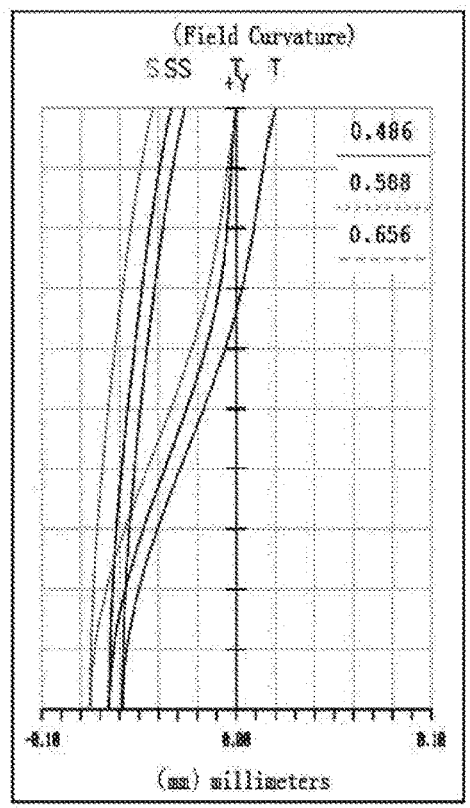
FIG. 15 is an astigmatism graph of the optical lens in accordance with the fourth preferred embodiment.
Figure 16:
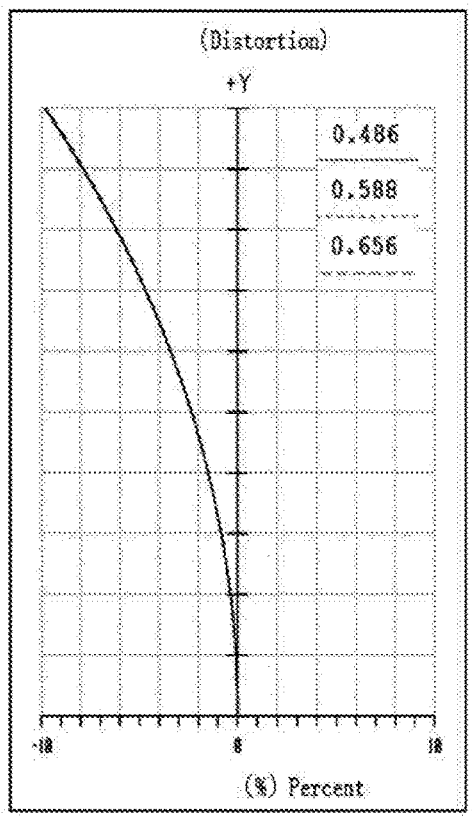
FIG. 16 is a distortion graph of the optical lens in accordance with the fourth preferred embodiment.

FIG. 14-FIG. 16 are optical performance graphs of the optical lens of the fourth preferred embodiment. FIG. 14 is a MTF graph of the optical lens indicated in FIG. 13. FIG. 15 is an astigmatism graph of the optical lens as shown in the FIG. 13, which is illustrated in terms of the wavelength of the common tricolor light and the unit thereof is millimeter; FIG. 16 is a distortion graph of the optical lens in the FIG. 13, showing that the distortion values under different field of views after Normalization, and the unit thereof is percentage. As shown in the FIG. 14 to FIG. 16, the optical lens has a relative good optical performance.

It is needed to point out that the two surfaces of the first lens L1 are indicated by S1 and S2, the two surfaces of the second lens L2 are indicated by S3 and S4, the surface of the aperture element is indicated by S5, the two surfaces of the third lens L3 are indicated by S6, and S7; the two surfaces of the fourth lens L4 are indicated by S7 and S8; the two surfaces of the fifth lens L5 are indicated by S9 and S10, and the two surfaces of the IR filter are indicated by S11 and S12. The S1-S12 corresponds with the surface sequences in the following Table 7 respectively, and the IMA is the imaging surface of the image plane L8.

As shown in Table 7 and Table 8, the curvature radius of the concave surface S1 facing towards the object side is −19.457 (from the object side to image side), the curvature radius of the concave surface S2 facing towards the image side is 4.280 (from the object side to image side), the refractive index of the first lens L1 is 1.75, the abbe constant of the first lens L1 is 52.3; the curvature radius of the convex surface S4 facing towards the object side is 6.313 (from the object side to image side), the curvature radius of the concave surface S5 facing towards the image side is −21.612 (from the object side to image side), the refractive index of the second lens L2 is 1.80, the abbe constant of the second lens L2 is 46.57. According to FIG. 14, FIG. 15 and FIG. 16, the optical lens of the present invention has preferable optical performance, as shown in FIG. 13 to FIG. 16.

TABLE 7

Parameters of the lens assembly

| Surf. | Curvature radius r | Central thickness d | Refractive index Nd | Abbe constant Vd |
|---|---|---|---|---|
| 1 | −19.457 | 1.004 | 1.75 | 52.3 |
| 2 | 4.280 | 2.713 | | |
| 3 | 6.313 | 2.801 | 1.80 | 46.57 |
| 4 | −21.612 | 2.281 | | |
| STO | Infinity | 0.514 | | |
| 6 | −4.577 | 0.603 | 1.84 | 42.7 |
| 7 | 4.088 | 2.176 | 1.75 | 52.3 |
| 8 | −3.143 | 0.100 | | |
| 9 | 5.278 | 2.814 | 1.51 | 56.82 |
| 10 | 6.332 | 1.000 | | |
| 11 | Infinity | 0.701 | 1.52 | 64.17 |
| 12 | Infinity | 2.358 | | |
| IMA | Infinity | | | |

TABLE 8 aspherical coefficients: K, A, B, C, D, E

| Surf | K | A | B | C | D | E |
|---|---|---|---|---|---|---|
| 6 | 1.894298 | −6.07712E−03 | 2.52228E−03 | −1.25428E−03 | 4.39495E−04 | −6.63308E−05 |
| 7 | −7.61499 | 3.19178E−02 | −1.13368E−02 | 1.49418E−03 | 1.18261E−04 | −3.21623E−05 |
| 8 | −0.11792 | 3.33277E−03 | −4.44728E−04 | 6.98934E−05 | 4.45825E−06 | −2.57041E−07 |
| 9 | 0.517756 | −7.46451E−04 | 2.59083E−04 | 1.69566E−06 | −6.36868E−06 | 1.22806E−07 |
| 10 | 4.531809 | −9.35661E−03 | 3.86409E−04 | −3.18205E−05 | 3.95945E−06 | −2.08549E−06 |

At least one of the two surfaces of the fifth lens L5 is an aspherical surface, to improve the optical performance of the optical lens of the fourth preferred embodiment of the present invention. Preferably, the first lens L1 and the second lens L2 are spherical glass lenses, and the third lens L3, the fourth lens L4, and the fifth lens L5 are an aspherical plastic lens, which is shown in Tables 7 and Table 8.

So that the optical lens according to the fourth preferred embodiment of the present invention is adapted to be miniaturized and has better imaging performance.

As shown in Table 7 and Table 8, the above data are only used as a specific set of example parameters of the optical lens in the present embodiment, and the optical lens with these parameters could achieve better optical performance.

In summary, the optical lens according to the fourth preferred embodiment of the present invention enable the miniaturization of the entire optical lens to be made suitable for use in the vehicle mounted field under the condition of high pixel, small distortion and high definition imaging. In addition, the parameters of the respective lenses of the optical lens according to the fourth preferred embodiment of the present invention can be made stable in an environment where the temperature change is larger. In other words, the optical lens of the fourth preferred embodiment of the present invention can be miniaturized and capable of stabilizing imaging at a large temperature range. Thus, the optical lens disclosed in the present invention has a five-piece lens structure and a design of aspherical lens, which can not only meets the requirements of the low cost and miniaturization, but also achieve a good imaging of large aperture, high-pixel, small distortion, high resolution as well as effective corrections of the various of aberrations of the optical system, and is capable of maintaining a good imaging resolution within the temperature range of −40° C.-85° C., which is particularly suitable for monitoring and vehicle mounted camera system, which are used both day and night or working in poor lighting condition.

Referring to FIG. 17 to FIG. 20 of the drawings, an optical lens according to a fifth preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the first lens L1, the second lens L2, the third lens L3 and/or the fourth Lens L4 are aspherical lenses, to improve the optical performance of the optical lens of the fifth preferred embodiment. Alternatively, the first lens L1, the second lens L2, the third lens L3 and/or the fourth Lens L4 are spherical lenses.

As shown in FIG. 17, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5.

As shown in FIG. 17 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side.

As shown in FIG. 17 of the drawings, the optical centers of the first lens L1, the second lens L2, the third lens L3, the fourth Lens L4 and the fifth lens L5 of the optical lens in the fifth preferred embodiment are coaxial.

As shown in FIG. 17 of the drawings, the optical lens of the fifth preferred embodiment further comprises an aperture L6, wherein the front lens group and the rear lens group are arranged at two sides of the aperture L6 and the optical center thereof is coaxial with the optical centers of the first lens L1, the second lens L2, the third lens L3, the fourth Lens L4 and the fifth lens L5. Preferably, the aperture L6 is arranged between the first lens L1 and the second lens L2. Alternatively, the aperture L6 can be arranged between the second lens L2 and the third lens L3, which is shown in FIG. 17.

Alternatively, the aperture L6 can be arranged in the rear lens group and the optical center thereof is coaxial with the optical centers of the first lens L1, the second lens L2, the third lens L3, the fourth Lens L4 and the fifth lens L5. In some embodiments of the present invention, the aperture L6 also can be arranged between the achromatic lens group and the fifth lens L5. Furthermore, the aperture L6 also can be arranged in the achromatic lens group, for example the aperture L6 can be arranged at the third lens L3 or the fourth Lens L4. In other embodiments, the aperture L6 can be arranged between the front lens group and the rear lens group.

It is understood that the first lens L1 in double concave shape enables the optical lens of the fifth preferred embodiment to have a relatively large aperture, which is beneficial for reducing the diameters of the front lenses so as to meet the requirement of miniaturization and lower the cost. Especially when the aperture L6 is arranged between the first lens L1 and the second lens L2, the first lens L1 in double concave shape allows a wider angel range of imaging light passing through the aperture L6. Meanwhile, the second lens L2 has a positive power, thereby facilitating the convergence of the light diverging in front (particularly referring to the light emitted from the first lens L1) to facilitate correction of the aberrations.

Furthermore, as shown in Table 1A and Table 2A, the focal length of the first lens L1 and the focal length of the optical lens of the fifth preferred embodiment satisfy the formula: $-0.5 \geq F1/F \geq -2$, wherein the F1 is the focal length of the first lens L1 and the F is the focal length of the optical lens of the fifth preferred embodiment.

As shown in FIG. 17 of the drawings, the first lens L1 of the optical lens of the fifth preferred embodiment of the present invention has two concave surfaces of S1 and S2, and the second lens L2 has two convex surfaces of S4 and S5, wherein the two concave surfaces S1, S2 of the first lens L1 face towards the object side and the image side respectively and the two convex surfaces S4, S5 of the second lens L2 face towards the object side and the image side respectively. As shown in the FIG. 17 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S5 thereof is arranged to face towards the image side.

As shown in FIG. 17 of the drawings, furthermore, the third lens L3 of the optical lens of the first preferred embodiment has two convex surfaces of S6 and S7, and the fourth Lens L4 has two concave surfaces of S7 and S8. The two convex surfaces S6, S7 of the third lens L3 face towards the object side and the image side respectively and the two concave surfaces of the fourth Lens L4 S7, S8 face towards the object side and the image side respectively, wherein convex surface S7, facing the image side, of the third lens L3 and the concave surface S7, facing towards the object side, of the fourth Lens L4 are arranged face to face. In other word, the convex surface S7 of the third lens L3 and the concave surface S7 of the fourth lens L4 are overlapped with each other, so that the surface S7 can be regarded as the convex surface S7 of the third lens L3 or the concave surface S7 of the fourth Lens L4. Accordingly, the first lens L1, the second lens L2, the third lens L3, and the fourth Lens L4 of the optical lens of the first preferred embodiment of the present invention are double-surfaced lenses. As shown in FIG. 17 of the drawings, the convex surface S6 of the third lens L3 is arranged to face towards the object side, while the other convex surface S7 thereof is arranged to face towards the image side, and the concave surface S7 of the fourth lens L3 is arranged to face towards the object side while the other concave surface S8 thereof is arranged to face towards the image side. Accordingly, the first lens L1 is a double concave lens, the second lens L2 is a double convex lens, the third lens L3 is a double convex lens and the fourth lens L4 is a double concave lens. As shown in FIG. 17 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens with at least one aspherical surface. Preferably, the surface S9 of the fifth lens L5 is arranged to face towards the object side and the other surface S10 thereof is arranged to face towards the image side. More preferably, of the two surfaces of the fifth lens L5, are convex surfaces. Alternatively, one of the two surfaces S9, S10 of the fifth lens L5 is convex and the other is a plane.

As shown in FIG. 17 of the drawings, the achromatic lens group of the optical lens according to the third preferred embodiment of the present invention is preferably a cemented lens. In other words, the third lens L3 and the fourth lens L4 are adhered together to form the achromatic lens group. On this point, since the third lens L3 and the fourth lens L4 are adhered together, the concave surface S7 of the third lens L3 and the convex surface S7 of the fourth lens L4 are overlapped together, while the concave surface S7 of the third lens L3 and the convex surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture L6 can be arranged between the third lens L3 and the fourth lens L4.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs to be set to have a high refractive index, a large aperture and/or relatively large thickness for converging the light. Consequently, the first lens L1 of the optical lens in the fifth preferred embodiment is arranged to have a refractive index Nd (1)≤1.85. In other words, the refractive index of the material of the first lens L1 is set not more than 1.8, which is shown in Table 1A and Table 2A. In addition, in order for preventing the aberration, after the imaging light passing through the first lens L1, being too large, the first lens L1 is arranged to be made of material having an abbe constant Vd (1) no less than 40 (Vd (1)≥40). In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.55 (Nd (2)≥1.55). Preferably, the Nd (2) is not less than 1.7 (Nd (2)≥1.7), which is shown in Table 1A and Table 2A. In other words, the refractive index of the material of the second lens L2 is arranged not less than 1.55. In addition, the abbe constant of the second lens L2 is defined as Vd (2) and the Vd (2) is provided ranging from 20 to 65 (65≥Vd (2)≥20), to effectively correct the axial chromatic aberration, which is shown in table 1A and Table 2A.

Meanwhile, since the refractive index Nd (1) of the first lens L1 is less than 1.85, the abbe constant Vd(1) is not less than 40, the refractive index Nd (2) of the second lens L2 is 1.55, preferably Nd (2)≥1.7, and abbe constant Vd (2) is ranged from 20 to 65. Thus, both the first lens L1 and the second lens L2 can be made of relatively inexpensive glass material.

Therefore, the front lens group and the rear lens group of the optical lens according to the fifth preferred embodiment of the present invention are arranged in such a manner that the ratio of the total length TTL of the optical lens to the focal length F of the optical lens can the following formula: TTL/F≤7.5; wherein the TTL is the total length of the optical lens, which, in other words, it refers to the distance from the outermost point of the object side of the first lens to the imaging focal plane of the optical lens.

As shown in Table 1A and Table 2A, the curvature radius of the concave surface S1 facing towards the object side is −7.693 (from the object side to image side), the curvature radius of the concave surface S2 facing towards the image side is 4.290 (from the object side to image side), the refractive index of the first lens L1 is 1.68, the abbe constant of the first lens L1 is 54.9; the curvature radius of the convex surface S4 facing towards the object side is 9.074 (from the object side to image side), the curvature radius of the concave surface S5 facing towards the image side is −9.148 (from the object side to image side), the refractive index of the second lens L2 is 1.80, the abbe constant of the second lens L2 is 49.6. According to FIG. 18, FIG. 19 and FIG. 20, the optical lens of the present invention has preferable optical performance.

TABLE 1A

Parameters of the lens assembly

| Surf. | Curvature radius r | Central thickness d | Refractive index Nd | Abbe constant Vd |
|---|---|---|---|---|
| S1 | −7.693 | 0.800 | 1.68 | 54.9 |
| S2 | 4.290 | 2.752 | | |
| STO | Infinity | 0.000 | | |
| S4 | 9.074 | 4.000 | 1.77 | 49.6 |
| S5 | −9.148 | 0.300 | | |
| S6 | 11.160 | 4.000 | 1.5 | 81.6 |
| S7 | −6.766 | 0.800 | | |
| S7' | −6.766 | 0.800 | 1.78 | 25.7 |
| S8 | −28.694 | 0.180 | | |
| S9 | 7.092 | 2.200 | 1.51 | 63.8 |
| S10 | −20.000 | 0.500 | | |
| S11 | Infinity | 0.950 | 1.52 | 64.2 |
| S12 | Infinity | 4.860 | | |
| IMA | Infinity | | | |

TABLE 2A

Parameters of the lens assembly

| Nd (1) | Vd (1) | Nd (2) | Vd (2) | F1 | F | TTL | F1/F | TTL/F |
|---|---|---|---|---|---|---|---|---|
| 1.68 | 54.9 | 1.77 | 49.6 | −3.94 | 3.79 | 21.34 | −1.04 | 5.63 |

Alternatively, at least one of the two surfaces of the fifth lens L5 is an aspherical surface, wherein the aspheric lens surface of the fifth lens L5 satisfies the following formula:

$$Z(h) = \frac{ch^2}{1 + \sqrt{1 - (1+k)c^2h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E represent high-order aspheric coefficients thereof.

TABLE 3A aspherical coefficients: K, A, B, C, D, E

| Surf | K | A | B | C | D | E |
|---|---|---|---|---|---|---|
| 9 | 1.772565 | −7.84760E−04 | 2.03208E−04 | −4.79963E−05 | 7.10422E−06 | −4.01297E−07 |
| 10 | −5.511378 | 7.11871E−04 | 3.82934E−04 | −1.03112E−04 | 1.32688E−05 | −7.36120E−07 |

In other words, at least one of the two surfaces of the fifth lens L5 is an aspherical surface, so as to improve the optical performance of the optical lens of the third preferred embodiment of the present invention, while meeting the requirement of miniaturization.

In summary, the optical lens according to the fifth preferred embodiment of the present invention enable the miniaturization of the entire optical lens to be made suitable for use in the vehicle mounted field under the condition of high pixel, small distortion and high definition imaging. In addition, the parameters of the respective lenses of the optical lens according to the fifth preferred embodiment of the present invention can be made stable in an environment where the temperature change is larger. In other words, the optical lens of the fourth preferred embodiment of the present invention can be miniaturized and capable of stabilizing imaging at a large temperature range.

Referring to FIG. 21 to FIG. 24 of the drawings, an optical lens according to a sixth preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the first lens L1, the second lens L2, the third lens L3 and/or the fourth Lens L4 are aspherical lenses, to improve the optical performance of the optical lens of the sixth preferred embodiment. Alternatively, the first lens L1, the second lens L2, the third lens L3 and/or the fourth Lens L4 are spherical lenses.

As shown in FIG. 21, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5.

As shown in FIG. 21 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side. As shown in FIG. 21 of the drawings, the optical centers of the first lens L1, the second lens L2, the third lens L3, the fourth Lens L4 and the fifth lens L5 of the optical lens in the sixth preferred embodiment are coaxial.

As shown in FIG. 21 of the drawings, the optical lens of the sixth preferred embodiment further comprises an aperture L6, wherein the front lens group and the rear lens group are arranged at two sides of the aperture L6 and the optical center thereof is coaxial with the optical centers of the first lens L1, the second lens L2, the third lens L3, the fourth Lens L4 and the fifth lens L5. Preferably, the aperture L6 is arranged between the first lens L1 and the second lens L2.

Alternatively, the aperture L6 can be arranged between the second lens L2 and the third lens L3, which is shown in FIG. 17.

It is understood that the first lens L1 in double concave shape enables the optical lens of the sixth preferred embodiment to have a relatively large aperture, which is beneficial for reducing the diameters of the front lenses so as to meet the requirement of miniaturization and lower the cost. Especially when the aperture L6 is arranged between the first lens L1 and the second lens L2, the first lens L1 in double concave shape allows a wider angel range of imaging light passing through the aperture L6. Meanwhile, the second lens L2 has a positive power, thereby facilitating the convergence of the light diverging in front (particularly referring to the light emitted from the first lens L1) to facilitate correction of the aberrations.

Furthermore, as shown in Table 4A and Table 5A, the focal length of the first lens L1 and the focal length of the optical lens of the sixth preferred embodiment satisfy the formula: $-0.5 \geq F1/F \geq -2$, wherein the F1 is the focal length of the first lens L1 and the F is the focal length of the optical lens of the sixth preferred embodiment.

As shown in FIG. 21 of the drawings, the first lens L1 of the optical lens of the sixth preferred embodiment of the present invention has two concave surfaces of S1 and S2, and the second lens L2 has two convex surfaces of S4 and S5, wherein the two concave surfaces S1, S2 of the first lens L1 face towards the object side and the image side respectively and the two convex surfaces S4, S5 of the second lens L2 face towards the object side and the image side respectively. As shown in the FIG. 21 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S5 thereof is arranged to face towards the image side.

As shown in FIG. 21 of the drawings, the third lens L3 of the optical lens of the first preferred embodiment has two convex surfaces of S6 and S7, and the fourth Lens L4 has two concave surfaces of S7 and S8. The two convex surfaces S6, S7 of the third lens L3 face towards the object side and the image side respectively and the two concave surfaces of the fourth Lens L4 S7, S8 face towards the object side and the image side respectively, wherein convex surface S7, facing the image side, of the third lens L3 and the concave surface S7, facing towards the object side, of the fourth Lens L4 are arranged face to face. In other word, the convex surface S7 of the third lens L3 and the concave surface S7 of the fourth lens L4 are overlapped with each other, so that the surface S7 can be regarded as the convex surface S7 of the third lens L3 or the concave surface S7 of the fourth Lens L4. Accordingly, the first lens L1, the second lens L2, the third lens L3, and the fourth Lens L4 of the optical lens of the first preferred embodiment of the present invention are double-surfaced lenses. As shown in FIG. 21 of the drawings, the convex surface S6 of the third lens L3 is arranged to face towards the object side, while the other convex surface S7 thereof is arranged to face towards the image side, and the concave surface S7 of the fourth lens L3 is arranged to face towards the object side while the other concave surface S8 thereof is arranged to face towards the image side. Accordingly, the first lens L1 is a double concave lens, the second lens L2 is a double convex lens, the third lens L3 is a double convex lens and the fourth lens L4 is a double concave lens. As shown in FIG. 21 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens with at least one aspherical surface. Preferably, the surface S9 of the fifth lens L5 is arranged to face towards the object side and the other surface S10 thereof is arranged to face towards the image side. More preferably, both of the two surfaces of the fifth lens L5 are convex surfaces. Alternatively, the surface S9 of the fifth lens L5 is a convex surface and the surface S10 is a planar surface.

As shown in FIG. 21 of the drawings, the achromatic lens group of the optical lens according to the third preferred embodiment of the present invention is preferably a cemented lens. In other words, the third lens L3 and the fourth lens L4 are adhered together to form the achromatic lens group. On this point, since the third lens L3 and the fourth lens L4 are adhered together, the concave surface S7 of the third lens L3 and the convex surface S7 of the fourth lens L4 are overlapped together, while the concave surface S7 of the third lens L3 and the convex surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture L6 can be arranged between the third lens L3 and the fourth lens L4.

As shown in FIG. 21 of the drawings, the achromatic lens group of the optical lens according to the sixth preferred embodiment of the present invention is preferably a cemented lens. In other words, the third lens L3 and the fourth lens L4 are adhered together to form the achromatic lens group. Alternatively, he achromatic lens group may also be a two-separated type achromatic lens group.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs to be set to have a high refractive index, a large aperture and/or relatively large thickness for converging the light. Consequently, the first lens L1 of the optical lens in the sixth preferred embodiment is arranged to have a refractive index Nd (1)≤1.85. In other words, the refractive index of the material of the first lens L1 is set not more than 1.85, which is shown in Table 4A and Table 5A. In addition, in order for preventing the aberration, after the imaging light passing through the first lens L1, being too large, the first lens L1 is arranged to be made of material having an abbe constant Vd (1) no less than 40 (Vd (1)≥40). In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.55 (Nd (2)≥1.55). Preferably, the Nd (2) is not less than 1.7 (Nd (2)≥1.7), which is shown in FIG. 20 and FIG. 21. In other words, the refractive index of the material of the second lens L2 is arranged not less than 1.55. In addition, the abbe constant of the second lens L2 is defined as Vd (2) and the Vd (2) is provided ranging from 20 to 65 (65≥Vd (2)≥20), to effectively correct the axial chromatic aberration, which is shown in FIG. 20 and FIG. 21.

Meanwhile, since the refractive index Nd (1) of the first lens L1 is less than 1.85, the abbe constant Vd(1) is not less than 40, the refractive index Nd (2) of the second lens L2 is 1.55, preferably Nd (2)≥1.7, and abbe constant Vd (2) is ranged from 20 to 65. Thus, both the first lens L1 and the second lens L2 can be made of relatively inexpensive glass material.

Therefore, the front lens group and the rear lens group of the optical lens according to the sixth preferred embodiment of the present invention are arranged in such a manner that the ratio of the total length TTL of the optical lens to the focal length F of the optical lens can the following formula: TTL/F≤7.5; wherein the TTL is the total length of the optical lens, which, in other words, it refers to the distance from the outermost point of the object side of the first lens to the imaging focal plane of the optical lens.

As shown in FIG. 20 and FIG. 21, the curvature radius of the concave surface S1 facing towards the object side is −15.021 (from the object side to image side), the curvature radius of the concave surface S2 facing towards the image side is 3.590 (from the object side to image side), the refractive index of the first lens L1 is 1.77, the abbe constant of the first lens L1 is 49.6; the curvature radius of the convex surface S4 facing towards the object side is 11.646 (from the object side to image side), the curvature radius of the concave surface S5 facing towards the image side is −7.686 (from the object side to image side), the refractive index of the second lens L2 is 1.75, the abbe constant of the second lens L2 is 52.3. According to FIG. 22, FIG. 23 and FIG. 24, the optical lens of the present invention has preferable optical performance, as shown in FIG. 22 to FIG. 24.

TABLE 4A

Parameters of the lens assembly

| Surf. | Curvature radius r | Central thickness d | Refractive index Nd | Abbe constant Vd |
|---|---|---|---|---|
| S1 | −15.021 | 0.800 | 1.77 | 49.6 |
| S2 | 3.590 | 3.062 | | |
| STO | Infinity | 0.000 | | |
| S4 | 11.646 | 4.800 | 1.75 | 52.3 |
| S5 | −7.686 | 0.300 | | |
| S6 | 10.744 | 4.600 | 1.59 | 61.6 |
| S7 | −4.697 | 0.650 | | |
| S7' | −4.697 | 0.650 | 1.78 | 25.7 |
| S8 | −54.135 | 0.180 | | |
| S9 | 6.880 | 2.200 | 1.51 | 63.8 |
| S10 | −16.627 | 0.500 | | |
| S11 | Infinity | 0.950 | 1.52 | 64.2 |
| S12 | Infinity | 4.620 | | |
| IMA | Infinity | | | |

TABLE 5A

Parameters of the lens assembly

| Nd (1) | Vd (1) | Nd (2) | Vd (2) | F1 | F | TTL | F1/F | TTL/F |
|---|---|---|---|---|---|---|---|---|
| 1.77 | 49.6 | 1.75 | 52.3 | −3.66 | 3.25 | 22.66 | −1.13 | 6.96 |

Alternatively, at least one of the two surfaces of the fifth lens L5 is an aspherical surface, wherein the aspheric lens surface of the fifth lens L5 satisfies the following formula:

$$Z(h) = \frac{ch^2}{1 + \sqrt{1 - (1+k)c^2h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E represent high-order aspheric coefficients thereof.

TABLE 6A aspherical coefficients: K, A, B, C, D, E

| Surf | K | A | B | C | D | E |
|---|---|---|---|---|---|---|
| 9 | 2.13737 | −6.14534E−04 | 2.77319E−04 | −6.04441E−05 | 5.28979E−06 | −3.07681E−07 |
| 10 | −145.2098 | 5.80617E−03 | 4.65256E−04 | −9.58216E−05 | 1.27880E−05 | −5.53983E−07 |

In other words, at least one of the two surfaces of the fifth lens L5 is an aspherical surface, so as to improve the optical performance of the optical lens of the third preferred embodiment of the present invention, while meeting the requirement of miniaturization.

In summary, the optical lens according to the sixth preferred embodiment of the present invention enable the miniaturization of the entire optical lens to be made suitable for use in the vehicle mounted field under the condition of high pixel, small distortion and high definition imaging. In addition, the parameters of the respective lenses of the optical lens according to the sixth preferred embodiment of the present invention can be made stable in an environment where the temperature change is larger. In other words, the optical lens of the sixth preferred embodiment of the present invention can be miniaturized and capable of stabilizing imaging at a large temperature range Referring to FIG. 25 to FIG. 28 of the drawings, an optical lens according to a seventh preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the first lens L1, the second lens L2, the third lens L3 and/or the fourth Lens L4 are aspherical lens, to improve the optical performance of the optical lens of the seventh preferred embodiment. Alternatively, the first lens L1, the second lens L2, the third lens L3 and/or the fourth Lens L4 are spherical lenses.

As shown in FIG. 25, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5.

As shown in FIG. 25 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side. As shown in FIG. 25 of the drawings, the optical centers of the first lens L1, the second lens L2, the third lens L3, the fourth Lens L4 and the fifth lens L5 of the optical lens in the seventh preferred embodiment are coaxial.

As shown in FIG. 25 of the drawings, the optical lens of the seventh preferred embodiment further comprises an aperture L6, wherein the front lens group and the rear lens group are arranged at two sides of the aperture L6 and the optical center thereof is coaxial with the optical centers of the first lens L1, the second lens L2, the third lens L3, the fourth Lens L4 and the fifth lens L5. Preferably, the aperture L6 is arranged between the first lens L1 and the second lens L2. Alternatively, the aperture L6 can be arranged between the second lens L2 and the third lens L3, which is shown in FIG. 25.

Alternatively, the aperture L6 can be arranged in the rear lens group and the optical center thereof is coaxial with the optical centers of the first lens L1, the second lens L2, the third lens L3, the fourth Lens L4 and the fifth lens L5. In some embodiments of the present invention, the aperture L6 also can be arranged between the achromatic lens group and the fifth lens L5. Furthermore, the aperture L6 also can be arranged in the achromatic lens group, for example the aperture L6 can be arranged at the third lens L3 or the fourth Lens L4. In other embodiments, the aperture L6 can be arranged between the front lens group and the rear lens group.

It is understood that the first lens L1 in double concave shape enables the optical lens of the seventh preferred embodiment to have a relatively large aperture, which is beneficial for reducing the diameters of the front lenses so as to meet the requirement of miniaturization and lower the cost. Especially when the aperture L6 is arranged between the first lens L1 and the second lens L2, the first lens L1 in double concave shape allows a wider angel range of imaging light passing through the aperture L6. Meanwhile, the second lens L2 has a positive power, thereby facilitating the convergence of the light diverging in front (particularly referring to the light emitted from the first lens L1) to facilitate correction of the aberrations.

Furthermore, as shown in Table 7A and Table 8A, the focal length of the first lens L1 and the focal length of the optical lens of the seventh preferred embodiment satisfy the formula: $-0.5 \geq F1/F \geq -2$, wherein the F1 is the focal length of the first lens L1 and the F is the focal length of the optical lens of the seventh preferred embodiment.

As shown in FIG. 25 of the drawings, the first lens L1 of the optical lens of the seventh preferred embodiment of the present invention has two concave surfaces of S1 and S2, and the second lens L2 has two convex surfaces of S4 and S5, wherein the two concave surfaces S1, S2 of the first lens L1 face towards the object side and the image side respective and the two convex surfaces S4, S5 of the second lens L2 face towards the object side and the image side respectively. As shown in the FIG. 25 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S3 thereof is arranged to face towards the image side.

As shown in FIG. 25 of the drawings, the third lens L3 of the optical lens of the first preferred embodiment has two convex surfaces of S6 and S7, and the fourth Lens L4 has two concave surfaces of S7 and S8. The two convex surfaces S6, S7 of the third lens L3 face towards the object side and the image side respectively and the two concave surfaces of the fourth Lens L4 S7, S8 face towards the object side and the image side respectively, wherein convex surface S7, facing the image side, of the third lens L3 and the concave surface S7, facing towards the object side, of the fourth Lens L4 are arranged face to face. In other word, the convex surface S7 of the third lens L3 and the concave surface S7 of the fourth lens L4 are overlapped with each other, so that the surface S7 can be regarded as the convex surface S7 of the third lens L3 or the concave surface S7 of the fourth Lens L4. Accordingly, the first lens L1, the second lens L2, the third lens L3, and the fourth Lens L4 of the optical lens of the first preferred embodiment of the present invention are double-surfaced lenses. As shown in FIG. 25 of the drawings, the convex surface S6 of the third lens L3 is arranged to face towards the object side, while the other convex surface S7 thereof is arranged to face towards the image side, and the concave surface S7 of the fourth lens L3 is arranged to face towards the object side while the other concave surface S8 thereof is arranged to face towards the image side. Accordingly, the first lens L1 is a double concave lens, the second lens L2 is a double convex lens, the third lens L3 is a double convex lens and the fourth lens L4 is a double concave lens. As shown in FIG. 25 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens with at least one aspherical surface. Preferably, the surface S9 of the fifth lens L5 is arranged to face towards the object side and the other surface S10 thereof is arranged to face towards the image side. More preferably, both of the two surfaces of the fifth lens L5 are convex surfaces. Alternatively, the surface S9 of the fifth lens L5 is a convex surface and the surface S10 is a planar surface.

As shown in FIG. 25 of the drawings, the achromatic lens group of the optical lens according to the third preferred embodiment of the present invention is preferably a cemented lens. In other words, the third lens L3 and the fourth lens L4 are adhered together to form the achromatic lens group. On this point, since the third lens L3 and the fourth lens L4 are adhered together, the concave surface S7 of the third lens L3 and the convex surface S7 of the fourth lens L4 are overlapped together, while the concave surface S7 of the third lens L3 and the convex surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture L6 can be arranged between the third lens L3 and the fourth lens L4.

As shown in FIG. 25 of the drawings, the achromatic lens group of the optical lens according to the third preferred embodiment of the present invention is preferably a cemented lens. In other words, the third lens L3 and the fourth lens L4 are adhered together to form the achromatic lens group. Alternatively, the achromatic lens group may also be a two-separated type achromatic lens group.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs to be set to have a high refractive index, a large aperture and/or relatively large thickness for converging the light. Consequently, the first lens L1 of the optical lens in the seventh preferred embodiment is arranged to have a refractive index Nd (1)≤1.85. In other words, the refractive index of the material of the first lens L1 is set not more than 1.85, which is shown in Table 7A and Table 8A. In addition, in order for preventing the aberration, after the imaging light passing through the first lens L1, being too large, the first lens L1 is arranged to be made of material having an abbe constant Vd (1) no less than 40 (Vd (1)≥40). In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.55 (Nd (2)≥1.55). Preferably, the Nd (2) is not less than 1.7 (Nd (2)≥1.7), which is shown in Table 7A and Table 8A. In other words, the refractive index of the material of the second lens L2 is arranged not less than 1.55. In addition, the abbe constant of the second lens L2 is defined as Vd (2) and the Vd (2) is provided ranging from 20 to 65 (65≥Vd (2)≥20), to effectively correct the axial chromatic aberration, which is shown in Table 7A and Table 8A.

Meanwhile, since the refractive index Nd (1) of the first lens L1 is less than 1.85, the abbe constant Vd(1) is not less than 40, the refractive index Nd (2) of the second lens L2 is 1.55, preferably Nd (2)≥1.7, and abbe constant Vd (2) is ranged from 20 to 65. Thus, both the first lens L1 and the second lens L2 can be made of relatively inexpensive glass material.

Therefore, the front lens group and the rear lens group of the optical lens according to the seventh preferred embodiment of the present invention are arranged in such a manner that the ratio of the total length TTL of the optical lens to the focal length F of the optical lens can the following formula: TTL/F≤7.5; wherein the TTL is the total length of the optical lens, which, in other words, it refers to the distance from the outermost point of the object side of the first lens to the imaging focal plane of the optical lens.

As shown in Table 7A and Table 8A, the curvature radius of the concave surface S1 facing towards the object side is −9.622 (from the object side to image side), the curvature radius of the concave surface S2 facing towards the image side is 3.940 (from the object side to image side), the refractive index of the first lens L1 is 1.84, the abbe constant of the first lens L1 is 42.7; the curvature radius of the convex surface S4 facing towards the object side is 10.331 (from the object side to image side), the curvature radius of the concave surface S5 facing towards the image side is −7.412 (from the object side to image side), the refractive index of the second lens L2 is 1.80, the abbe constant of the second lens L2 is 46.6. According to FIG. 26, FIG. 27 and FIG. 28, the optical lens of the present invention has preferable optical performance, as shown in FIG. 26 to FIG. 28.

TABLE 7A

Parameters of the lens assembly

| Surf. | Curvature radius r | Central thickness d | Refractive index Nd | Abbe constant Vd |
|---|---|---|---|---|
| S1 | −9.622 | 0.800 | 1.84 | 42.7 |
| S2 | 3.940 | 2.111 | | |
| STO | Infinity | 0.000 | | |
| S4 | 10.331 | 4.500 | 1.80 | 46.6 |
| S5 | −7.412 | 0.300 | | |
| S6 | 8.198 | 4.800 | 1.50 | 81.6 |
| S7 | −4.430 | 0.650 | | |
| S7' | −4.430 | 0.650 | 1.78 | 25.7 |
| S8 | −50.970 | 0.180 | | |
| S9 | 6.891 | 2.200 | 1.62 | 60.3 |
| S10 | −17.281 | 0.500 | | |
| S11 | Infinity | 0.950 | 1.52 | 64.2 |
| S12 | Infinity | 4.052 | | |
| IMA | Infinity | | | |

TABLE 8A

Parameters of the lens assembly

| Nd (1) | Vd (1) | Nd (2) | Vd (2) | F1 | F | TTL | F1/F | TTL/F |
|---|---|---|---|---|---|---|---|---|
| 1.84 | 42.7 | 1.8 | 46.6 | −3.24 | 3.56 | 21.04 | −0.91 | 5.91 |

Alternatively, at least one of the two surfaces of the fifth lens L5 is an aspherical surface, wherein the aspheric lens surface of the fifth lens L5 satisfies the following formula:

$$Z(h) = \frac{ch^2}{1 + \sqrt{1-(1+k)c^2h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E represent high-order aspheric coefficients thereof.

TABLE 9A

| | aspherical coefficients: K, A, B, C, D, E | | | | | |
|---|---|---|---|---|---|---|
| Surf | K | A | B | C | D | E |
| 9 | 2.076894 | −6.25822E−04 | 4.99231E−04 | −1.33350E−04 | 1.61843E−05 | −6.49550E−07 |
| 10 | −100.2098 | 3.44509E−04 | −1.27920E−05 | 1.56858E−05 | −7.10819E−07 | 1.15656E−07 |

In other words, at least one of the two surfaces of the fifth lens L5 is an aspherical surface, so as to improve the optical performance of the optical lens of the third preferred embodiment of the present invention, while meeting the requirement of miniaturization.

In summary, the optical lens according to the seventh preferred embodiment of the present invention enable the miniaturization of the entire optical lens to be made suitable for use in the vehicle mounted field under the condition of high pixel, small distortion and high definition imaging. In addition, the parameters of the respective lenses of the optical lens according to the seventh preferred embodiment of the present invention can be made stable in an environment where the temperature change is larger. In other words, the optical lens of the sixth preferred embodiment of the present invention can be miniaturized and capable of stabilizing imaging at a large temperature range.

Referring to FIG. 29 to FIG. 32 of the drawings, an optical lens according to a eighth preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the first lens L1, the second lens L2, the third lens L3 and/or the fourth Lens L4 are aspherical lens, to improve the optical performance of the optical lens of the eighth preferred embodiment. Alternatively, the first lens L1, the second lens L2, the third lens L3 and/or the fourth Lens L4 are spherical lenses.

As shown in FIG. 29, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5.

As shown in FIG. 29 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side. As shown in FIG. 29 of the drawings, the optical centers of the first lens L1, the second lens L2, the third lens L3, the fourth Lens L4 and the fifth lens L5 of the optical lens in the eighth preferred embodiment are coaxial.

As shown in FIG. 29 of the drawings, the optical lens of the eighth preferred embodiment further comprises an aperture element L6, wherein the front lens group and the rear lens group are arranged at two sides of the aperture element L6 and the optical center thereof is coaxial with the optical centers of the first lens L1, the second lens L2, the third lens L3, the fourth Lens L4 and the fifth lens L5. Preferably, the aperture element L6 is arranged between the first lens L1 and the second lens L2. Alternatively, the aperture element L6 can be arranged between the second lens L2 and the third lens L3, which is shown in FIG. 29.

Alternatively, the aperture element L6 can be arranged in the rear lens group and the optical center thereof is coaxial with the optical centers of the first lens L1, the second lens L2, the third lens L3, the fourth Lens L4 and the fifth lens L5. In some embodiments of the present invention, the aperture element L6 also can be arranged between the achromatic lens group and the fifth lens L5. Furthermore, the aperture element L6 also can be arranged in the achromatic lens group, for example the aperture L6 can be arranged at the third lens L3 or the fourth Lens L4. In other embodiments, the aperture element L6 can be arranged between the front lens group and the rear lens group.

It is understood that the first lens L1 in double concave shape enables the optical lens of the eighth preferred embodiment to have a relatively large aperture, which is beneficial for reducing the diameters of the front lenses so as to meet the requirement of miniaturization and lower the cost. Especially when the aperture element L6 is arranged between the first lens L1 and the second lens L2, the first lens L1 in double concave shape allows a wider angel range of imaging light pass through the aperture element L6. Meanwhile, the second lens L2 has a positive power, thereby facilitating the convergence of the light diverging in front (particularly referring to the light emitted from the first lens L1), to facilitate correction of the aberrations.

Furthermore, as shown in Table 10A and Table 11A, the focal length of the first lens L1 and the focal length of the optical lens of the eighth preferred embodiment satisfy the formula: −0.5≥F1/F≥−2, wherein the F1 is the focal length of the first lens L1 and the F is the focal length of the optical lens of the eighth preferred embodiment.

As shown in FIG. 29 of the drawings, the first lens L1 of the optical lens of the eighth preferred embodiment of the present invention has two concave surfaces of S1 and S2, and the second lens L2 has two convex surfaces of S4 and S5, wherein the two concave surfaces S1, S2 of the first lens L1 face towards the object side and the image side respectively and the two convex surfaces S4, S5 of the second lens L2 face towards the object side and the image side respectively. As shown in the FIG. 29 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S3 thereof is arranged to face towards the image side.

As shown in FIG. 29 of the drawings, the third lens L3 of the optical lens of the first preferred embodiment has two convex surfaces of S6 and S7, and the fourth Lens L4 has two concave surfaces of S7 and S8. The two convex surfaces S6, S7 of the third lens L3 face towards the object side and the image side respectively and the two concave surfaces of the fourth Lens L4 S7, S8 face towards the object side and the image side respectively, wherein convex surface S7, facing the image side, of the third lens L3 and the concave surface S7, facing towards the object side, of the fourth Lens L4 are arranged face to face. In other word, the convex surface S7 of the third lens L3 and the concave surface S7 of the fourth lens L4 are overlapped with each other, so that the surface S7 can be regarded as the convex surface S7 of the third lens L3 or the concave surface S7 of the fourth Lens L4. Accordingly, the first lens L1, the second lens L2, the third lens L3, and the fourth Lens L4 of the optical lens of the first preferred embodiment of the present invention are double-surfaced lenses. As shown in FIG. 29 of the drawings, the convex surface S6 of the third lens L3 is arranged to face towards the object side, while the other convex surface S7 thereof is arranged to face towards the image side, and the concave surface S7 of the fourth lens L3 is arranged to face towards the object side while the other concave surface S8 thereof is arranged to face towards the image side. Accordingly, the first lens L1 is a double concave lens, the second lens L2 is a double convex lens, the third lens L3 is a double convex lens and the fourth lens L4 is a double concave lens. As shown in FIG. 29 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens with at least one aspherical surface. Preferably, the surface S9 of the fifth lens L5 is arranged to face towards the object side and the other surface S10 thereof is arranged to face towards the image side. More preferably, both of the two surfaces of the fifth lens L5 are convex surfaces. Alternatively, the surface S9 of the fifth lens L5 is a convex surface and the surface S10 is a planar surface.

As shown in FIG. 29 of the drawings, the achromatic lens group of the optical lens according to the third preferred embodiment of the present invention is preferably a cemented lens. In other words, the third lens L3 and the fourth lens L4 are adhered together to form the achromatic lens group. On this point, since the third lens L3 and the fourth lens L4 are adhered together, the concave surface S7 of the third lens L3 and the convex surface S7 of the fourth lens L4 are overlapped together, while the concave surface S7 of the third lens L3 and the convex surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture element L6 can be arranged between the third lens L3 and the fourth lens L4.

As shown in FIG. 29 of the drawings, the achromatic lens group of the optical lens according to the third preferred embodiment of the present invention is preferably a cemented lens. In other words, the third lens L3 and the fourth lens L4 are adhered together to form the achromatic lens group. Alternatively, the achromatic lens group may also be a two-separated type achromatic lens group.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs to be set to have a high refractive index, a large aperture and/or relatively large thickness for converging the light. Consequently, the first lens L1 of the optical lens in the eighth preferred embodiment is arranged to have a refractive index Nd (1)≤1.85. In other words, the refractive index of the material of the first lens L1 is set not more than 1.85, which is shown in Table 10A and Table 11A. In addition, in order for preventing the aberration, after the imaging light passing through the first lens L1, being too large, the first lens L1 is arranged to be made of material having an abbe constant Vd (1) no less than 40 (Vd (1)≥40). In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.55 (Nd (2)≥1.55). Preferably, the Nd (2) is not less than 1.7 (Nd (2)≥1.7), which is shown in Table 10A and Table 11A. In other words, the refractive index of the material of the second lens L2 is arranged not less than 1.55. In addition, the abbe constant of the second lens L2 is defined as Vd (2) and the Vd (2) is provided ranging from 20 to 65 (65≥Vd (2)≥20), to effectively correct the axial chromatic aberration, which is shown in Table 10A and Table 11A.

Meanwhile, since the refractive index Nd (1) of the first lens L1 is less than 1.85, the abbe constant Vd(1) is not less than 40, the refractive index Nd (2) of the second lens L2 is ≥1.55, preferably Nd (2)≥1.7, and abbe constant Vd (2) is ranged from 20 to 65. Thus, both the first lens L1 and the second lens L2 can be made of relatively inexpensive glass material.

Therefore, the front lens group and the rear lens group of the optical lens according to the eighth preferred embodiment of the present invention are arranged in such a manner that the ratio of the total length TTL of the optical lens to the focal length F of the optical lens can the following formula: TTL/F≤7.5; wherein the TTL is the total length of the optical lens, which, in other words, it refers to the distance from the outermost point of the object side of the first lens to the imaging focal plane of the optical lens.

As shown in Table 10A and Table 11A, the curvature radius of the concave surface S1 facing towards the object side is −6.255 (from the object side to image side), the curvature radius of the concave surface S2 facing towards the image side is 4.004 (from the object side to image side), the refractive index of the first lens L1 is 1.7, the abbe constant of the first lens L1 is 55.5; the curvature radius of the convex surface S4 facing towards the object side is 6.831 (from the object side to image side), the curvature radius of the concave surface S5 facing towards the image side is −12.690 (from the object side to image side), the refractive index of the second lens L2 is 1.80, the abbe constant of the second lens L2 is 46.6. According to FIG. 30, FIG. 31 and FIG. 32, the optical lens of the present invention has preferable optical performance.

TABLE 10A

Parameters of the lens assembly

| Surf. | Curvature radius r | Central thickness d | Refractive index Nd | Abbe constant Vd |
|---|---|---|---|---|
| S1 | −6.255 | 0.800 | 1.70 | 55.5 |
| S2 | 4.004 | 1.633 | | |
| STO | Infinity | 0.000 | | |
| S4 | 6.831 | 3.800 | 1.80 | 46.6 |
| S5 | −12.690 | 0.300 | | |
| S6 | 5.860 | 0.650 | 1.78 | 25.7 |
| S7 | 3.070 | 2.400 | | |
| S7' | 3.070 | 2.400 | 1.50 | 81.6 |
| S8 | −8.319 | 0.807 | | |
| S9 | 21.403 | 1.500 | 1.51 | 63.8 |
| S10 | −29.443 | 0.500 | | |
| S11 | Infinity | 0.950 | 1.52 | 64.2 |
| S12 | Infinity | 4.837 | | |
| IMA | Infinity | | | |

TABLE 11A

Parameters of the lens assembly

| Nd (1) | Vd (1) | Nd (2) | Vd (2) | F1 | F | TTL | F1/F | TTL/F |
|---|---|---|---|---|---|---|---|---|
| 1.7 | 55.5 | 1.8 | 46.6 | −3.38 | 4.40 | 18.18 | −0.77 | 4.13 |

Alternatively, at least one of the two surfaces of the fifth lens L5 is an aspherical surface, wherein the aspheric lens surface of the fifth lens L5 satisfies the following formula:

$$Z(h) = \frac{ch^2}{1 + \sqrt{1 - (1+k)c^2h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E represent high-order aspheric coefficients thereof.

TABLE 12A aspherical coefficients: K, A, B, C, D, E

| Surf | K | A | B | C | D | E |
|---|---|---|---|---|---|---|
| 9 | −48.00451 | −5.33681E−03 | 8.77024E−05 | −1.02961E−04 | 1.11426E−05 | −5.61961E−07 |
| 10 | −100 | −5.22017E−03 | 2.55546E−05 | −8.01754E−05 | 1.09726E−05 | −6.66770E−07 |

In other words, at least one of the two surfaces of the fifth lens L5 is an aspherical surface, so as to improve the optical performance of the optical lens of the third preferred embodiment of the present invention, while meeting the requirement of miniaturization.

In summary, the optical lens according to the eighth preferred embodiment of the present invention enable the miniaturization of the entire optical lens to be made suitable for use in the vehicle mounted field under the condition of high pixel, small distortion and high definition imaging. In addition, the parameters of the respective lenses of the optical lens according to the eighth preferred embodiment of the present invention can be made stable in an environment where the temperature change is larger. In other words, the optical lens of the eighth preferred embodiment of the present invention can be miniaturized and capable of stabilizing imaging at a large temperature range.

Referring to FIG. 33 to FIG. 36 of the drawings, an optical lens according to a ninth preferred embodiment of the present invention is illustrated, wherein the optical lens comprises at least a first lens L1, at least a second lens L2, a third lens L3, a fourth lens L4, and a fifth lens L5, wherein the first lens L1 has a negative power, the second lens L2 has a positive power, the third lens L3 and the fourth lens L4 form an achromatic lens group, and the fifth lens L5 has a positive power and at least one aspherical surface. That is, the fifth lens L5 is an aspherical lens. Preferably, the first lens L1, the second lens L2, the third lens L3 and/or the fourth Lens L4 are aspherical lens, to improve the optical performance of the optical lens of the ninth preferred embodiment. Alternatively, the first lens L1, the second lens L2, the third lens L3 and/or the fourth Lens L4 are spherical lenses.

As shown in FIG. 33, the first lens L1, the second lens L2, the third lens L3, the fourth Lens L4 and the fifth lens L5 form a front lens group and a rear lens group, wherein the front lens group at least comprises the first lens L1, and the rear lens group at least comprises the third lens L3, the fourth Lens L4 and the fifth lens L5. The front lens group and the rear lens group are arranged in sequence along the direction from object side to image side. In other words, the front lens group can be formed by the first lens L1 or formed by the first lens L1 and the second lens L2, wherein in case that the front lens is formed by the first lens L1, the rear lens group comprises the second lens L2, the third lens L3, the fourth Lens L4 and the fifth lens L5, while in case that the front lens group is formed by the first lens L1 and the second lens L2, the rear lens group comprises the third lens L3, the fourth Lens L4 and the fifth lens L5.

As shown in FIG. 33 of the drawings, the front lens group is formed by the first lens L1 and the second lens L2 and the rear lens group is formed by the third lens L3, the fourth Lens L4 and the fifth lens L5. Preferably, the front lens group and the rear lens group are arranged in sequence along with the direction from object side to image side. More preferably, the first lens L1 and the second lens L2 of the front lens group, and, the achromatic lens group and the fifth lens L5 of the rear lens group, are arranged in sequence along the direction from the object side to image side. As shown in FIG. 33 of the drawings, the optical centers of the first lens L1, the second lens L2, the third lens L3, the fourth Lens L4 and the fifth lens L5 of the optical lens in the ninth preferred embodiment are coaxial.

As shown in FIG. 33 of the drawings, the optical lens of the ninth preferred embodiment further comprises an aperture L6, wherein the front lens group and the rear lens group are arranged at two sides of the aperture L6 and the optical center thereof is coaxial with the optical centers of the first lens L1, the second lens L2, the third lens L3, the fourth Lens L4 and the fifth lens L5. Preferably, the aperture L6 is arranged between the first lens L1 and the second lens L2. Alternatively, the aperture L6 can be arranged between the second lens L2 and the third lens L3, which is shown in FIG. 33.

Alternatively, the aperture L6 can be arranged in the rear lens group and the optical center thereof is coaxial with the optical centers of the first lens L1, the second lens L2, the third lens L3, the fourth Lens L4 and the fifth lens L5. In some embodiments of the present invention, the aperture L6 also can be arranged between the achromatic lens group and the fifth lens L5. Furthermore, the aperture L6 also can be arranged in the achromatic lens group, for example the aperture L6 can be arranged at the third lens L3 or the fourth Lens L4. In other embodiments, the aperture L6 can be arranged between the front lens group and the rear lens group.

It is understood that the first lens L1 in double concave shape enables the optical lens of the ninth preferred embodiment to have a relatively large aperture, which is beneficial for reducing the diameters of the front lenses so as to meet the requirement of miniaturization and lower the cost. Especially when the aperture L6 is arranged between the first lens L1 and the second lens L2, the first lens L1 in double concave shape allows a wider angel range of imaging light passing through the aperture L6. Meanwhile, the second lens L2 has a positive power, thereby facilitating the convergence of the light diverging in front (particularly referring to the light emitted from the first lens L1), to facilitate correction of the aberrations.

Furthermore, as shown in Table 13A and Table 14A, the focal length of the first lens L1 and the focal length of the optical lens of the ninth preferred embodiment satisfy the formula: $-0.5 \geq F1/F \geq -2$, wherein the F1 is the focal length of the first lens L1 and the F is the focal length of the optical lens of the ninth preferred embodiment.

As shown in FIG. 33 of the drawings, the first lens L1 of the optical lens of the ninth preferred embodiment of the present invention has two concave surfaces of S1 and S2, and the second lens L2 has two convex surfaces of S4 and S5, wherein the two concave surfaces S1, S2 of the first lens L1 are directed towards the object side and the image side respective and the two convex surfaces S4, S5 of the second lens L2 are directed towards the object side and the image side respectively. As shown in the FIG. 33 of the drawings, the concave surface S1 of the first lens L1 is arranged to face towards the object side and the other concave surface S2 thereof is arranged to face towards the image side, while the convex surface S4 of the second lens L2 is arranged to face towards the object side and the other convex surface S3 thereof is arranged to face towards the image side.

As shown in FIG. 33 of the drawings, the third lens L3 of the optical lens of the first preferred embodiment has two convex surfaces of S6 and S7, and the fourth Lens L4 has two concave surfaces of S7 and S8. The two convex surfaces S6, S7 of the third lens L3 face towards the object side and the image side respectively and the two concave surfaces of the fourth Lens L4 S7, S8 face towards the object side and the image side respectively, wherein convex surface S7, facing the image side, of the third lens L3 and the concave surface S7, facing towards the object side, of the fourth Lens L4 are arranged face to face. In other word, the convex surface S7 of the third lens L3 and the concave surface S7 of the fourth lens L4 are overlapped with each other, so that the surface S7 can be regarded as the convex surface S7 of the third lens L3 or the concave surface S7 of the fourth Lens L4. Accordingly, the first lens L1, the second lens L2, the third lens L3, and the fourth Lens L4 of the optical lens of the first preferred embodiment of the present invention are double-surfaced lenses. As shown in FIG. 33 of the drawings, the convex surface S6 of the third lens L3 is arranged to face towards the object side, while the other convex surface S7 thereof is arranged to face towards the image side, and the concave surface S7 of the fourth lens L3 is arranged to face towards the object side while the other concave surface S8 thereof is arranged to face towards the image side. Accordingly, the first lens L1 is a double concave lens, the second lens L2 is a double convex lens, the third lens L3 is a double convex lens and the fourth lens L4 is a double concave lens. As shown in FIG. 33 of the drawings, the fifth lens L5 of the optical lens of the preferred embodiment has two surfaces of S9 and S10, wherein the two surfaces S9, S10 of the fifth lens L5 face towards the object side and the image side respectively and at least one of the two surfaces S9, S10 of the fifth lens L5 is an aspherical surface. In other words, the fifth lens L5 is a double-surfaced lens with at least one aspherical surface. Preferably, the surface S9 of the fifth lens L5 is arranged to face towards the object side and the other surface S10 thereof is arranged to face towards the image side. More preferably, both of the two surfaces of the fifth lens L5 are convex surfaces. Alternatively, the surface S9 of the fifth lens L5 is a convex surface and the surface S10 is a planar surface.

As shown in FIG. 33 of the drawings, the achromatic lens group of the optical lens according to the third preferred embodiment of the present invention is preferably a cemented lens. In other words, the third lens L3 and the fourth lens L4 are adhered together to form the achromatic lens group. On this point, since the third lens L3 and the fourth lens L4 are adhered together, the concave surface S7 of the third lens L3 and the convex surface S7 of the fourth lens L4 are overlapped together, while the concave surface S7 of the third lens L3 and the convex surface S7 of the fourth lens L4 are arranged face to face. Alternatively, the achromatic lens group may also be a two-separated type achromatic lens group. It is understood that when the achromatic lens group is the two-separated type achromatic lens group, the third lens L3 and the fourth lens L4 are arranged separately, so that the aperture L6 can be arranged between the third lens L3 and the fourth lens L4.

It is worth mentioned that the first lens L1 can be made of glass material or made of other materials having good light transmission properties. Those who are skilled in this art should know that when the refractive index of the first lens L1 is too large, the imaging light passing through the first lens L1 would be excessively diverged, so that the subsequent lens, such as the second lens L2, needs be set to have a high refractive index, a large aperture and/or relatively large thickness for converging the light. Consequently, the first lens L1 of the optical lens in the ninth preferred embodiment is arranged to have a refractive index Nd $(1) \leq 1.85$. In other words, the refractive index of the material of the first lens L1 is set not more than 1.85, which is shown in Table 13A and Table 14A. In addition, in order for preventing the aberration, after the imaging light passing through the first lens L1, being too large, the first lens L1 is arranged to be made of material having an abbe constant Vd (1) no less than 40 (Vd $(1) \geq 40$). In order to converge the imaging light passing through the first lens L1 and prevent the further divergence thereof to ensure that the imaging light passing through the first lens L1 could be smoothly transmitted to the rear lens group, the second lens L2 is arranged to have a relative high refractive index. Accordingly, the refractive index of the second lens L2 is defined as Nd (2) and the Nd (2) is not less than 1.55 (Nd (2)≥1.55). Preferably, the Nd (2) is not less than 1.7 (Nd (2)≥1.7), which is shown in Table 13A and Table 14A. In other words, the refractive index of the material of the second lens L2 is arranged not less than 1.55. In addition, the abbe constant of the second lens L2 is defined as Vd (2) and the Vd (2) is provided ranging from 20 to 65 (65≥Vd (2)≥20), to effectively correct the axial chromatic aberration, which is shown in Table 13A and Table 14A.

Meanwhile, since the refractive index Nd (1) of the first lens L1 is less than 1.85, the abbe constant Vd(1) is not less than 40, the refractive index Nd (2) of the second lens L2 is 1.55, preferably Nd (2)≥1.7, and the abbe constant Vd (2) is ranged from 20 to 65. Thus, both of the first lens L1 and the second lens L2 can be made of relatively inexpensive glass material.

Therefore, the front lens group and the rear lens group of the optical lens according to the ninth preferred embodiment of the present invention are arranged in such a manner that the ratio of the total length TTL of the optical lens to the focal length F of the optical lens can the following formula: TTL/F≤7.5; wherein the TTL is the total length of the optical lens, which, in other words, refers to the distance from the outermost point of the object side of the first lens to the imaging focal plane of the optical lens.

As shown in Table 13A and Table 14A, the curvature radius of the concave surface S1 facing towards the object side is −13.627 (from the object side to image side), the curvature radius of the concave surface S2 facing towards the image side is 3.363 (from the object side to image side), the refractive index of the first lens L1 is 1.64, the abbe constant of the first lens L1 is 55.6; the curvature radius of the convex surface S4 facing towards the object side is 6.667 (from the object side to image side), the curvature radius of the concave surface S5 facing towards the image side is −7.310 (from the object side to image side), the refractive index of the second lens L2 is 1.59, the abbe constant of the second lens L2 is 60.6. According to FIG. 34, FIG. 35 and FIG. 36, the optical lens of the present invention has preferable optical performance.

TABLE 13A

Parameters of the lens assembly

| Surf. | Curvature radius r | Central thickness d | Refractive index Nd | Abbe constant Vd |
|---|---|---|---|---|
| S1 | −13.627 | 0.800 | 1.64 | 55.6 |
| S2 | 3.363 | 2.721 | | |
| STO | Infinity | 0.000 | | |
| S4 | 6.667 | 4.400 | 1.59 | 60.6 |
| S5 | −7.310 | 0.300 | | |
| S6 | 4.081 | 3.600 | 1.50 | 81.6 |
| S7 | −4.501 | 0.650 | | |
| S7' | −4.501 | 0.650 | 1.75 | 52.3 |
| S8 | 58.260 | 0.180 | | |
| S9 | 6.983 | 2.000 | 1.51 | 63.8 |

TABLE 13A-continued

Parameters of the lens assembly

| Surf. | Curvature radius r | Central thickness d | Refractive index Nd | Abbe constant Vd |
|---|---|---|---|---|
| S10 | 9.823 | 0.500 | | |
| S11 | Infinity | 0.950 | 1.52 | 64.2 |
| S12 | Infinity | 1.763 | | |
| IMA | Infinity | | | |

TABLE 14A

Parameters of the lens assembly

| Nd (1) | Vd (1) | Nd (2) | Vd (2) | F1 | F | TTL | F1/F | TTL/F |
|---|---|---|---|---|---|---|---|---|
| 1.64 | 55.6 | 1.59 | 60.6 | −4.13 | 3.88 | 17.86 | −1.06 | 4.60 |

Alternatively, at least one of the two surfaces of the fifth lens L5 is an aspherical surface, wherein the aspheric lens surface of the fifth lens L5 satisfies the following formula:

$$Z(h) = \frac{ch^2}{1 + \sqrt{1 - (1+k)c^2 h^2}} + Ah^4 + Bh^6 + Ch^8 + Dh^{10} + Eh^{12},$$

wherein Z(h) is the height vector from the vertex of the aspherical surface at a position that the height thereof in the direction of the optical axis is h; c=1/r, wherein the r is the curvature radius of the aspheric surface; k is the conic coefficient con; and the A, B, C, D, and E represent high-order aspheric coefficients thereof.

TABLE 15A aspherical coefficients: K, A, B, C, D, E

| Surf | K | A | B | C | D | E |
|---|---|---|---|---|---|---|
| 9 | −18.79164 | −3.14487E−03 | −3.58652E−04 | −7.76989E−05 | 3.92281E−05 | −1.17564E−06 |
| 10 | −152.6418 | 1.62760E−03 | −2.19156E−03 | 6.79365E−04 | −4.90585E−05 | 1.04592E−06 |

In other words, at least one of the two surfaces of the fifth lens L5 is an aspherical surface, so as to improve the optical performance of the optical lens of the third preferred embodiment of the present invention, while meeting the requirement of miniaturization.

In summary, the optical lens according to the ninth preferred embodiment of the present invention enable the miniaturization of the entire optical lens to be made suitable for use in the vehicle mounted field under the condition of high pixel, small distortion and high definition imaging. In addition, the parameters of the respective lenses of the optical lens according to the ninth preferred embodiment of the present invention can be made stable in an environment where the temperature change is larger. In other words, the optical lens of the ninth preferred embodiment of the present invention can be miniaturized and capable of stabilizing imaging at a large temperature range.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purpose of illustrating the functional and structural principles of the present invention and is subject to change without departure from such principles. Therefore, this invention comprises all modifications encompassed within the spirit and scope of the following claims.

What is claimed is:

1. An optical lens, in an order from an object side to an image side, comprising:
    a first lens having a negative power and two concave surfaces;
    a second lens having a positive power and two convex surfaces;
    a third lens;
    a fourth lens cemented with the third lens to form a cemented lens; and
    a fifth lens having a positive power, wherein the fifth lens has an object side surface and an image side surface, and the object side surface of the fifth lens is a convex surface, and wherein at least one of the object side surface and the image side surface of the fifth lens is an aspherical surface, wherein, $d/h/\text{FOV} \leq 0.025$, where FOV is a maximum field of view of the optical lens,
    d is a maximum light-passing aperture of the concave surface of the first lens, which faces the object side, in a scenario where a field of view of the optical lens is maximum,
    and h is an image height in a scenario where the field of view of the optical lens is maximum.

2. The optical lens as recited in claim 1, wherein the third lens of the cemented lens has a positive power and two convex surfaces,
    wherein the fourth lens of the cemented lens has a negative power and a concave surface facing towards the object side, and
    wherein the image side surface of the fifth lens is a convex surface.

3. The optical lens as recited in claim 1, wherein the third lens of the cemented lens has a negative power and a concave surface facing towards the image side,
    wherein the fourth lens of the cemented lens has a positive power and two convex surfaces, and
    wherein the image side surface of the fifth lens is a convex surface.

4. The optical lens as recited in claim 1, wherein a focal length of the first lens Fl and a focal length of the optical lens F satisfy:

$0.5 \geq F1/F \geq -2$.

5. The optical lens as recited in claim 1, wherein a total length of the optical lens TTL and a focal length of the optical lens F satisfy:

$TTL/F \leq 7.5$.

6. The optical lens as recited in claim 1, wherein the third lens of the cemented lens has a negative power and two concave surfaces, and
    wherein the fourth lens of the cemented lens has a positive power and two convex surfaces, and
    wherein the image side surface of the fifth lens is a concave surface.

7. The optical lens as recited in claim 1, wherein the third lens of the cemented lens has a positive power and two convex surfaces, and
    wherein the fourth lens of the cemented lens has a negative power and two concave surfaces, and
    wherein the image side surface of the fifth lens is a concave surface.

8. The optical lens as recited in claim 1, wherein the first lens, the second lens, the third lens, the fourth lens and the fifth lens form a front lens group and a rear lens group, wherein the front lens group at least comprise the first lens and the rear lens group at least comprise the third lens, the fourth lens and the fifth lens, wherein:

$4.5 \geq F\text{Front}/F \geq 1.3$; and $5 \geq F\text{Rear}/F \geq 1.5$, where FFront is a focal length of the front lens group, FRear is a focal length of the rear lens group, and F is a focal length of the optical lens.

9. The optical lens as recited in claim 1, wherein:

$F5/F > 2$, where F5 is a focal length of the fifth lens, and F is a focal length of the optical lens.

10. The optical lens as recited in claim 1, wherein:

$r9/r10 \leq 3.5$, where r9 is a radius of the fifth lens at the object side, and r10 is a radius of the fifth lens at the image side.

11. The optical lens as recited in claim 1, wherein:

$|r9-r10| < 2$, where r9 is a radius of the fifth lens at the object side, and r10 is a radius of the fifth lens at the image side.

12. The optical lens as recited in claim 1, wherein:

$TTL \leq 22.66$ mm, where TTL is a total length of the optical lens.

13. An optical lens, in an order from an object side to an image side, comprising:
    a first lens having a negative power and two concave surfaces;
    a second lens having a positive power and two convex surfaces;
    a third lens;
    a fourth lens cemented with the third lens to form a cemented lens; and
    a fifth lens having a positive power, wherein the fifth lens has a meniscus shape with a concave object side surface and a convex image side surface, and wherein at least one of the object side surface and the image side surface of the fifth lens is an aspherical surface.

14. The optical lens as recited in claim 13, wherein the third lens of the cemented lens has a positive power and two convex surfaces, and
    wherein the fourth lens of the cemented lens has a negative power and two concave surfaces.

15. The optical lens as recited in claim 14, wherein a focal length of the first lens F1 and a focal length of the optical lens F satisfy:

$0.5 \geq F1/F \geq -2$.

16. The optical lens as recited in claim 14, wherein:

$$F5/F>2,$$

where F5 is a focal length of the fifth lens, and F is a focal length of the optical lens.

17. The optical lens as recited in claim 14, wherein:

$$|r9|-|r10|<2,$$

where r9 is a radius of the fifth lens at the object side, r10 is a radius of the fifth lens at the image side.

18. The optical lens as recited in claim 13, wherein:

$$r9/r10 \leq 3.5,$$

where r9 is a radius of the fifth lens at the object side, and r10 is a radius of the fifth lens at the image side.

19. The optical lens as recited in claim 13, wherein a total length of the optical lens TTL and a focal length of the optical lens F satisfy:

$$TTL/F \leq 7.5.$$

20. The optical lens as recited in claim 13, wherein $$d/h/FOV \leq 0.025,$$

where FOV is a maximum field of view of the optical lens,
d is a maximum light-passing aperture of the concave surface of the first lens, which faces the object side, in a scenario where the field of view of the optical lens is maximum, and
h is an image height in a scenario where the field of view of the optical lens is maximum.

21. The optical lens as recited in claim 13, wherein the first lens, the second lens, the third lens, the fourth lens and the fifth lens form a front lens group and a rear lens group, wherein the front lens group at least comprise the first lens and the rear lens group at least comprise the third lens, the fourth lens and the fifth lens, wherein:

$$4.5 \geq FFront/F \geq 1.3; \text{ and}$$

$$5 \geq FRear/F \geq 1.5,$$

where FFront is a focal length of the front lens group, FRear is a focal length of the rear lens group, and F is a focal length of the optical lens.

22. The optical lens as recited in claim 13, wherein:

$$TTL \leq 22.66 \text{ mm},$$

where TTL is a total length of the optical lens.

* * * * *